(12) United States Patent
Crabtree et al.

(10) Patent No.: US 12,495,076 B2
(45) Date of Patent: *Dec. 9, 2025

(54) SYSTEM AND METHOD FOR INTERNET ACTIVITY AND HEALTH FORECASTING AND INTERNET NOISE ANALYSIS

(71) Applicant: QOMPLX LLC, Reston, VA (US)

(72) Inventors: Jason Crabtree, Vienna, VA (US); Richard Kelley, Woodbridge, VA (US)

(73) Assignee: QOMPLX LLC, Reston, VA (US)

( * ) Notice: Subject to any disclaimer, the term of this patent is extended or adjusted under 35 U.S.C. 154(b) by 180 days.

This patent is subject to a terminal disclaimer.

(21) Appl. No.: 18/339,207

(22) Filed: Jun. 21, 2023

(65) Prior Publication Data
US 2024/0171614 A1 May 23, 2024

Related U.S. Application Data

(63) Continuation-in-part of application No. 17/829,211, filed on May 31, 2022, now Pat. No. 11,757,945, (Continued)

(51) Int. Cl.
*H04L 9/40* (2022.01)
*G06F 16/2458* (2019.01)
*G06F 16/951* (2019.01)
*G06F 21/62* (2013.01)
*H04L 67/1097* (2022.01)

(52) U.S. Cl.
CPC .......... *H04L 63/20* (2013.01); *G06F 16/2477* (2019.01); *G06F 16/951* (2019.01); *G06F 21/6218* (2013.01); *H04L 63/1425* (2013.01); *H04L 63/1433* (2013.01); *H04L 63/1441* (2013.01); *H04L 67/1097* (2013.01)

(58) Field of Classification Search
CPC . H04L 63/20; H04L 63/1425; H04L 63/1433; H04L 63/1441; H04L 67/1097; G06F 16/2477; G06F 16/951; G06F 21/6218
See application file for complete search history.

(56) References Cited

U.S. PATENT DOCUMENTS 9,384,345 B2 7/2016 Dixon et al.
9,967,264 B2 5/2018 Harris et al.
(Continued)

*Primary Examiner* — Cheng-Feng Huang
(74) *Attorney, Agent, or Firm* — Galvin Patent Law LLC; Brian R Galvin

(57) ABSTRACT

A system and method for large-scale internet health forecasting and internet noise analysis. The system and method feature the ability to scan for, ingest and process, and then use various data stores for capturing entity data, their relationships, and actions associated with them. This data forms the basis for cyber enrichment service databases which can used to provide information responsive to user submitted queries as well as to produce large-scale (e.g., Internet scale) simulation models using statistical models, generative ML models, massively multiplayer online gaming simulation systems, or full discrete event simulation engines or some combination. User submitted queries can be ran against the raw data or against simulations to provide simulation results that can be used improve cybersecurity for an organization against actual observed behaviors or simulations.

16 Claims, 35 Drawing Sheets

Related U.S. Application Data which is a continuation of application No. 16/983,253, filed on Aug. 3, 2020, now Pat. No. 11,388,198, which is a continuation-in-part of application No. 16/887,304, filed on May 29, 2020, now Pat. No. 11,297,109, which is a continuation-in-part of application No. 16/837,551, filed on Apr. 1, 2020, now Pat. No. 11,070,592, which is a continuation-in-part of application No. 16/777,270, filed on Jan. 30, 2020, now Pat. No. 11,025,674, which is a continuation-in-part of application No. 16/720,383, filed on Dec. 19, 2019, now Pat. No. 10,944,795, which is a continuation of application No. 15/823,363, filed on Nov. 27, 2017, now Pat. No. 10,560,483, said application No. 16/837,551 is a continuation-in-part of application No. 15/818,733, filed on Nov. 20, 2017, now Pat. No. 10,673,887, which is a continuation-in-part of application No. 15/725,274, filed on Oct. 4, 2017, now Pat. No. 10,609,079, said application No. 15/823,363 is a continuation-in-part of application No. 15/725,274, filed on Oct. 4, 2017, now Pat. No. 10,609,079, which is a continuation-in-part of application No. 15/655,113, filed on Jul. 20, 2017, now Pat. No. 10,735,456, which is a continuation-in-part of application No. 15/616,427, filed on Jun. 7, 2017, now abandoned, and a continuation-in-part of application No. 15/237,625, filed on Aug. 15, 2016, now Pat. No. 10,248,910, which is a continuation-in-part of application No. 15/206,195, filed on Jul. 8, 2016, now abandoned, which is a continuation-in-part of application No. 15/186,453, filed on Jun. 18, 2016, now abandoned, which is a continuation-in-part of application No. 15/166,158, filed on May 26, 2016, now abandoned, which is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned, said application No. 15/616,427 is a continuation-in-part of application No. 14/925,974, filed on Oct. 28, 2015, now abandoned.

(56) References Cited

U.S. PATENT DOCUMENTS

| | | |
|---|---|---|
| 10,715,534 B2 | 7/2020 | Sander et al. |
| 2004/0255167 A1 | 12/2004 | Knight |
| 2006/0253580 A1 | 11/2006 | Dixon et al. |
| 2014/0279995 A1* | 9/2014 | Wang .................... G06F 16/951 |
| | | 707/706 |
| 2015/0244732 A1 | 8/2015 | Golshan et al. |
| 2015/0373039 A1 | 12/2015 | Wang |
| 2015/0381649 A1 | 12/2015 | Schultz et al. |
| 2016/0057159 A1 | 2/2016 | Yin et al. |
| 2016/0078225 A1 | 3/2016 | Ray et al. |
| 2016/0080399 A1 | 3/2016 | Harris et al. |
| 2016/0080417 A1 | 3/2016 | Thomas et al. |
| 2016/0080418 A1 | 3/2016 | Ray et al. |
| 2016/0080419 A1 | 3/2016 | Schiappa et al. |
| 2016/0080420 A1 | 3/2016 | Ray et al. |
| 2016/0132578 A1 | 5/2016 | Allen et al. |
| 2016/0191465 A1 | 6/2016 | Thomas et al. |
| 2016/0191559 A1 | 6/2016 | Mhatre et al. |
| 2016/0248800 A1 | 8/2016 | Ng et al. |
| 2018/0013774 A1 | 1/2018 | Sander et al. |
| 2018/0046811 A1* | 2/2018 | Andriani ............. H04L 63/1458 |
| 2018/0357422 A1 | 12/2018 | Telang et al. |
| 2020/0125734 A1 | 4/2020 | Light et al. |
| 2022/0035930 A1 | 2/2022 | Carey et al. |

* cited by examiner

SYSTEM AND METHOD FOR INTERNET ACTIVITY AND HEALTH FORECASTING AND INTERNET NOISE ANALYSIS

CROSS-REFERENCE TO RELATED APPLICATIONS

Priority is claimed in the application data sheet to the following patents or patent applications, each of which is expressly incorporated herein by reference in its entirety:
U.S. Ser. No. 17/829,211
U.S. Ser. No. 16/983,253
U.S. Ser. No. 16/887,304
U.S. Ser. No. 16/837,551
U.S. Ser. No. 15/818,733
U.S. Ser. No. 16/777,270
U.S. Ser. No. 16/720,383
U.S. Ser. No. 15/823,363
U.S. Ser. No. 15/725,274
U.S. Ser. No. 15/655,113
U.S. Ser. No. 15/616,427
U.S. Ser. No. 15/237,625
U.S. Ser. No. 15/186,453
U.S. Ser. No. 15/166,158
U.S. Ser. No. 15/141,752
U.S. Ser. No. 15/091,563
U.S. Ser. No. 14/986,536
U.S. Ser. No. 15/206,195
U.S. Ser. No. 14/925,974

BACKGROUND OF THE INVENTION

Field of the Art

The disclosure relates to the field of cybersecurity, and more particularly to systems for internet monitoring and simulation and large-scale cyber risk simulation to support system-wide reliability and availability estimation as well as real-time attack monitoring and forecasting.

Discussion of the State of the Art

Historically, risk management professionals and insurance experts have pursued collaborative efforts to compile exposure and loss databases with common ontological frameworks. However, there are still inadequate equivalents for new and ever evolving risks including cybersecurity and business continuity which may be impacted by various non-physical damage events or triggers from accidental and intentionally caused perils. Since collaborative data sets are increasingly required, the ability to demonstrate provenance of source data, contextualize observations with both local and global ancillary state information and associate source and model information (both directly and in simulations or synthetically generated data sets) for derived or generated event sets is critical, but unmet by any current solutions. While standalone efforts to catalogue limited breach artifacts exist, no relationship to the broader events, filings, or entities does. Current approaches mostly focus almost exclusively on survey data (e.g. CyberGRX or NIST CSF type information like the proposed CMMC framework) and limited external scan information (including passive vuln matching) which is an inadequate and potentially dangerous way to characterize entities due to lack of sufficient context. These contextual values are critical for normalizing any indices, data sets, or models relating to exposure and event intensity in both physical and non-physical loss scenarios. Currently, there is almost no treatment of either these contextual values or of hypothetical histories when historical portfolios and loss ratios are considered. Subsequently, this leads to additional model error accumulation from event dynamics which are inappropriate to exclude in such an adversarial domain. This creates problems for all involved parties, as none of them can sufficiently track inconsistencies and data gaps in the art.

What is needed is a system and method which provides a comprehensive view of the global Internet infrastructure to aid organizations in understanding ongoing changes in internet topology, usage, hygiene, and configurations which can aid in the identification and response of public and private organizations to potential risks, improving routing security, and proactively addressing threats to ensure a stable and secure Internet environment to enable continuity of operations.

SUMMARY OF THE INVENTION

Accordingly, the inventor has conceived and reduced to practice a system and method for large-scale (e.g., full traffic/behavior simulation, border gateway protocol simulation, other generic network forecasting or internet noise analysis and baselining) internet health forecasting. The system and method feature the ability to scan for, ingest and process, and then use various data stores for capturing entity data, their relationships, and actions associated with them and facilitating both OLAP and OLTP analysis. This data forms the basis for cyber enrichment service databases which can be used to provide information responsive to user submitted queries as well as for the production of large-scale (e.g., Internet scale) network simulation models using statistical models, generative ML models, massively multi-player online gaming simulation systems, or full discrete event simulation engines or some combination. User submitted queries can be ran against the raw data or against simulations to provide simulation results that can be used improve cybersecurity for an organization against actual observed behaviors or simulations enabling analysis of a broader range of actual events or "hypothetical histories" as well as proactive searching of potential occurrences (e.g., through MCTS or other parametric simulation perturbation techniques that can aid in sampling forward decision space).

According to a preferred embodiment, a system for large-scale internet heath forecasting and internet noise analysis, comprising: a computer system comprising a memory and a processor; a simulation engine comprising a first plurality of programming instructions stored in the memory and operating on the processor, wherein the first plurality of programming instructions, when operating on the processor, causes the computer system to: retrieve a plurality of cyber enrichment service data; retrieve a plurality of routing information; retrieve a plurality of Internet infrastructure data; use the plurality of cyber enrichment service data, the plurality of routing information, and the plurality of Internet infrastructure data as inputs into a game simulator to create a large-scale border gateway protocol simulation; receive a user submitted query from a query engine; retrieve a second plurality of cyber enrichment service data associated with the user submitted query; apply the user submitted query to the large-scale internet health simulation to determine a scenario; and return the scenario and the second plurality of cyber enrichment service data as a response the user submitted query.

According to another preferred embodiment, a method for large-scale internet heath forecasting and internet noise analysis is disclosed, comprising the steps of: retrieving a plurality of cyber enrichment service data; retrieving a plurality of routing information; retrieving a plurality of Internet infrastructure data; using the plurality of cyber enrichment service data, the plurality of routing information, and the plurality of Internet infrastructure data as inputs into a game simulator to create a large-scale Internet health simulation; receiving a user submitted query from a query engine; retrieving a second plurality of cyber enrichment service data associated with the user submitted query; applying the user submitted query to the large-scale Internet health simulation to determine a scenario; and returning the scenario and the second plurality of cyber enrichment service data as a response the user submitted query.

According to an aspect of an embodiment, the game simulator is a massively multiplayer online game simulator.

According to an aspect of an embodiment, the cyber enrichment service data comprises at least event data, reputation data, vulnerability and exploit data, threat actor data, breach detail data, tool data, and Internet infrastructure health data.

According to an aspect of an embodiment, the scenario is related to real-time monitoring and forecasting.

According to an aspect of an embodiment, the scenario is related to routing security.

According to an aspect of an embodiment, the scenario is a predicted threat to the Internet infrastructure.

According to an aspect of an embodiment, the query engine comprising second plurality of programming instructions stored in the memory and operating on the processor, wherein the second plurality of programming instructions, when operating on the processor, causes the computer system to: receive the user submitted query; send the user submitted query to the simulation engine; receive the returned scenario and the second plurality of cyber enrichment service data from the simulation engine; and display the scenario and the second plurality of cyber enrichment service data as a response the user submitted query via a user interface.

According to an aspect of an embodiment, the computer system is a cloud computing platform.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary and are not to be considered as limiting of the scope of the invention or the claims herein in any way.

DETAILED DESCRIPTION OF THE INVENTION

Figure 1:
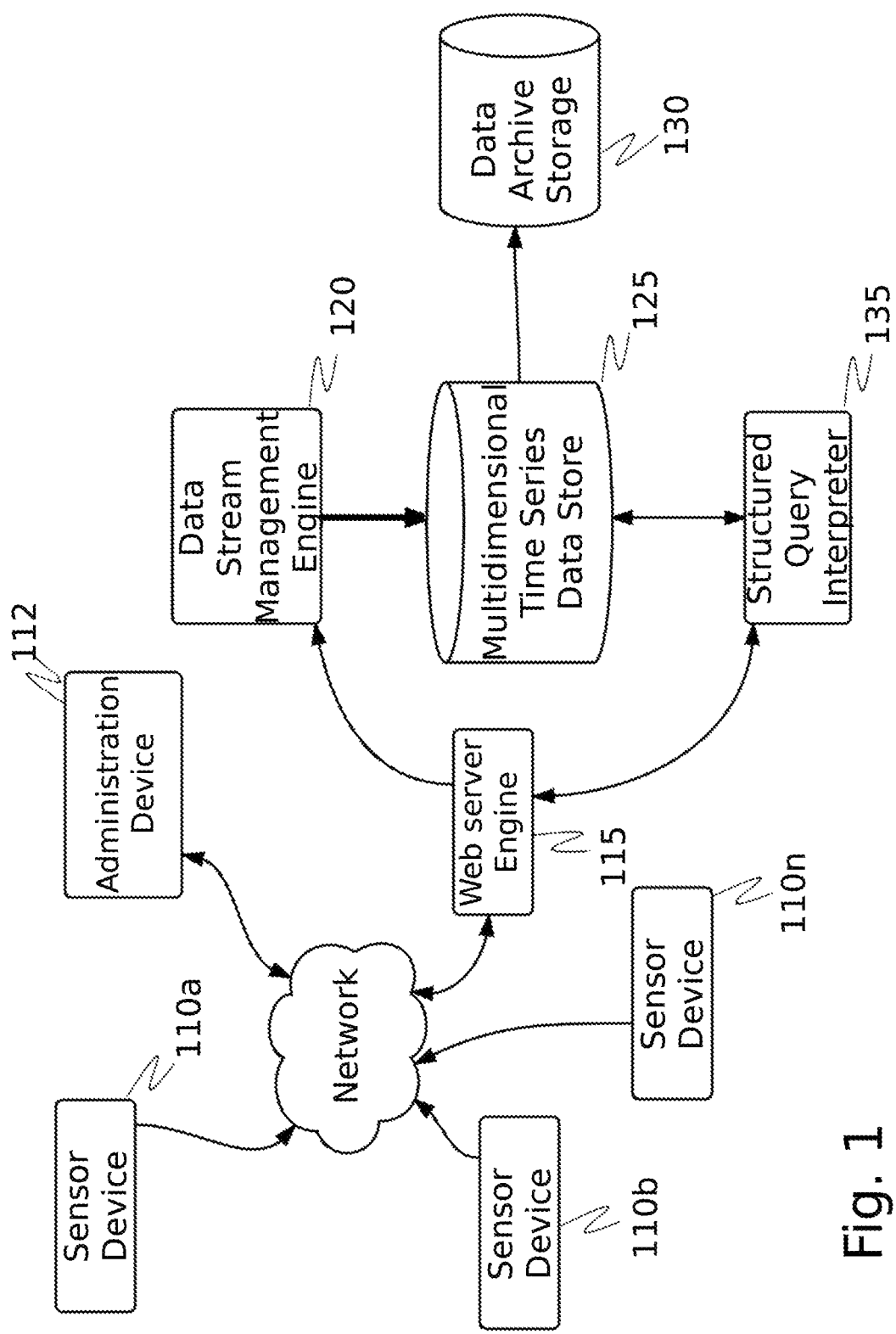
FIG. 1 is a diagram of an exemplary architecture of a system for the capture and storage of time series data from sensors with heterogeneous reporting profiles according to an embodiment of the invention.

The inventor has conceived and reduced to practice a system and method for large-scale internet health forecasting and internet noise analysis. The system and method feature the ability to scan for, ingest and process, and then use various data stores for capturing entity data, their relationships, and actions associated with them. This data forms the basis for cyber enrichment service databases which can used to provide information responsive to user submitted queries as well as to produce large-scale (e.g., Internet scale) simulation models using statistical models, generative ML models, massively multiplayer online gaming simulation systems, or full discrete event simulation engines or some combination. User submitted queries can be ran against the raw data or against simulations to provide simulation results that can be used improve cybersecurity for an organization against actual observed behaviors or simulations.

The purpose of the system is to provide scalable access to a plurality of network flow data sources and data partners in a collaborative manner, while operating in an adversarial information environment, which may be optionally integrated into a single holistic feed. An adversarial information environment describes a situation of information retrieval working with a data source where some portion of it has been maliciously manipulated. The network flow data sources and the data partners are all operating in an adversarial information environment which means that the data may not be entirely reputable. The lack of confidence in the data source may be caused by not knowing the exact source of the data or could be due to malicious actions directed at the data source or data partner. For example, a common technique deployed by malicious actors is search engine spamming. This technique distorts web search algorithms in a variety of ways, including malicious tagging and web content filtering, which ultimately leads to poor data gathering.

The system is collaborative in that it acquires data input submitted by individuals and entities in conjunction with autonomously gathered sources. Individuals and entities are encouraged to provide or make available their own data to the system. The purpose of the collaboration of various groups, individuals, and entities is to produce more accurate and robust data sets that can provide a more comprehensive view of the associated data. Contributing parties, and non-contributing parties, can access the collaborated data sets and leverage them to suit their needs.

The collaborative database management system emphasizes the collection of meta-data associated with various data sources to provide a means to combat the effects of operating in an adversarial information environment and to make compiling collaborative data sets easier. Specifically, provenance meta-data that describes the who, what, when, where, and why of a data source is gathered. The provenance meta-data provides a means to trace the lineage of a data source, which in turn makes the data source more credible and useable. Data provenance is also helpful in collaborative data sets by making it easier to manage and merge conflicting distributed multi-party data contributions.

The system provides a means for entities and individuals to contribute to collaborative databases while also providing improved data validation capabilities via meta-data collection including provenance data. Gathered data is pre-processed and transformed uniformly to make further analyses and queries streamlined. The collaborated databases are used to enrich the information available so that participating groups or individuals have access, via an application programming interface (API), to a more accurate and broad data set which they can confidently utilize for their unique purposes. Additionally, the enriched databases can also be used to manage the reputation of the collaborated data sources.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, a "swimlane" is a communication channel between a time series sensor data reception and apportioning device and a data store meant to hold the apportioned data time series sensor data. A swimlane is able to move a specific, finite amount of data between the two devices. For example, a single swimlane might reliably carry and have incorporated into the data store, the data equivalent of 5 seconds worth of data from 10 sensors in 5 seconds, this being its capacity. Attempts to place 5 seconds worth of data received from 6 sensors using one swimlane would result in data loss.

As used herein, a "metaswimlane" is an as-needed logical combination of transfer capacity of two or more real swimlanes that is transparent to the requesting process. Sensor studies where the amount of data received per unit time is expected to be highly heterogeneous over time may be initiated to use metaswimlanes. Using the example used above that a single real swimlane can transfer and incorporate the 5 seconds worth of data of 10 sensors without data loss, the sudden receipt of incoming sensor data from 13 sensors during a 5 second interval would cause the system to create a two swimlane metaswimlane to accommodate the standard 10 sensors of data in one real swimlane and the 3 sensor data overage in the second, transparently added real swimlane, however no changes to the data receipt logic would be needed as the data reception and apportionment device would add the additional real swimlane transparently.

A "database" or "data storage subsystem" (these terms may be considered substantially synonymous), as used herein, is a system adapted for the long-term storage, indexing, and retrieval of data, the retrieval typically being via some sort of querying interface or language. "Database" may be used to refer to relational database management systems known in the art, but should not be considered to be limited to such systems. Many alternative database or data storage system technologies have been, and indeed are being, introduced in the art, including but not limited to distributed non-relational data storage systems such as Hadoop, column-oriented databases, in-memory databases, and the like. While various aspects may preferentially employ one or another of the various data storage subsystems available in the art (or available in the future), the invention should not be construed to be so limited, as any data storage architecture may be used according to the aspects. Similarly, while in some cases one or more particular data storage needs are described as being satisfied by separate components (for example, a vulnerability and exploit database and an event database), these descriptions refer to functional uses of data storage systems and do not refer to their physical architecture. For instance, any group of data storage systems of databases referred to herein may be included together in a single database management system operating on a single machine, or they may be included in a single database management system operating on a cluster of machines as is known in the art. Similarly, any single database (such as a vulnerability and exploit database) may be implemented on a single machine, on a set of machines using clustering technology, on several machines connected by one or more messaging systems known in the art, or in a master/slave arrangement common in the art. These examples should make clear that no particular architectural approaches to database management is preferred according to the invention, and choice of data storage technology is at the discretion of each implementer, without departing from the scope of the invention as claimed.

As used herein, "data restrictions" refer to data residency (where a business, industry body or government specifies that their data is stored in a geographical location of their choice, usually for regulatory or policy reasons), data sovereignty (data stored in a designated location, and is also subject to the laws of the country in which it is physically stored), and data localization (requires that data created within certain borders stay within them).

Conceptual Architecture

FIG. 1 is a diagram of an exemplary architecture of a system for the capture and storage of time series data from sensors with heterogeneous reporting profiles according to an embodiment of the invention 100. In this embodiment, a plurality of sensor devices 110a-n stream data to a collection device, in this case a web server acting as a network gateway 115. These sensors 110a-n can be of several forms, some non-exhaustive examples being: physical sensors measuring humidity, pressure, temperature, orientation, and presence of a gas; or virtual such as programming measuring a level of network traffic, memory usage in a controller, and number of times the word "refill" is used in a stream of email messages on a particular network segment, to name a small few of the many diverse forms known to the art. In the embodiment, the sensor data is passed without transformation to the data management engine 120, where it is aggregated and organized for storage in a specific type of data store 125 designed to handle the multidimensional time series data resultant from sensor data. Raw sensor data can exhibit highly different delivery characteristics. Some sensor sets may deliver low to moderate volumes of data continuously. It would be infeasible to attempt to store the data in this continuous fashion to a data store as attempting to assign identifying keys and store real time data from multiple sensors would invariably lead to significant data loss. In this circumstance, the data stream management engine 120 would hold incoming data in memory, keeping only the parameters, or "dimensions" from within the larger sensor stream that are pre-decided by the administrator of the study as important and instructions to store them transmitted from the administration device 112. The data stream management engine 120 would then aggregate the data from multiple individual sensors and apportion that data at a predetermined interval, for example, every 10 seconds, using the timestamp as the key when storing the data to a multidimensional time series data store over a single swimlane of sufficient size. This highly ordered delivery of a foreseeable amount of data per unit time is particularly amenable to data capture and storage but patterns where delivery of data from sensors occurs irregularly and the amount of data is extremely heterogeneous are quite prevalent. In these situations, the data stream management engine cannot successfully use strictly single time interval over a single swimlane mode of data storage. In addition to the single time interval method the invention also can make use of event-based storage triggers where a predetermined number of data receipt events, as set at the administration device 112, triggers transfer of a data block consisting of the apportioned number of events as one dimension and a number of sensor ids as the other. In the embodiment, the system time at commitment or a time stamp that is part of the sensor data received is used as the key for the data block value of the value-key pair. The invention can also accept a raw data stream with commitment occurring when the accumulated stream data reaches a predesigned size set at the administration device 112.

It is also likely that that during times of heavy reporting from a moderate to large array of sensors, the instantaneous load of data to be committed will exceed what can be reliably transferred over a single swimlane. The embodiment of the invention can, if capture parameters pre-set at the administration device 112, combine the data movement capacity of two or more swimlanes, the combined bandwidth dubbed a metaswimlane, transparently to the committing process, to accommodate the influx of data in need of commitment. All sensor data, regardless of delivery circumstances are stored in a multidimensional time series data store 125 which is designed for very low overhead and rapid data storage and minimal maintenance needs to sap resources. The embodiment uses a key-value pair data store examples of which are Risk, Redis and Berkeley DB for their low overhead and speed, although the invention is not specifically tied to a single data store type to the exclusion of others known in the art should another data store with better response and feature characteristics emerge. Due to factors easily surmised by those knowledgeable in the art, data store commitment reliability is dependent on data store data size under the conditions intrinsic to time series sensor data analysis. The number of data records must be kept relatively low for the herein disclosed purpose. As an example, one group of developers restrict the size of their multidimensional time series key-value pair data store to approximately $8.64 \times 10^4$ records, equivalent to 24 hours of 1 second interval sensor readings or 60 days of 1 minute interval readings. In this development system the oldest data is deleted from the data store and lost. This loss of data is acceptable under development conditions but in a production environment, the loss of the older data is almost always significant and unacceptable. The invention accounts for this need to retain older data by stipulating that aged data be placed in long term storage. In the embodiment, the archival storage is included 130. This archival storage might be locally provided by the user, might be cloud based such as that offered by Amazon Web Services or Google or could be any other available very large capacity storage method known to those skilled in the art.

Reliably capturing and storing sensor data as well as providing for longer term, offline, storage of the data, while important, is only an exercise without methods to repetitively retrieve and analyze most likely differing but specific sets of data over time. The invention provides for this requirement with a robust query language that both provides straightforward language to retrieve data sets bounded by multiple parameters, but to then invoke several transformations on that data set prior to output. In the embodiment isolation of desired data sets and transformations applied to that data occurs using pre-defined query commands issued from the administration device 112 and acted upon within the database by the structured query interpreter 135. Below is a highly simplified example statement to illustrate the method by which a very small number of options that are available using the structured query interpreter 135 might be accessed.

SELECT [STREAMING| EVENTS] data_spec FROM [unit] timestamp TO timestamp GROUPBY (sensor_id, identifier) FILTER [filter_identifier] FORMAT [sensor [AS identifier][, sensor [AS identifier]] . . . ] (TEXT| JSON| FUNNEL| KML| GEOJSON| TOPOJSON);

Here "data_spec" might be replaced by a list of individual sensors from a larger array of sensors and each sensor in the list might be given a human readable identifier in the format "sensor AS identifier". "unit" allows the researcher to assign a periodicity for the sensor data such as second (s), minute (m), hour (h). One or more transformational filters, which include but a not limited to: mean, median, variance, standard deviation, standard linear interpolation, or Kalman filtering and smoothing, may be applied and then data formatted in one or more formats examples of with are text, JSON, KML, GEOJSON and TOPOJSON among others known to the art, depending on the intended use of the data.

Figure 2:
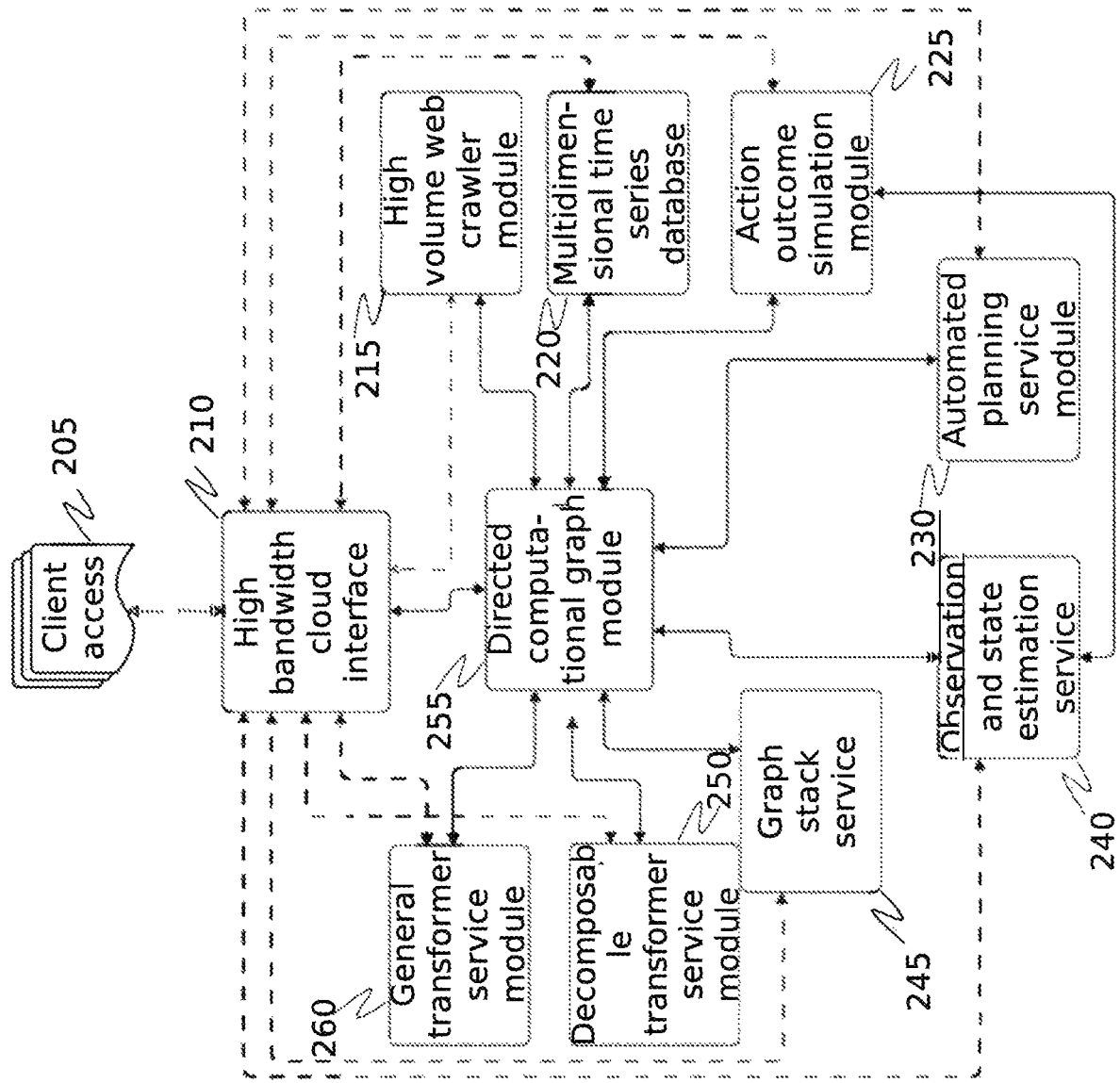
FIG. 2 is a diagram of an exemplary architecture of a business operating system according to an embodiment of the invention.

FIG. 2 is a diagram of an exemplary architecture of a business operating system 200 according to an embodiment of the invention. Client access to the system 205 both for system control and for interaction with system output such as automated predictive decision making and planning and alternate pathway simulations, occurs through the system's highly distributed, very high bandwidth cloud interface 210 which is application driven through the use of the Scala/Lift development environment and web interaction operation mediated by AWS ELASTIC BEANSTALK™, both used for standards compliance and ease of development. Much of the business data analyzed by the system both from sources within the confines of the client business, and from cloud-based sources, also enter the system through the cloud interface 210, data being passed to the analysis and transformation components of the system, the directed computational graph module 255, high volume web crawling module 215 and multidimensional time series database 220. The directed computational graph retrieves one or more streams of data from a plurality of sources, which includes, but is in no way not limited to, a number of physical sensors, web-based questionnaires and surveys, monitoring of electronic infrastructure, crowd sourcing campaigns, and human input device information. Within the directed computational graph, data may be split into two identical streams, wherein one sub-stream may be sent for batch processing and storage while the other sub-stream may be reformatted for transformation pipeline analysis. The data is then transferred to general transformer service 260 for linear data transformation as part of analysis or decomposable transformer service 250 for branching or iterative transformations that are part of analysis. The directed computational graph 255 represents all data as directed graphs where the transformations are nodes and the result messages between transformations edges of the graph. These graphs which contain considerable intermediate transformation data are stored and further analyzed within graph stack module 245. High volume web crawling module 215 uses multiple server hosted preprogrammed web spiders to find and retrieve data of interest from web-based sources that are not well tagged by conventional web crawling technology. Multiple dimension time series database module 220 receives data from a large plurality of sensors that may be of several different types. The module is designed to accommodate irregular and high-volume surges by dynamically allotting network bandwidth and server processing channels to process the incoming data. Data retrieved by the multidimensional time series database 220 and the high-volume web crawling module 215 may be further analyzed and transformed into task optimized results by the directed computational graph 255 and associated general transformer service 250 and decomposable transformer service 260 modules.

Results of the transformative analysis process may then be combined with further client directives, additional business rules and practices relevant to the analysis and situational information external to the already available data in the automated planning service module 230 which also runs powerful predictive statistics functions and machine learning algorithms to allow future trends and outcomes to be rapidly forecast based upon the current system derived results and choosing each a plurality of possible business decisions. Using all available data, the automated planning service module 230 may propose business decisions most likely to result is the most favorable business outcome with a usably high level of certainty. Closely related to the automated planning service module in the use of system derived results in conjunction with possible externally supplied additional information in the assistance of end user business decision making, the business outcome simulation module 225 coupled with the end user facing observation and state estimation service 240 allows business decision makers to investigate the probable outcomes of choosing one pending course of action over another based upon analysis of the current available data. For example, the pipelines operations department has reported a very small reduction in crude oil pressure in a section of pipeline in a highly remote section of territory. Many believe the issue is entirely due to a fouled, possibly failing flow sensor, others believe that it is a proximal upstream pump that may have foreign material stuck in it. Correction of both of these possibilities is to increase the output of the effected pump to hopefully clean out it or the fouled sensor. A failing sensor will have to be replaced at the next maintenance cycle. A few, however, feel that the pressure drop is due to a break in the pipeline, probably small at this point, but even so, crude oil is leaking and the remedy for the fouled sensor or pump option could make the leak much worse and waste much time afterwards. The company does have a contractor about 8 hours away, or could rent satellite time to look but both of those are expensive for a probable sensor issue, significantly less than cleaning up an oil spill though and then with significant negative public exposure. These sensor issues have happened before and the business operating system 200 has data from them, which no one really studied due to the great volume of columnar figures, so the alternative courses 225, 240 of action are run. The system, based on all available data predicts that the fouled sensor or pump are unlikely the root cause this time due to other available data and the contractor is dispatched. She finds a small breach in the pipeline. There will be a small cleanup and the pipeline needs to be shut down for repair, but multiple tens of millions of dollars have been saved. This is just one example of a great many of the possible use of the business operating system, those knowledgeable in the art will easily formulate more.

Figure 3:
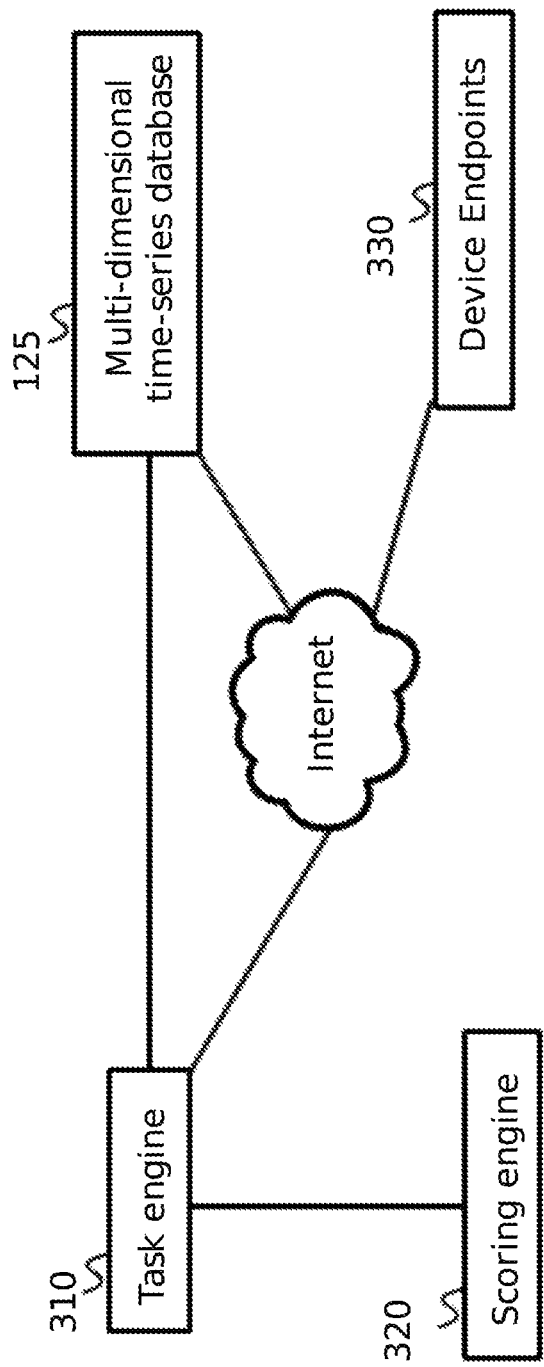
FIG. 3 is a diagram of an exemplary architecture of a cybersecurity analysis system according to an embodiment of the invention.

FIG. 3 is a system diagram, illustrating the connections between crucial components, according to an aspect of the invention. Core components include a scheduling task engine 310 which will run any processes and continue with any steps desired by the client, as described in further methods and diagrams in the disclosure. Tasks may be scheduled to run at specific times, or run for certain given amounts of time, which is commonplace for task scheduling software and systems in the art. This task engine 310 is then connected to the internet, and possibly to a single or plurality of local Multi-Dimensional Time-Series Databases (MDTSDB) 125. It is also possible to be connected to remotely hosted and controlled MDTSDB's 125 through the Internet, the physical location or proximity of the MDTSDB for this disclosure not being a limiting factor. In such cases as the MDTSDB 125 is not hosted locally, it must also maintain a connection to the Internet or another form of network for communication with the task engine 310. Device endpoints 330, especially Internet-of-Things (IoT) devices, are also by definition connected to the internet, and in methods described in later figures will be used for cybersecurity analysis and risk assessment. The task engine 310 which will perform the scheduling and running of the methods described herein also maintains a connection to the scoring engine 320, which will be used to evaluate data gathered from the analysis and reconnaissance tasks run by the task scheduling engine 310.

Figure 4:
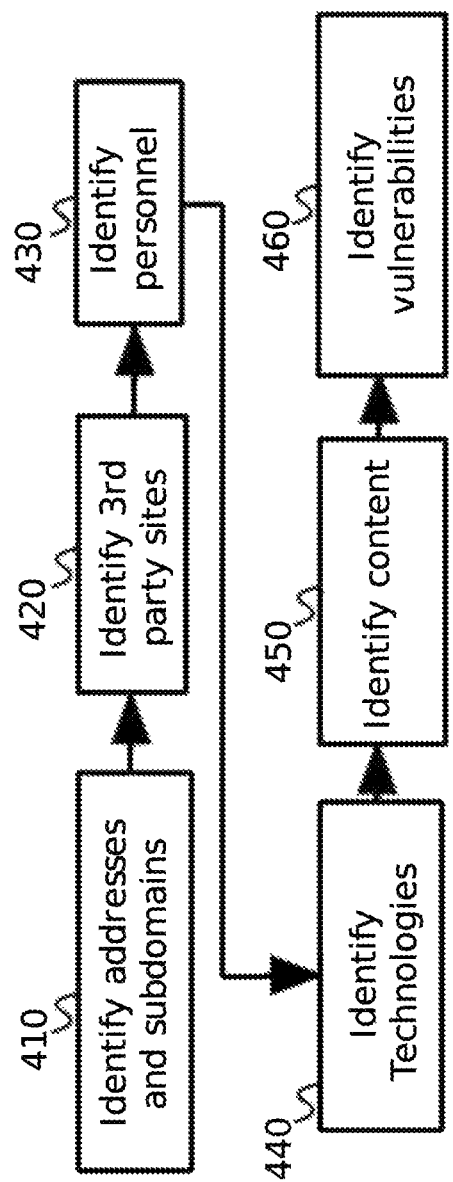
FIG. 4 is a method diagram illustrating key steps in passive cyber reconnaissance activities, according to an aspect.

FIG. 4 is a method diagram illustrating basic reconnaissance activities to establish network information for any given client. A first activity in establishing network boundaries and information is to identify Internet Protocol ("IP") addresses and subdomains 410 of the target network, to establish a scope for the remainder of activities directed at the network. Once you have established network "boundaries" by probing and identifying the target IP addresses and subdomains 410, one can probe for and establish what relationships between the target and third-party or external websites and networks exist 420, if any. It is especially important to examine trust relationships and/or authoritative DNS record resolvers that resolve to external sites and/or networks. A next key step, according to an aspect, is to identify personnel involved with the target network, such as names, email addresses, phone numbers, and other personal information 430, which can be useful for social engineering activities, including illegal activities such as blackmail in extreme cases. After identifying personnel affiliated with the target network, another process in the method, according to an aspect, could be to identify versions and other information about systems, tools, and software applications in use by the target organization 440. This may be accomplished in a variety of ways, whether by examining web pages or database entries if publicly accessible, or by scraping information from the web about job descriptions associated with the organization or similar organizations—other methods to attain this information exist and may be used, however. Another process in the method, according to an aspect, may be to identify content of interest 450 associated with the target, such as web and email portals, log files, backup or archived files, or sensitive information contained within Hypertext Markup Language ("HTML") comments or client-side scripts, such as ADOBE FLASH™ scripts for example. Using the gathered information and other publicly available information (including information which will be gathered in techniques illustrated in other figures), it is possible and critical to then identify vulnerabilities 460 from this available data, which can be exploited.

Figure 5:
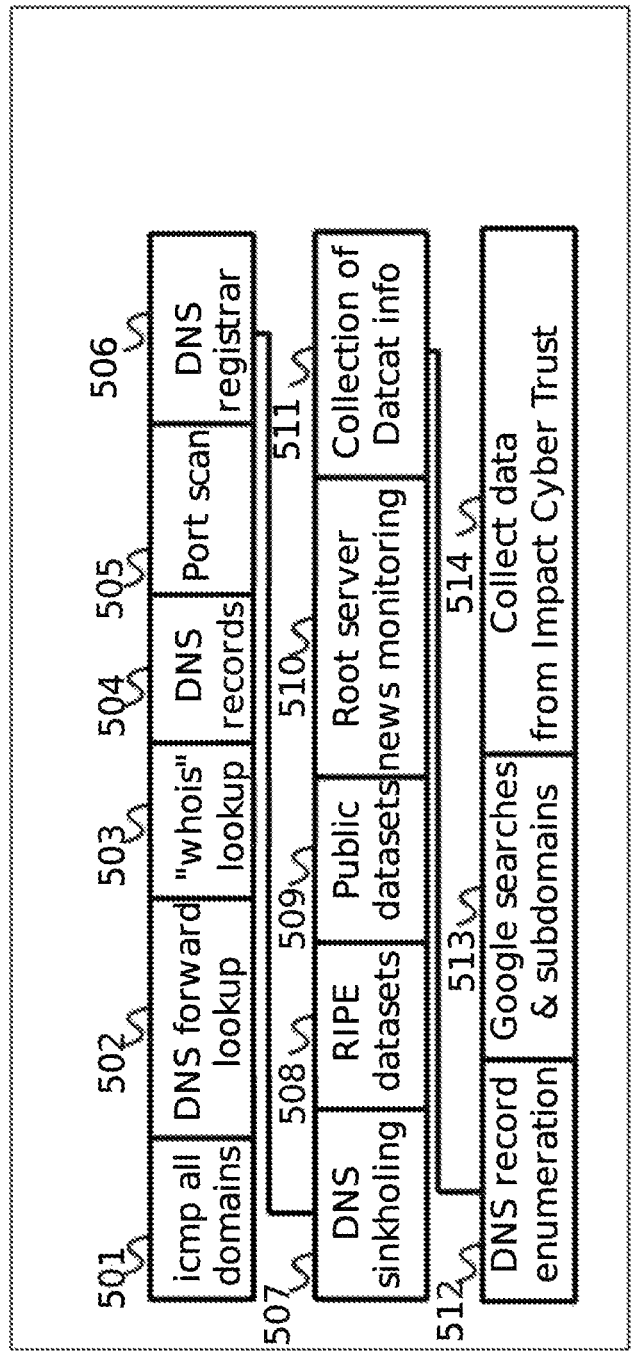
FIG. 5 is a method diagram illustrating activities and key steps in network and internet active reconnaissance, according to an aspect.

FIG. 5 is a method diagram illustrating and describing many activities and steps for network and internet-based reconnaissance for cybersecurity purposes. The first step, according to an aspect, would be to use Internet Control Message Protocol (ICMP) to resolve what IP address each domain of the target resolves as 501. According to an aspect, another process in the method would be to perform a DNS forward lookup 502, using the list of subdomains of the target as input, generating a list of IP addresses as output. It is then possible to see if the IP addresses returned are within the net ranges discovered by a whois—which is a protocol used for querying databases for information related to assignees of an internet resource, including an IP address block, or domain name—check of the target's domain 503, and if not, perform additional whois lookups to determine if new associated net ranges are of interest, and then you may run a reverse DNS Lookup to determine the domains to which those addresses belong. A second use for whois lookups 503 is to determine where the site is hosted, and with what service—for example in the cloud, with Amazon Web Services, Cloudflare, or hosted by the target corporation itself. The next overall step in the process, according to an aspect, is to examine DNS records 504, with reverse IP lookups, and using certain tools such as dnscheck.ripe.net it is possible to see if other organizations share hosting space with the target. Other DNS record checks 504 include checking the Mail Exchange ("MX") record, for the Sender Policy Framework ("SPF") to determine if the domain is protected against emails from unauthorized domains, known commonly as phishing or spam, and other forms of email attack. Further examining the DNS MX record 504 allows one to examine if the target is self-hosting their email or if it is hosted in the cloud by another service, such as, for example, Google. DNS text records 504 may also be gathered for additional information, as defined by an aspect. The next overall step in the process is to conduct a port scan on the target network 505 to identify open TCP/UDP ports, and of any devices immediately recognizable, to find insecure or open ports on target IP addresses. Multiple tools for this exist, or may be constructed. Next, collecting the identity of the target's DNS registrar 506 should be done, to determine more information about their hosting practices. Another action in the method, according to an aspect, is to leverage the technology and technique of DNS sinkholing 507, a situation where a DNS server is set up to spread false information to clients that query information from it. For these purposes, the DNS sinkhole 507 may be used to redirect attackers from examining or connecting to certain target IP addresses and domains, or it can be set up as a DNS proxy for a customer in an initial profiling phase. There are possible future uses for DNS sinkholes 507 in the overall cybersecurity space, such as potentially, for example, allowing a customer to route their own requests through their own DNS server for increased security. The next overall step in network and internet reconnaissance, according to an aspect, is to use Réseaux IP Européens ("RIPE") datasets 508 for analytics, as seen from https://www.ripe.net/analyse/raw-data-sets which comprises: RIPE Atlas Raw Data, RIS Raw Data, Reverse DNS Delegations, IPv6 Web Statistics, RIPE NCC Active Measurements Of World IPv6 Day Dataset, RIPE NCC Active Measurements of World IPv6 Launch Dataset, iPlane traceroute Dataset, NLANR AMP Data, NLANR PMA Data, and WITS Passive Datasets. Another process in the method, according to an aspect, is to collect information from other public datasets 509 from scanning projects produced by academia and the government, including https://scans.io, and https://ant.isi.edu/datasets/all.html. These projects, and others, provide valuable data about the internet, about publicly accessible networks, and more, which may be acquired independently or not, but is provided for the public regardless to use for research purposes, such as cybersecurity evaluations. Another action in the method, according to an aspect, is to monitor the news events from the root server 510, for anomalies and important data which may be relevant to the security of the server. Another process in the method, according to an aspect, is to collect data from DatCat 511, an internet measurement data catalogue, which publicly makes available measurement data gathered from various scans of the internet, for research purposes. Another process in the method, according to an aspect, is to enumerate DNS records 512 from many groups which host website traffic, including Cloudflare, Akamai, and others, using methods and tools already publicly available on websites such as GitHub. Technologies such as DNSRecon and DNSEnum exist for this purpose as well, as recommended by Akamai. Another action in the method, according to an aspect, is to collect and crawl Google search results 513 in an effort to build a profile for the target corporation or group, including finding any subdomains still not found. There is an entire category of exploit with Google searches that exploits the Google search technique and may allow access to some servers and web assets, such as exploits found at https://www.exploit-db.com/google-hacking-database/, and other exploits found online which may be used to help assess a target's security. It is important to see if the target is vulnerable to any of these exploits. Another action in the method, according to an aspect, is to collect information from Impact Cyber Trust 514, which possesses an index of data from many internet providers and may be useful for analyzing and probing certain networks.

Figure 6:
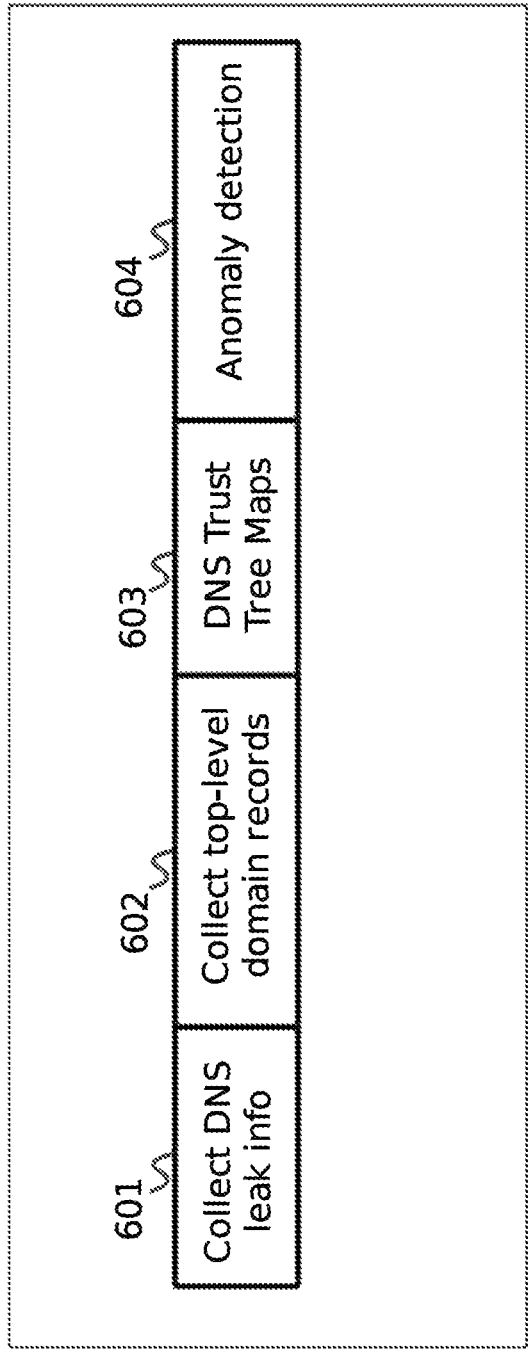
FIG. 6 is a method diagram illustrating activities and key steps in gathering leaked Domain Name Serve ("DNS") information for reconnaissance and control purposes, according to an aspect.

FIG. 6 is a method diagram illustrating key steps in collection of DNS leak information. A first step in this process would be, according to an aspect, to collect periodic disclosures of DNS leak information 601, whereby a user's privacy is insecure because of improper network configuration. A second step, according to an aspect, is to top-level domain records and information about top-level domain record health 602, such as reported by open-source projects available on websites such as GitHub. Another process in the method is to create a Trust Tree map 603 of the target domain, which is an open-source project available on GitHub (https://Github.com/mandatoryprogrammer/Trust-Trees) but other implementations may be used of the same general process. A Trust Tree in this context is a graph generated by following all possible delegation paths for the target domain and generating the relationships between nameservers it comes across. This Trust Tree will output its data to a graph-based Multidimensional Time-Series Database ("MDTSDB"), which grants the ability to record data at different times so as to properly understand changing data and behaviors of these records. The next step in this process is anomaly detection 604 within the Tree Trust graphs, using algorithms to detect if new references are being created in records (possible because of the use of MDTSDB's recording data over time), which may help with alerting one to numerous vulnerabilities that may be exploited, such as if a top level domain is hijacked through DNS record manipulation, and other uses are possible.

Figure 7:
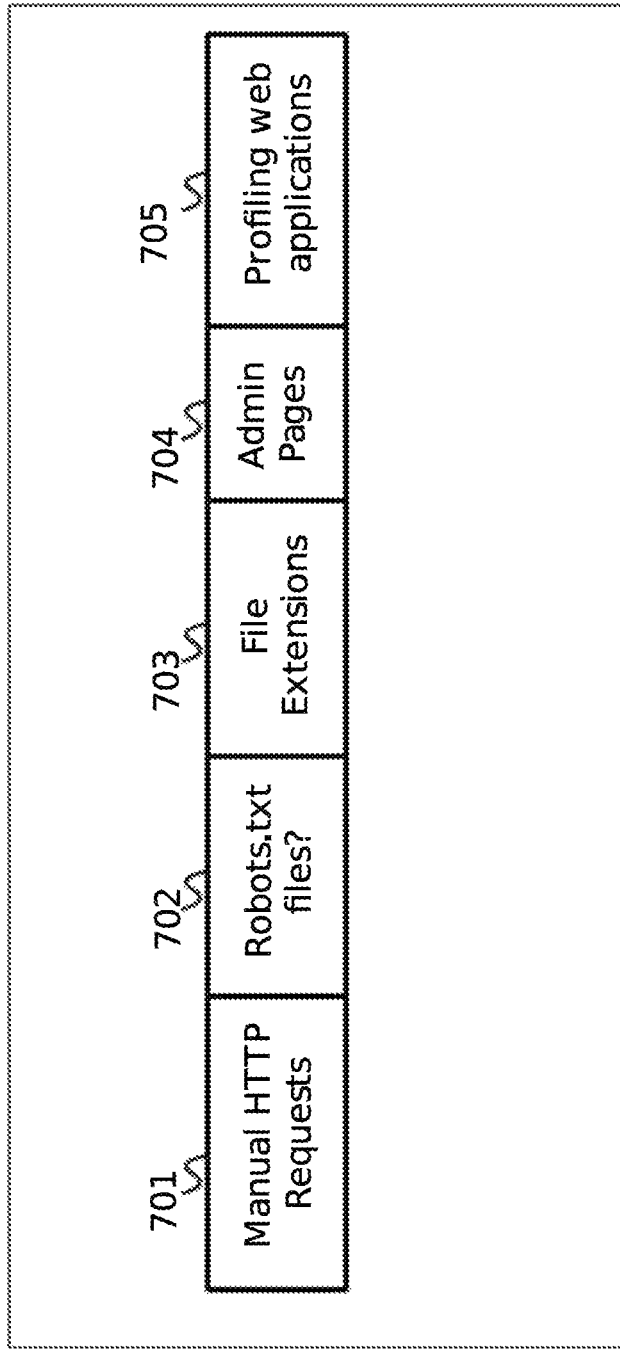
FIG. 7 is a method diagram illustrating activities and key steps in gathering information on web applications and technologies through active reconnaissance, according to an aspect.

FIG. 7 is a method diagram illustrating numerous actions and steps to take for web application reconnaissance. A first step, according to an aspect, is to make manual Hypertext Transfer Protocol ("HTTP") requests 701, known as HTTP/1.1 requests. Questions that are useful for network reconnaissance on the target that may be answered include whether the web server announces itself, and version number returned by the server, how often the version number changes which often indicates patches or technology updates, as examples of data possibly returned by such a request. A second step in the process is to look for a robots.txt file 702, a common type of file used to provide metadata to search engines and web crawlers of many types (including Google). This allows, among other possible things, to possibly determine what content management system (if any) the target may be using, such as Blogger by Google, or the website creation service Wix. Another process in the method for intelligence gathering on the target, is to fingerprint the application layer by looking at file extensions 703, HTML source, and server response headers, to determine what methods and technologies are used to construct the application layer. Another step is to examine and look for/admin pages 704 that are accessible and open to the public internet, which may be a major security concern for many websites and web-enabled technologies. The next step in this category of reconnaissance is to profile the web application of the target based on the specific toolset it was constructed with 705, for example, relevant information might be the WORDPRESS™ version and plugins they use if applicable, what version of ASP.NET™ used if applicable, and more. One can identify technologies from the target from many sources, including file extensions, server responses to various requests, job postings found online, directory listings, login splash pages (many services used to create websites and web applications have common templates used by many users for example), the content of a website, and more. Profiling such technology is useful in determining if they are using outdated or vulnerable technology, or for determining what manner of attacks are likely or targeted towards their specific technologies and platforms.

Figure 8:
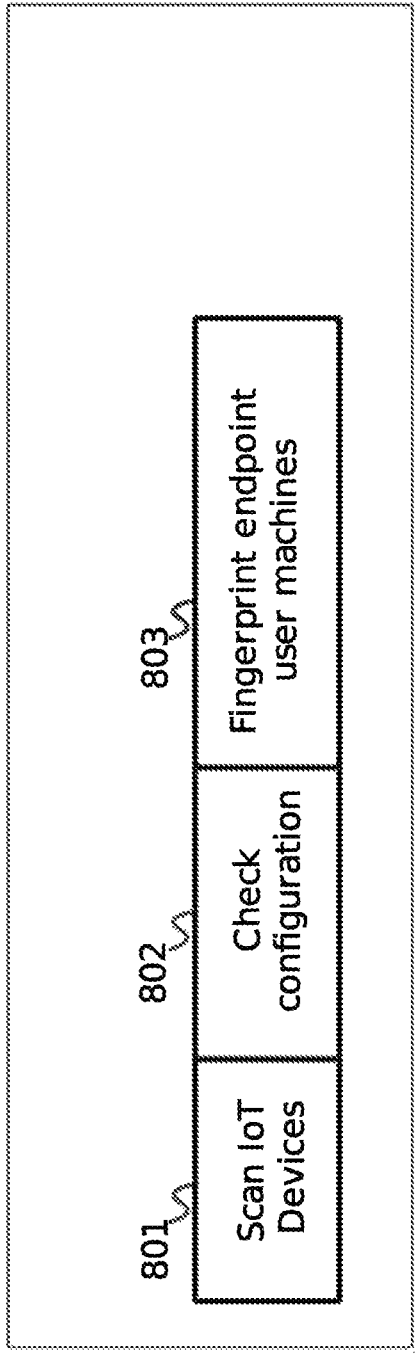
FIG. 8 is a method diagram illustrating activities and key steps in reconnaissance and information gathering on Internet-of-Things ("IOT") devices and other device endpoints, according to an aspect.

FIG. 8 is a method diagram illustrating steps to take for scanning the target for Internet of Things (IoT) devices and other user device endpoints. The first step, according to an aspect, is to scan the target network for IoT devices 801, recognizable often by data returned upon scanning them. Another process in the method, according to an aspect, is to check IoT devices reached to see if they are using default factory-set credentials and configurations 802, the ability to do this being available in open-source scanners such as on the website GitHub. Default settings and/or credentials for devices in many times may be exploited. The next step, according to an aspect, is to establish fingerprints for user endpoint devices 803, meaning to establish identities and information about the devices connected over Transmission Control Protocol/Internet Protocol ("TCP/IP") that are often used by users such as laptops or tablets, and other devices that are internet access endpoints. It is important to establish versions of technology used by these devices when fingerprinting them, to notice and record changes in the MDTSDB in future scans.

Figure 9:
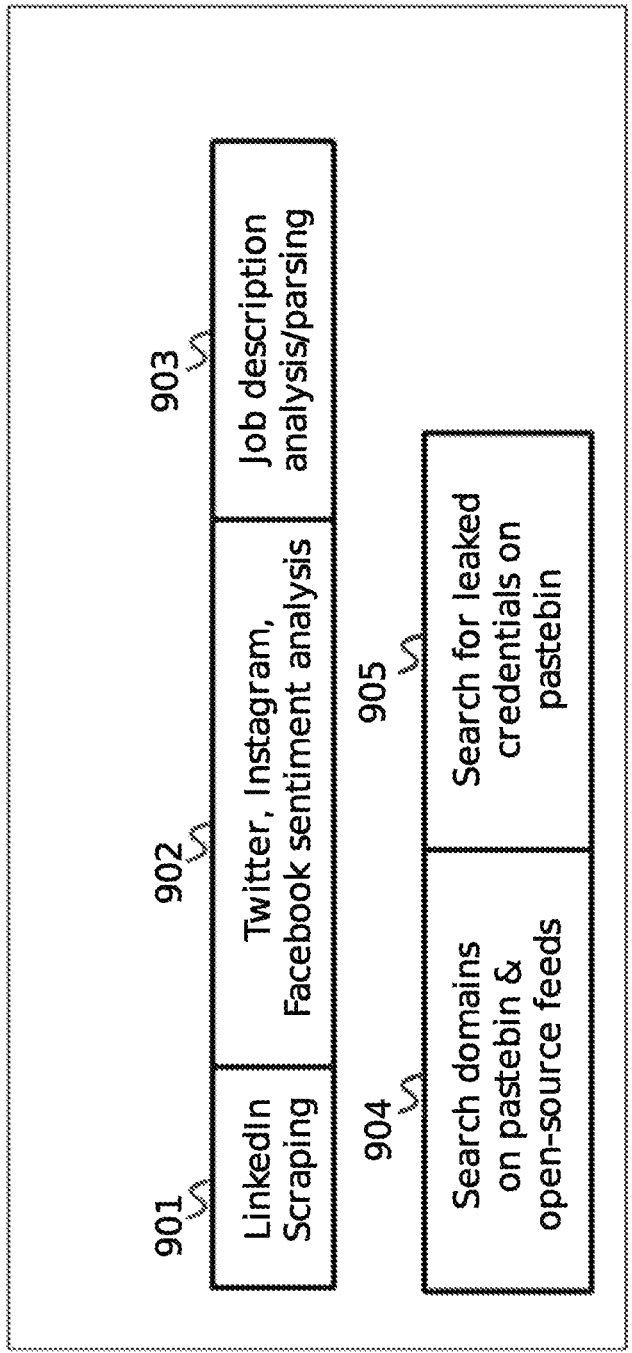
FIG. 9 is a method diagram illustrating activities and key steps in gathering intelligence through reconnaissance of social network and open-source intelligence feeds ("OSINT"), according to an aspect.

FIG. 9 is a method diagram illustrating steps and actions to take to gather information on, and perform reconnaissance on, social networks and open-source intelligence feeds (OSINT). A first step is to scrape the professional social network LinkedIn 901 for useful information, including job affiliations, corporate affiliations, affiliations between educational universities, and more, to establish links between many actors which may be relevant to the security of the target. A second step to take, according to an aspect, is to perform a sentiment analysis on the popular social networks Instagram, Facebook, and Twitter 902. A sentiment analysis may, with proper technology and precision, provide information on potential attackers and agents which may be important to the security of the target, as well as establishing a time-series graph of behavioral changes which may affect the environment of the cybersecurity of the target. Another process in the method, according to an aspect, is to perform a job description analysis/parse 903, from the combination of social networks reviewed, so as to identify multiple pieces of relevant information for the target-such as known technologies used by the target, and possible actors that may be relevant to the target's cybersecurity. More than this, it is also possible that one can find information on actors related to the target that may be used against the target, for example in cases of industrial espionage. Other uses for such information exist relevant to the field of the invention, as in most cases of reconnaissance mentioned thus far. Another process in the method, according to an aspect, is to search domains on Pastebin and other open-source feeds 904. Finding useful information such as personal identifying information, domains of websites, and other hidden information or not-easily-obtained information on public sources such as Pastebin, is of incredible use for cybersecurity purposes. Such feeds and sources of public information are known as OSINT and are known to the field. Other information scrapable from Pastebin includes credentials to applications, websites, services, and more 905, which must be scraped and identified in order to properly mitigate such security concerns. Of particular importance is the identification of leaked credentials, specific to a target domain, that are found to be disclosed in previous breach incidents using open internet/dark web breach collection tools 905.

Figure 10:
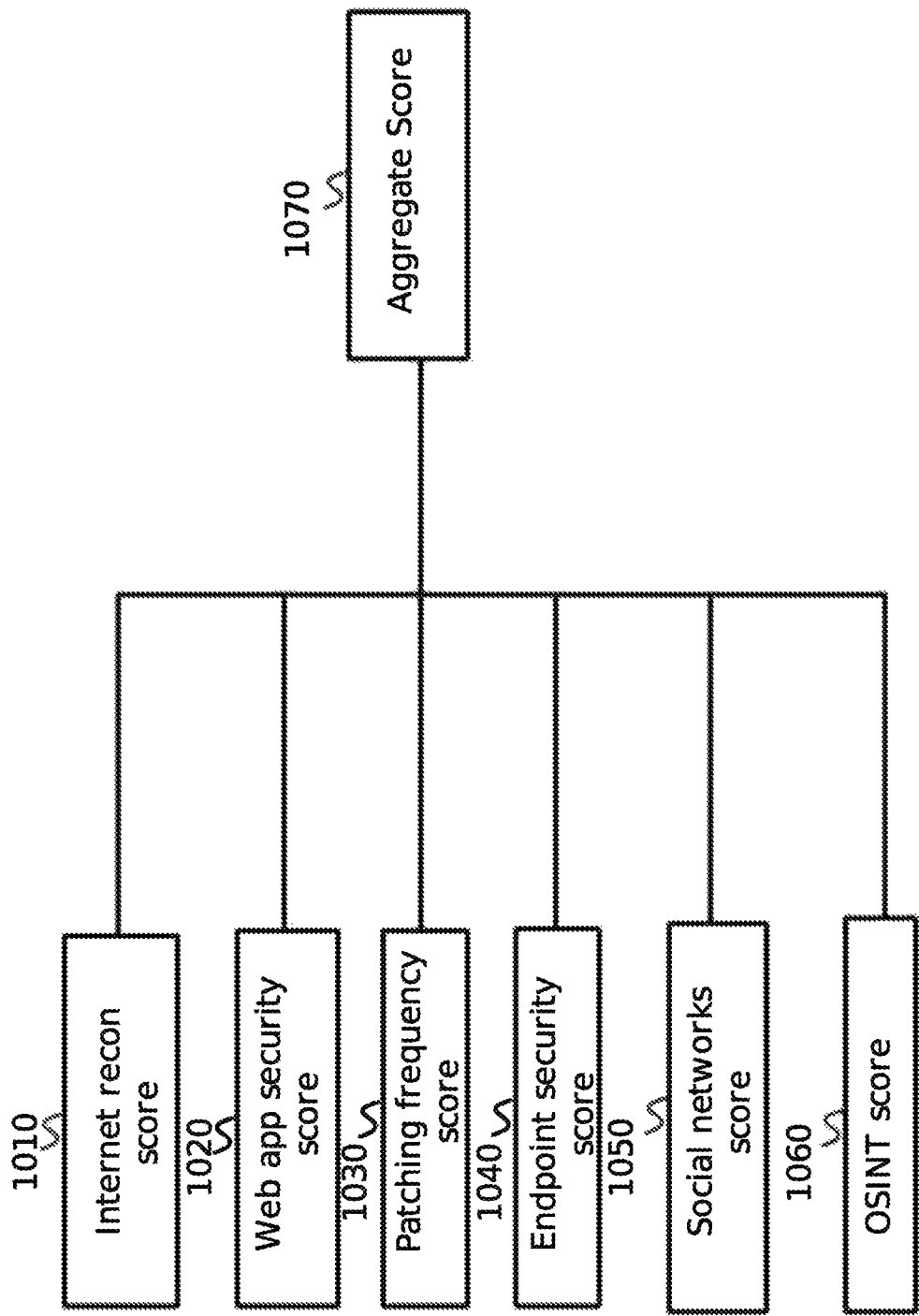
FIG. 10 is a method diagram illustrating the congregation of information from previous methods into a comprehensive cybersecurity score, using a scoring engine, according to an aspect.

FIG. 10 illustrates a basic system for congregating information from several previous methodologies into a comprehensive cybersecurity score of the analyzed target/customer. It is important to note that this scoring only aggregates information and thus scores the security of the target based on externally visible data sets. Once complete and comprehensive reconnaissance has been performed, all information from the internet reconnaissance 1010, FIG. 2, web application security 1020, FIG. 7, patching frequency of the target websites and technologies 1030, FIG. 7, Endpoint and IoT security 1040, FIG. 8, social network security and sentiment analysis results 1050, FIG. 9, and OSINT reconnaissance results 1060, FIG. 9. All of these sources of information are gathered and aggregated into a score, similar to a credit score, for cybersecurity 1070, the scoring method of which may be changed, fine-tuned, and otherwise altered either to suit customer needs or to suit the evolving field of technologies and information relevant to cybersecurity. This score represents the sum total of security from the reconnaissance performed, as far as externally visible data is concerned, a higher score indicating higher security, from a range of 250 to 850. Up to 400 points may be accrued for internet security 1010, up to 200 points may be accrued for web application security 1020, 100 points may be gained for a satisfactory patching frequency of technologies 1030, and all remaining factors 1040, 1050, 1060 of the score may award up to 50 points for the target, if perfectly secure.

Figure 11:
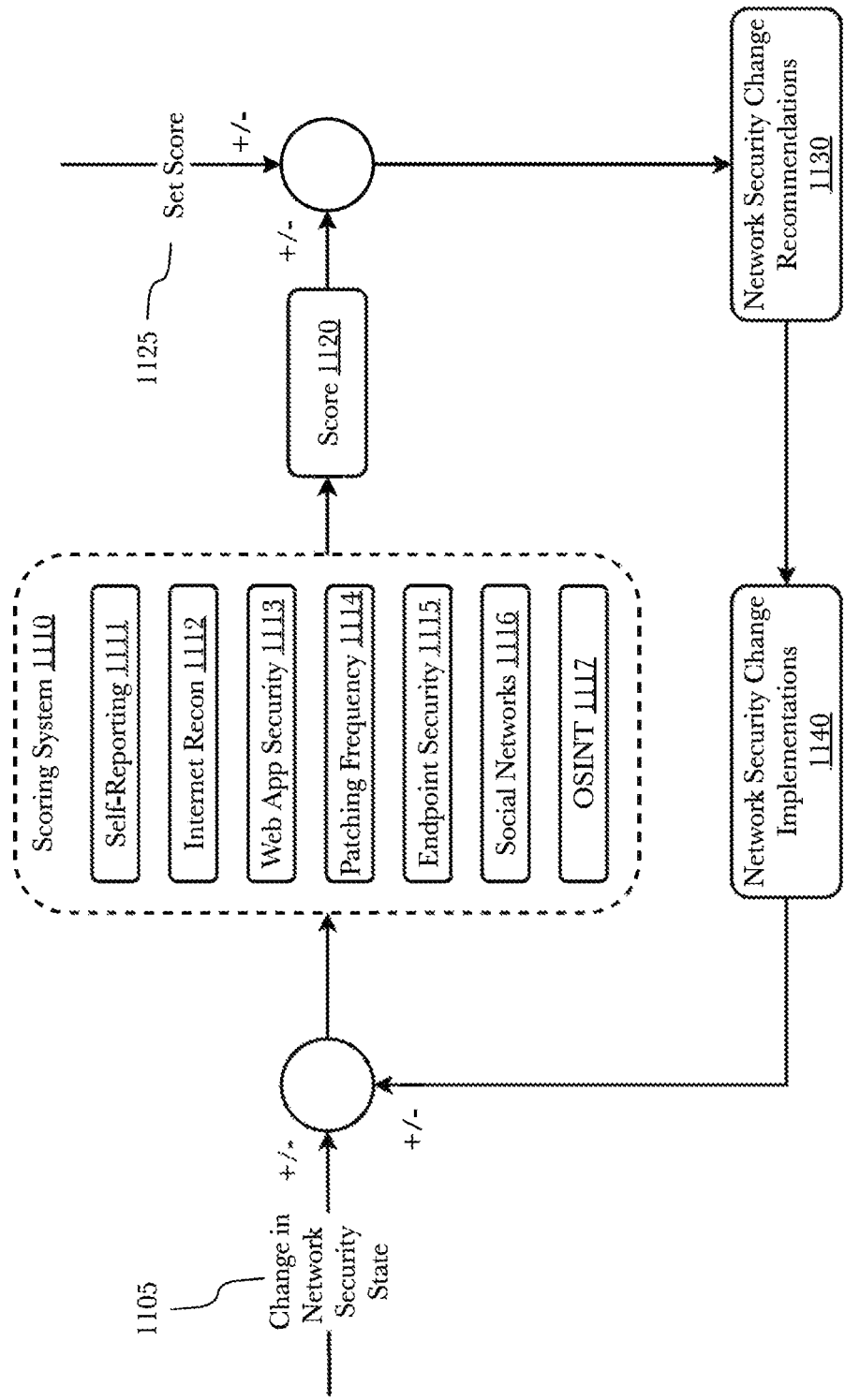
FIG. 11 is diagram illustrating how the scoring system can be used as a feedback loop to establish and maintain a level of security appropriate to a given organization.

FIG. 11 is diagram illustrating how the scoring system can be used as a feedback loop 1100 to establish and maintain a level of security appropriate to a given organization. This feedback loop is similar in function to feedbacks for control systems, and may be implemented in software, hardware, or a combination of the two, and aspects of the control system may be automatically or manually implemented. A scoring system 1110 can be represented as a system comprising subsystems for various aspects of cybersecurity scoring, i.e., self-reporting/self-attestation 1111, internet reconnaissance 1112, web application security 1113, software/firmware updates and patching frequency 1114, endpoint security 1115, social networks 1116, and open source intelligence (OSINT) 1117. Each subsystem representing an aspect of cybersecurity may analyze data gathered for that aspect and generate its own score related to that aspect. The scores from each subsystem may be combined in some fashion to arrive at an overall cybersecurity score 1120 for a given computer system or computer network. This combination may take any number of forms, for example, summation, averaging, weighted averaging, or any other appropriate algorithm or methodology for creating a single score from multiple scores. The overall cybersecurity score 1120 is compared against a score setting 1125, which may be set automatically by the system based on certain parameters, or may be set manually by a user of the system knowledgeable about the organization's infrastructure, risk tolerance, resources, etc. Based on the comparison, network security changes 1130 are recommended, including a recommendation for no change where the overall cybersecurity score 1120 is at or close to the score setting. Where the score 1120 is above or below the set score 1125, changes to network security may be implemented 1140, either automatically or manually, to loosen or tighten network security to bring the score 1120 back into equilibrium with the set score 1125. A change to any one of the aspects of cybersecurity 1111-1117 would constitute a change in the network security state 1105 which, similar to control systems, would act as an input disturbance to the system and propagate through the feedback loop until equilibrium between the score 1120 and set score 1125 is again achieved.

As in control systems, the feedback loop may be dynamically adjusted in order to cause the overall cybersecurity score 1120 to come into equilibrium with the set score 1125, and various methods of accelerating or decelerating network security changes may be used. As one example, a proportional-integral-derivative (PID) controller or a state-space controller may be implemented to predictively reduce the error between the score 1120 and the set score 1125 to establish equilibrium. Increases in the magnitude of the error, accelerations in change of the error, and increases in the time that the error remains outside of a given range will all lead to in corresponding increases in tightening of network security (and vice-versa) to bring the overall cybersecurity score 1120 back into equilibrium with the set score 1125.

Figure 12:
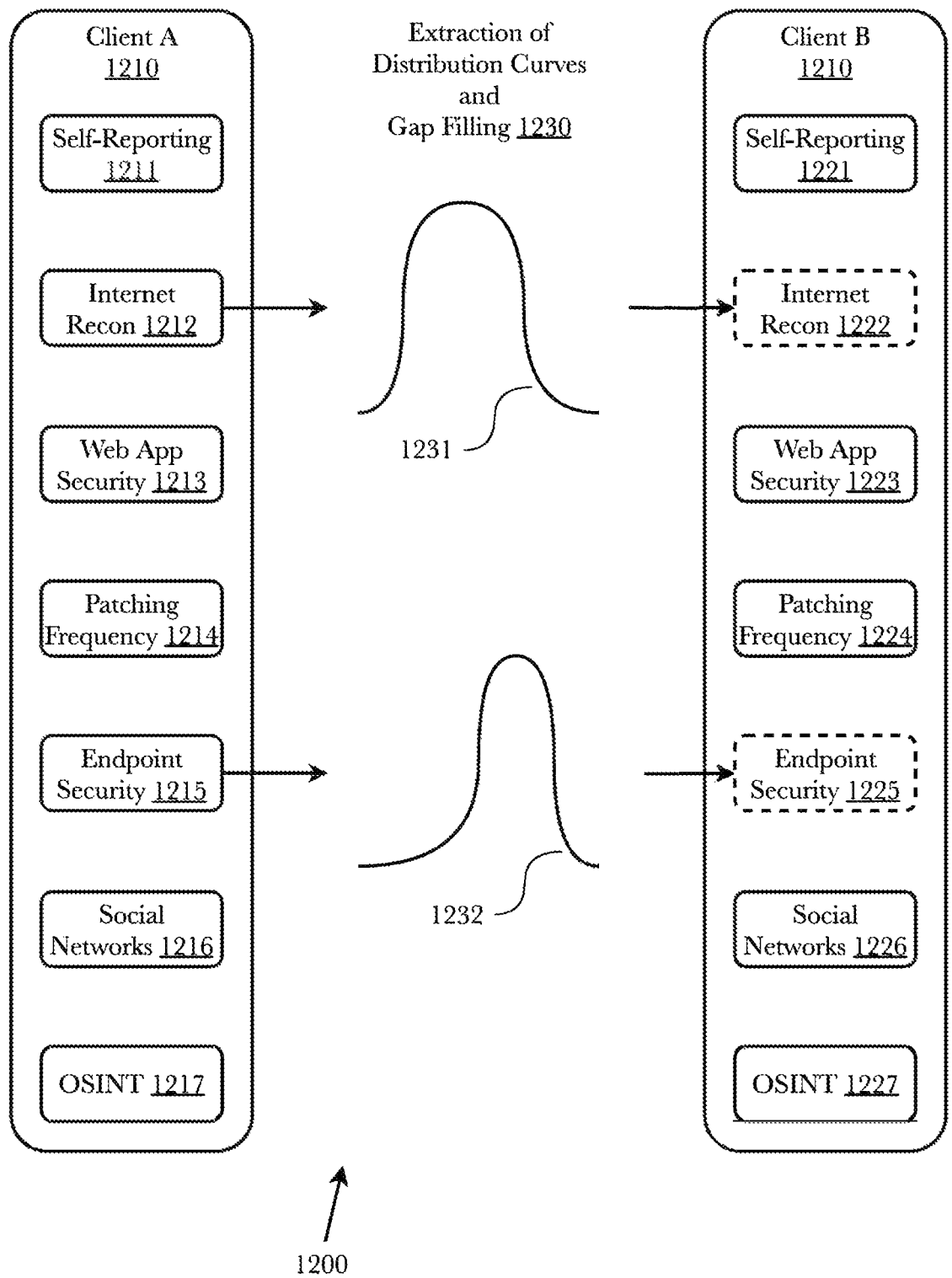
FIG. 12 is diagram illustrating the use of data from one client to fill gaps in data for another client to improve cybersecurity analysis and scoring.

FIG. 12 is diagram illustrating the use of data from one client to fill gaps in data for another client 1200 to improve cybersecurity analysis and scoring. In any given group of organizations, some organizations will have a more complete set of data regarding some aspects of cybersecurity analysis and scoring than other organizations. For example, large corporate clients will have extensive network security logs, a large Internet profile, frequently patched and updated systems, and a large staff of IT professionals to self-report data. Smaller clients and individuals will have little or none of those characteristics, and therefore a much smaller set of data on which to base cybersecurity analyses, recommendations, and scoring. However, generalized data and trends from larger and/or more "data rich" organizations can be used to fill in gaps in data for smaller and/or more "data poor" organizations. In this example, Client A 1210 is a large organization with an extensive Internet presence and a large staff of IT professionals. Thus, the Internet reconnaissance data 1212 for Client A 1210 will contain a broad spectrum of data regarding the organization's online presence and vulnerabilities of that and similar organizations, and the social network data 1226 of Client A will contain a rich set of data for many employees and their usage of social media. Client A's 1210 self-reporting 1211 and other aspects of cybersecurity analysis 1212-1217 are likely to contain much more detailed data than a smaller organization with fewer resources. Client B 1220, on the other hand, is a much smaller organization with no dedicated IT staff. Client B 1220 will have a much smaller Internet presence, possibly resulting in Internet reconnaissance data 1222 containing little or no information available other than whois and DNS records. Client B 1220 is also unlikely to have any substantial social network data 1226, especially where Client B 1220 does not require disclosure of social media usage. Client B's 1220 self-reporting data 1221 and other aspects 1222-1227 are also likely to contain substantially less data, although in this example it is assumed that Client B's 1220 self-reporting data 1221, web app security data 1223, version, update, and patching frequency data 1224, endpoint security 1225, social network data 1226, and OSINT data 1227 are sufficient for cybersecurity analysis.

Extraction of data (e.g., distribution curves) and gap filling 1230 may be used to fill in missing or insufficient data in order to perform more accurate or complete analyses. The distribution, trends, and other aspects 1231 of Client B's 1220 Internet reconnaissance data 1212 and the distribution, trends, and other aspects 1232 of Client B's 1220 social network data 1212 may be extracted and use to fill gaps in Client A's 1210 Internet reconnaissance data 1222 and social network data 1226 to improve cybersecurity analyses for Client A 1210 without requiring changes in Client A's 1210 infrastructure or operations. In some embodiments, synthetic data will be generated from the distributions, trends, and other aspects to use as gap-filling data in a format more consistent with the data for Client A 1210. While a single Client A 1210 and Client B 1220 are shown for purposes of simplicity, this process may be expanded to any number of clients with greater data representation and any number of clients with lesser data representation.

Figure 13:
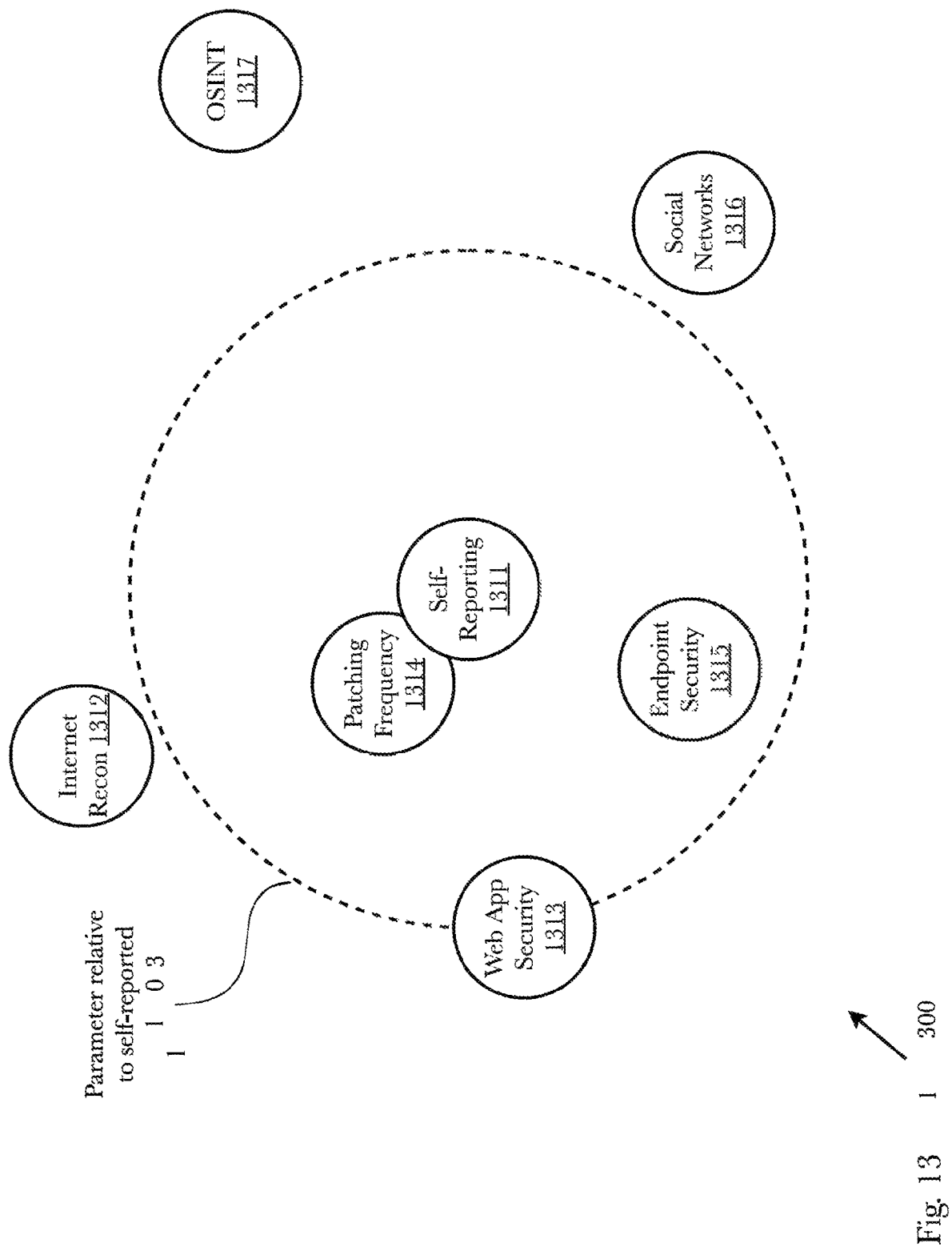
FIG. 13 is a diagram illustrating cross-referencing and validation of data across different aspects of a cybersecurity analysis.

FIG. 13 is a diagram illustrating cross-referencing and validation of data across different aspects of a cybersecurity analysis 1300. For any given parameter, cross-referencing and validation may be performed across data sets representing various aspects of cybersecurity analysis. In this example, a certain parameter 1310 (e.g., number of security breaches in a given area or aspect) is selected from self-reported data 1311 and compared against the same or a similar parameter for other data sets representing aspects of cybersecurity analysis 1312-1317. A range or threshold may be established for the parameter 1310, as represented by the dashed line. The relative distance from the self-reported data 1311 may be calculated, and aspects of cybersecurity falling outside of the range or threshold may be identified. In this example, for instance, versions, updates, and patching frequency 1314 are relatively close to the self-reported data 1311 and fall within the threshold established for the parameter 1310. Endpoint security 1315 and web app security 1313 are further from the self-reported value 1311, but still within the range or threshold of the parameter 1310. However, the values for Internet reconnaissance 1312, social networks 1316, and OSINT 1317 fall outside of the range or threshold of the parameter 1310, and therefore warrant further action. The action may be, for example, re-assessing the scores associated with patching frequency 1314, endpoint security 1315, and social networks 1316 to ensure that the data for those aspects is consistent and/or valid, or other measures designed to improve scoring accuracy and consistency.

Figure 14:
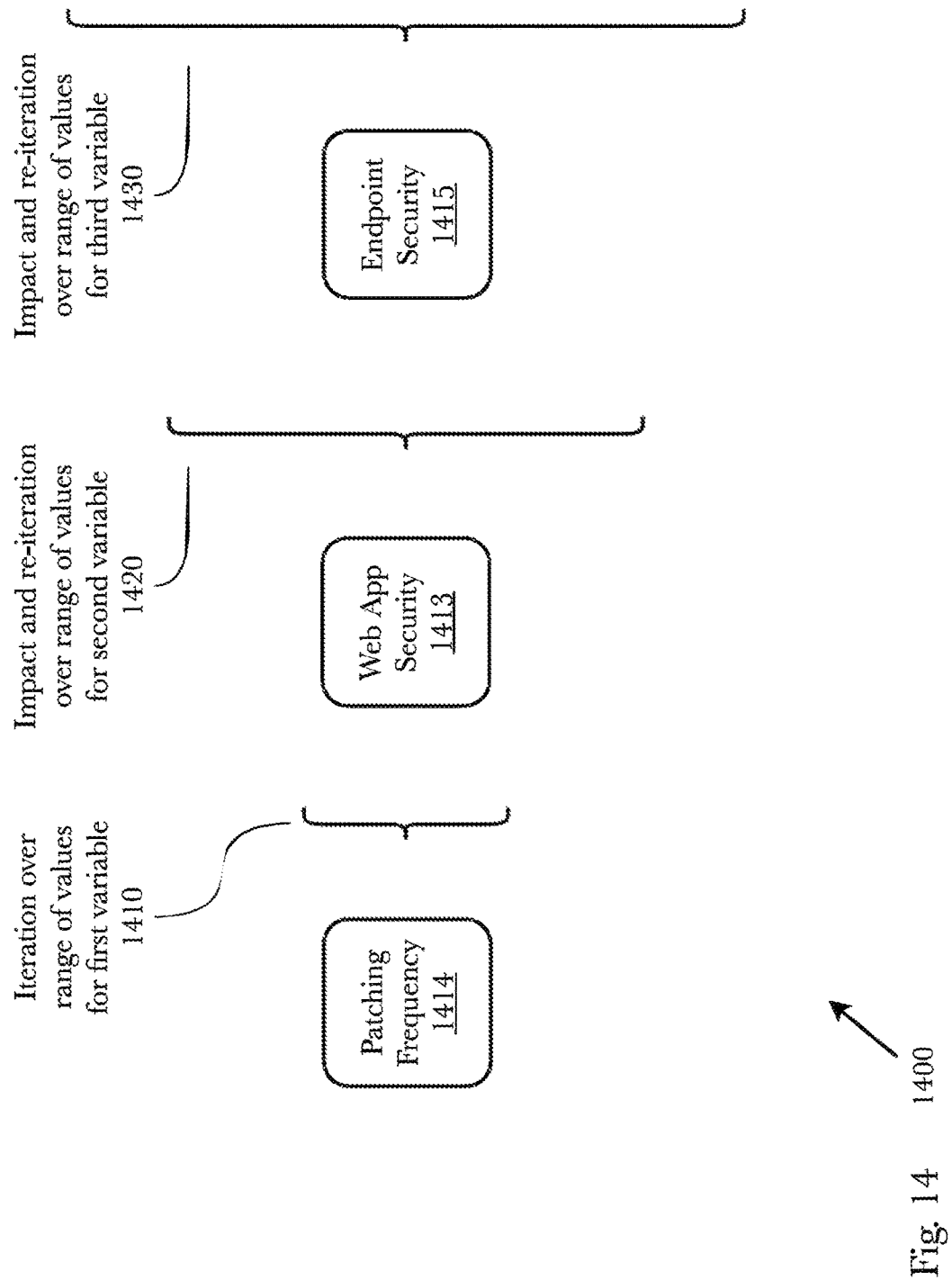
FIG. 14 is a diagram illustrating parametric analysis of an aspect of cybersecurity analysis.

FIG. 14 is a diagram illustrating parametric analysis of an aspect of cybersecurity analysis 1400. Parametric analysis is the process of iterating an analysis over a range of values of a parameter to see how the different values of the parameter affect the overall system in which the parameter is used. In this example, patching frequency 1414 is used as the parameter with the range of value 1410 ranging, for example, from none to daily. As the patching frequency 1414 parameter is iterated over the range of values 1410, its impact is evaluated on web app security 1413, which is likely to have a broader impact and range of values 1420 which, in turn, will have knock-on impacts and a likely broader range of values 1430 for endpoint security 1415. While it is not necessarily the case that parametric analysis will increase the range of values at each stage of analysis of the overall system, parametric analysis over complex systems tends to have an exponentially increasing set of possible outcomes. Various methodologies may be used to reduce complexity, state space, and uncertainty in parametric analyses of complex systems.

Figure 15:
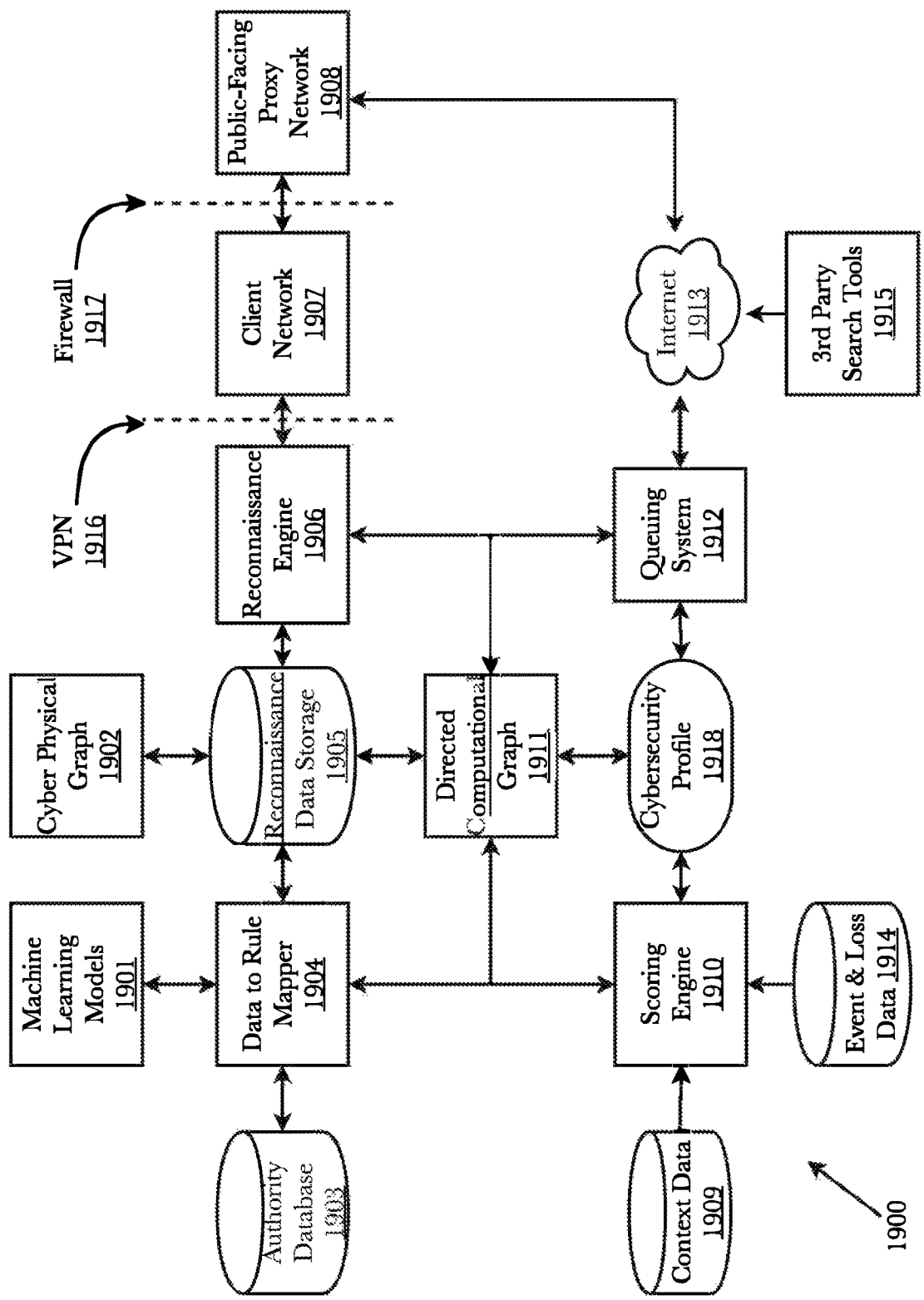
FIG. 15 is a block diagram showing an exemplary system architecture for a system for cybersecurity profiling and rating.

FIG. 15 is a block diagram showing an exemplary system architecture 1900 for a system for cybersecurity profiling and rating. The system in this example contains a cyber-physical graph 1902 which is used to represent a complete picture of an organization's infrastructure and operations including, importantly, the organization's computer network infrastructure particularly around system configurations that influence cybersecurity protections and resiliency. The system further contains a directed computational graph 1911, which contains representations of complex processing pipelines and is used to control workflows through the system such as determining which third-party search tools 1915 to use, assigning search tasks, and analyzing the cyber-physical graph 1902 and comparing results of the analysis against reconnaissance data received from the reconnaissance engine 1906 and stored in the reconnaissance data storage 1905. In some embodiments, the determination of which third-party search tools 1915 to use and assignment of search tasks may be implemented by a reconnaissance engine 1906. The cyber-physical graph 1902 plus the analyses of data directed by the directed computational graph on the reconnaissance data received from the reconnaissance engine 1906 are combined to represent the cyber-security profile 1918 of the client organization whose network 1907 is being evaluated. A queuing system 1912 is used to organize and schedule the search tasks requested by the reconnaissance engine 1906. A data to rule mapper 1904 is used to retrieve laws, policies, and other rules from an authority database 1903 and compare reconnaissance data received from the reconnaissance engine 1906 and stored in the reconnaissance data storage 1905 against the rules in order to determine whether and to what extent the data received indicates a violation of the rules. Machine learning models 1901 may be used to identify patterns and trends in any aspect of the system, but in this case are being used to identify patterns and trends in the data which would help the data to rule mapper 1904 determine whether and to what extent certain data indicate a violation of certain rules. A scoring engine 1910 receives the data analyses performed by the directed computational graph 1911, the output of the data to rule mapper 1904, plus event and loss data 1914 and contextual data 1909 which defines a context in which the other data are to be scored and/or rated. A public-facing proxy network 1908 (typically implemented through a proxy server) is established outside of a firewall 1917 around the client network 1907 both to control access to the client network from the Internet 1913, and to provide the ability to change the outward presentation of the client network 1907 to the Internet 1913, which may affect the data obtained by the reconnaissance engine 1906. In some embodiments, certain components of the system may operate outside the client network 1907 and may access the client network through a secure, encrypted virtual private network (VPN) 1916, as in a cloud-based or platform-as-a-service implementation, but in other embodiments some or all of these components may be installed and operated from within the client network 1907.

As a brief overview of operation, information is obtained about the client network 1907 and the client organization's operations, which is used to construct a cyber-physical graph 1902 representing the relationships between devices, users, resources, and processes in the organization, and contextualizing cybersecurity information with physical and logical relationships that represent the flow of data and access to data within the organization including, in particular, network security protocols and procedures. The directed computational graph 1911 containing workflows and analysis processes, selects one or more analyses to be performed on the cyber-physical graph 1902. Some analyses may be performed on the information contained in the cyber-physical graph, and some analyses may be performed on or against the cyber-physical graph using information obtained from the Internet 1913 from reconnaissance engine 1906. The workflows contained in the directed computational graph 1911 select one or more search tools to obtain information about the organization from the Internet 1915, and may comprise one or more third-party search tools 1915 available on the Internet. As data are collected, they are fed into a reconnaissance data storage 1905, from which they may be retrieved and further analyzed. Comparisons are made between the data obtained from the reconnaissance engine 1906, the cyber-physical graph 1902, the data to rule mapper, from which comparisons a cybersecurity profile of the organization is developed. The cybersecurity profile is sent to the scoring engine 1910 along with event and loss data 1914 and context data 1909 for the scoring engine 1910 to develop a score and/or rating for the organization that takes into consideration both the cybersecurity profile, context, and other information.

Figure 16:
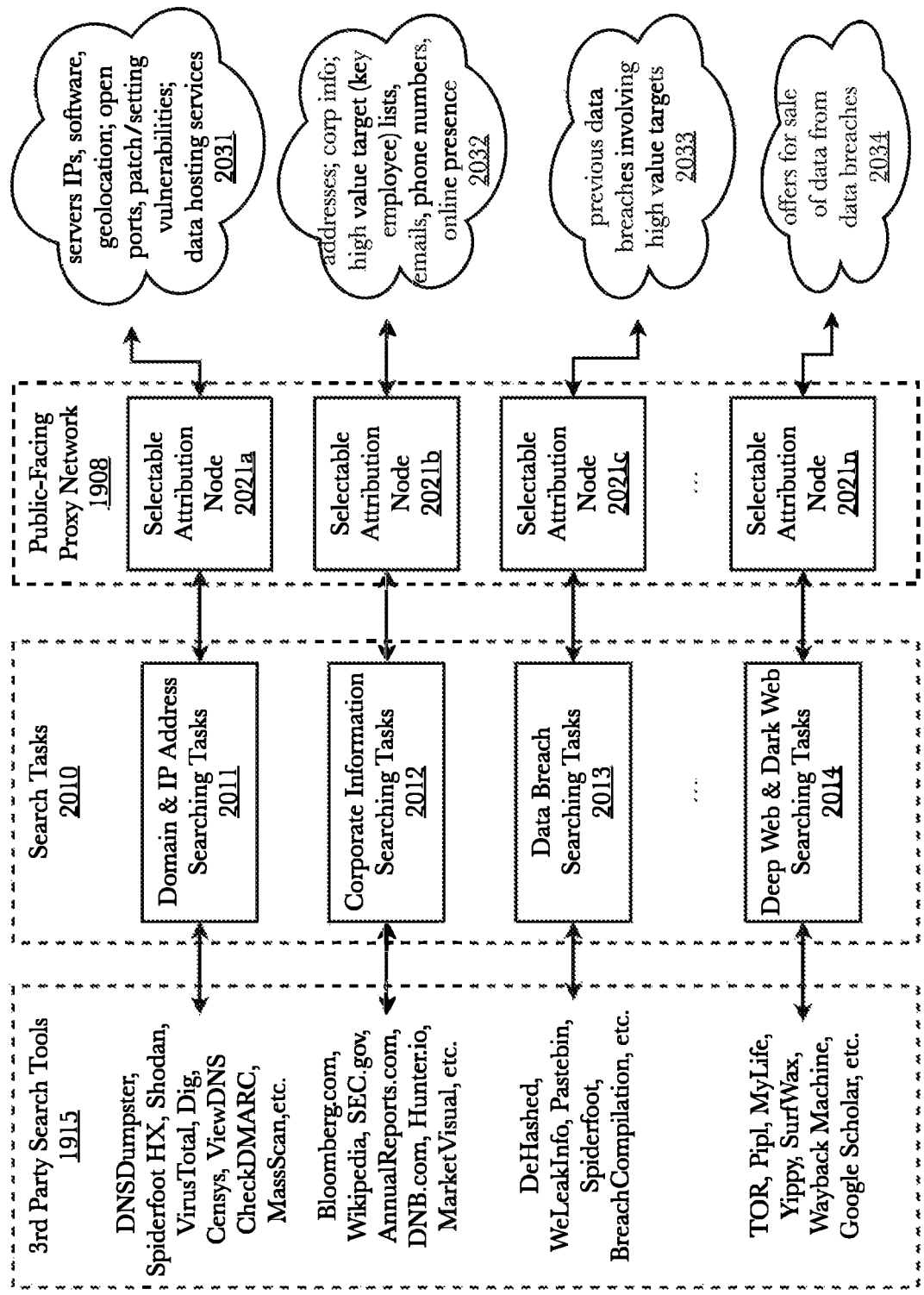
FIG. 16 is a relational diagram showing the relationships between exemplary $3^{rd}$ party search tools, search tasks that can be generated using such tools, and the types of information that may be gathered with those tasks.

FIG. 16 is a relational diagram showing the relationships between exemplary third-party search tools 1915, search tasks 2010 that can be generated using such tools, and the types of information that may be gathered with those tasks 2011-2014, and how a public-facing proxy network 1908 (typically implemented through a proxy server) may be used to influence the search task results. While the use of third-party search tools 1915 is in no way required, and proprietary or other self-developed search tools may be used, there are numerous third-party search tools 1915 available on the Internet, many of them available for use free of charge, that are convenient for purposes of performing external and internal reconnaissance of an organization's infrastructure. Because they are well-known, they are included here as examples of the types of search tools that may be used and the reconnaissance data that may be gathered using such tools. The search tasks 2010 that may be generated may be classified into several categories. While this category list is by no means exhaustive, several important categories of reconnaissance data are domain and internet protocol (IP) address searching tasks 2011, corporate information searching tasks 2012, data breach searching tasks 2013, and dark web searching tasks 2014. Third-party search tools 1915 for domain and IP address searching tasks 2011 include, for example, DNSDumpster, Spiderfoot HX, Shodan, VirusTotal, Dig, Censys, ViewDNS, and CheckDMARC, among others. These tools may be used to obtain reconnaissance data about an organization's server IPs, software, geolocation; open ports, patch/setting vulnerabilities; data hosting services, among other data 2031. Third-party search tools 1915 for corporate information searching tasks 2012 include, for example, Bloomberg.com, Wikipedia, SEC.gov, AnnualReports.com, DNB.com, Hunter.io, and MarketVisual, among others. These tools may be used to obtain reconnaissance data about an organization's addresses; corporate info; high value target (key employee or key data assets) lists, emails, phone numbers, online presence 2032. Third party search tools 1915 for data breach searching tasks 2013 include, for example, DeHashed, WeLeakInfo, Pastebin, Spiderfoot, and BreachCompilation, among others. These tools may be used to obtain reconnaissance data about an organization's previous data breaches, especially those involving high value targets, and similar data loss information 2033. Third party search tools 1915 for deep web (reports, records, and other documents linked to in web pages, but not indexed in search results . . . estimated to be 90% of available web content) and dark web (websites accessible only through anonymizers such as TOR . . . estimated to be about 6% of available web content) searching tasks 2014 include, for example, Pipl, MyLife, Yippy, SurfWax, Wayback machine, Google Scholar, DuckDuckGo, Fazzle, Not Evil, and Start Page, among others. These tools may be used to obtain reconnaissance data about an organization's lost and stolen data such as customer credit card numbers, stolen subscription credentials, hacked accounts, software tools designed for certain exploits, which organizations are being targeted for certain attacks, and similar information 2034. A public-facing proxy network 1908 may be used to change the outward presentation of the organization's network by conducting the searches through selectable attribution nodes 2021*a-n*, which are configurable to present the network to the Internet in different ways such as, but not limited to, presenting the organization network as a commercial IP address, a residential IP address, or as an IP address from a particular country, all of which may influence the reconnaissance data received using certain search tools.

Figure 17:
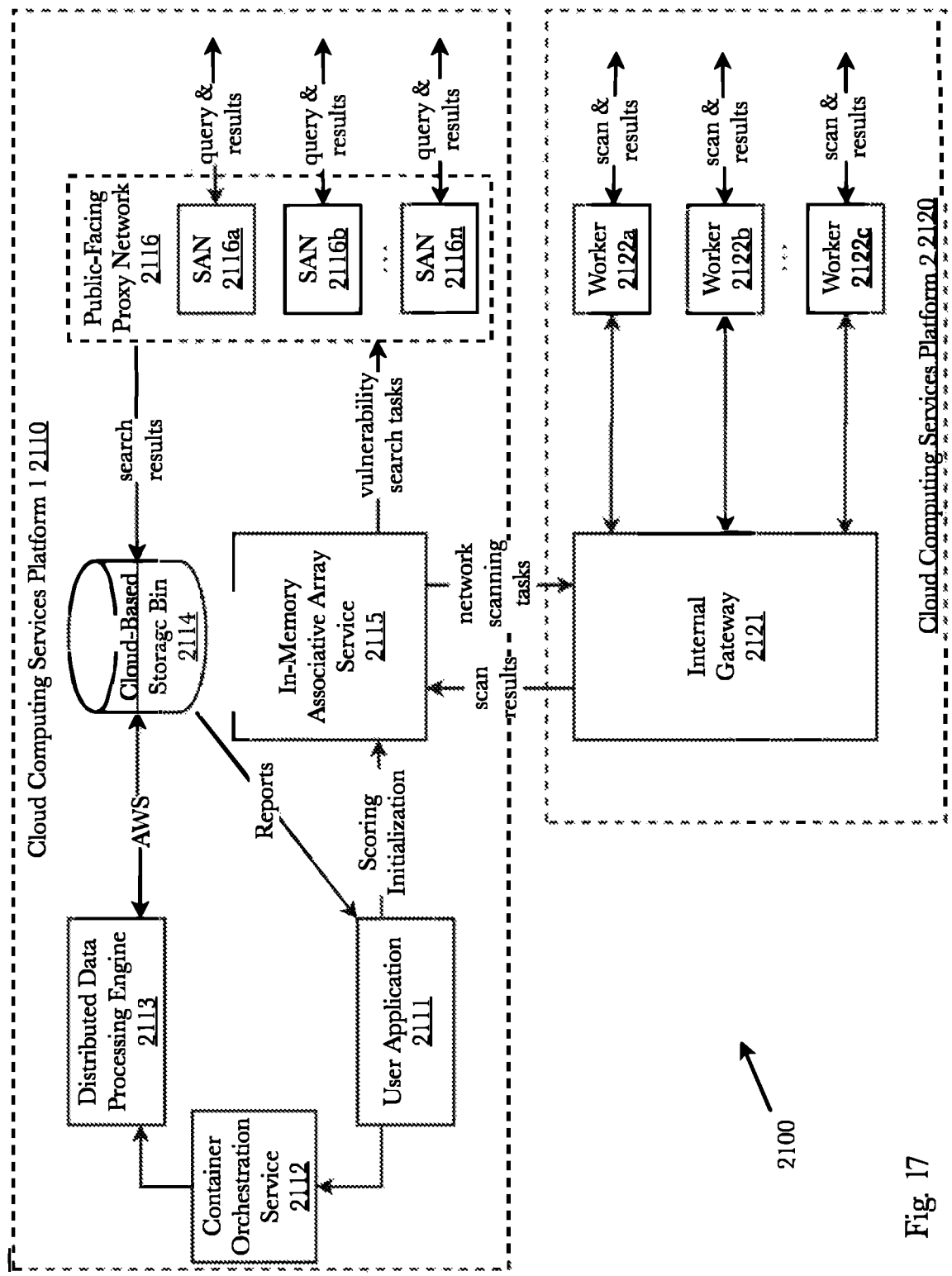
FIG. 17 is a block diagram showing an exemplary system architecture for a system for cybersecurity reconnaissance, analysis, and score generation using distributed systems.

FIG. 17 is a block diagram showing an exemplary system architecture 2100 for a system for cybersecurity reconnaissance, analysis, and score generation using distributed systems. In this embodiment, the system comprises distributed computing services on two cloud computing services platforms 2100, 2120. The core of the system comprises several distributed systems constructed on a cloud computing service platform 1 2110, which is the primary cloud computing platform. The distributed systems comprise a user application 2111, an optional container orchestration service 2112, a distributed data processing engine 2113, cloud-based storage bins 2114, and a public-facing proxy network 2116. For certain tasks that are restricted or not supported by cloud computing services platform 1 2110, those tasks may be offloaded to cloud computing services platform 2 2120, through an internal gateway 2121, which manages the offloaded tasks and sends back task results.

The user application 2111 provides the interface and control system from which cybersecurity reconnaissance, analysis, and scoring activities may be managed. The user application 2111 may be used to enter network parameters for investigation (e.g., a particular domain name), initiate the reconnaissance process, receive reconnaissance reports, and display scoring results. Advanced features allow the user to containerize each of the distributed services and scale the system by creating multiple instances of the distributed services.

The in-memory associative array service 2115 provides a high-performance means of database storage and access via a RESTful interface. In effect, it acts simultaneously as data storage and a data cache, such that data is instantly available without having to read it from non-volatile storage such as a hard drive. Data from an in-memory associative array service 2115 is backed up to non-volatile storage but is always accessed in-memory during usage. The in-memory associative array service 2115 is used to queue an arbitrary number of vulnerability search tasks. An example of an in-memory associative array service 2115 implementation is Redis which is open source, in-memory data structure store, that can be used as a database, cache and message broker.

The cloud-based storage bin 2114 (e.g., Amazon S3 storage) are used to store the results of vulnerability searches produced through the public-facing proxy network 2116. Cloud-based storage bins 2114 provide a highly convenient means of utilizing dynamically scalable storage, such that storage of vulnerability search results can be scaled as necessary to keep up with the queue of search tasks generated by the in-memory associative array service 2115.

After vulnerability search results have been obtained and stored in the cloud-based storage bin 2114, they may be analyzed using a distributed data processing engine (e.g., Apache Spark or serverless infrastructure). The advantage of using a distributed data processing engine 2113 to conduct the analyses is that it can be scaled to perform parallel processing of the large amount of data that will be retrieved for large, complex networks.

The public-facing proxy network 2116 may be used to change the outward presentation of the organization's network by conducting the searches through selectable attribution nodes 2116a-n, which are configurable to present the network to the Internet in different ways such as, but not limited to, presenting the organization network as a commercial IP address, a residential IP address, or as an IP address from a particular country, all of which may influence the reconnaissance data received using certain search tools. Vulnerabilities search tasks queued by the in-memory associative array service 2115 send out queries and receive results through an appropriate selectable attribution node 2116a-n. The search results are stored in the cloud-based storage bin 2114.

Each of these distributed services may be instantiated in a container, and the set of containers may be created and managed using a container orchestration service 2112 (e.g., Kubernetes). While not necessarily required, containerization of the various distributed system components provides a number of advantages, including scalability, efficiency, portability, and security.

Some cloud-based systems either restrict or do not support certain operations within their platforms. For example, Amazon Web Services restricts network scanning on its platform. In such cases, a portion of the operations of the system may need to be offloaded to a different cloud-based platform. In this embodiment, for example, a cloud computing services platform 2120 is used to perform the network scanning activities not allowed on cloud computing services platform 1 2110. An internal gateway 2121 is used to manage the offloaded scanning tasks and return the scan results. An internal gateway is an interface on the internal network configured as a gateway for applying security policy for access to internal resources. When used in conjunction with user identification and host intrusion prevention (HIP) checks, an internal gateway can be used to provide a secure, accurate method of identifying and controlling traffic by user and/or device state. The scanning tasks queued by the in-memory associative array 2155 and offloaded to the cloud computing services platform 2 2120 through the internal gateway 2121 are completed using a series of service workers 2122a-n, which execute the scanning tasks and return the results. While not shown, a public-facing proxy network 2116 may also be used to execute the offloaded scanning tasks.

Figure 18:
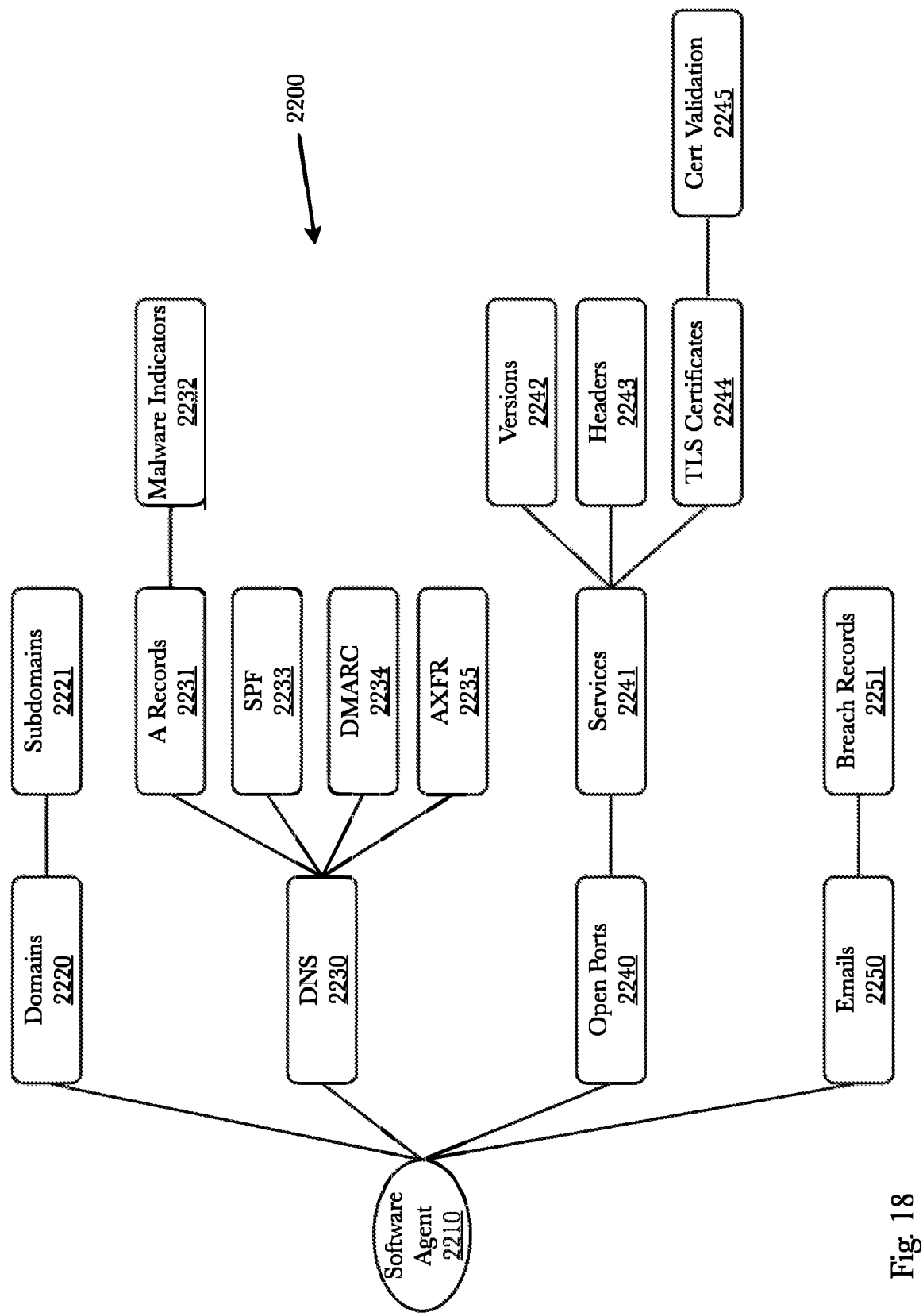
FIG. 18 is a relational diagram showing relations between exemplary types of information that may be gathered by a software agent for cybersecurity reconnaissance, analysis, and score generation.

FIG. 18 is a relational diagram showing relations between exemplary types of information 2200 that may be gathered by a software agent for cybersecurity reconnaissance, analysis, and score generation. A software agent 2210 is instantiated to implement one or more of the vulnerability search tasks in the queue of such tasks managed by the in-memory associative array service 2115. A non-exhaustive list of types of information that may be gathered by the software agent includes domain names 2220, domain name system (DNS) information 2230, open port scan results 2240, and email addresses and related information 2250.

An internal gateway is an interface on the internal network configured to apply security policy for access to internal resources. When used in conjunction with User-ID and/or HIP checks, an internal gateway can be used to provide a secure, accurate method of identifying and controlling traffic by user and/or device state.

Domain names 2220 are a primary input for reconnaissance, and from them subdomain 2221 and related domain information may be obtained as search results.

Domain name system (DNS) records 2230 can be searched to obtain a number of different types of DNS information. A records 2231 are the numerical IP address(es) (in the format xxx.xx.xx.xxx) assigned to a given domain name (e.g., www.example.com). Sender policy framework (SPF) records 2233 are used to indicate to mail exchanges which hosts are authorized to send mail for a domain. SPF records 2233 are typically defined using plain text. Domain-based message authentication, reporting, and conformance (DMARC) records 2234 are email authentication, policy, and reporting protocols that help email receivers determine if the purported message aligns with what the receiver knows about the sender, making it easier to identify spam or phishing messages, and filter them out of inboxes. DNS zone transfers records (AXFR) are protocols 2235 used to replicate DNS records across DNS servers. To avoid the need to edit information on multiple DNS servers, information can be edited on one server and copied to other servers using AXFR protocols. Unprotected servers containing AXFR information can disclose information about related host servers.

A primary avenue of cyberattack uses open ports to gain access to networks. Open port scans 2240 probe the ports of a network to determine whether any ports are left open, providing an avenue of attack on the network. Open port scans 2240 can also reveal information about services 2241 connected to those ports, and further version information 2242, header information 2243 and TLS certificate information 2244 about those services. Any discovered TLS certificates can be checked for validity 2245.

Email addresses 2250 can be provided by the organization, which may be checked against breach records 2251 in the public domain containing lists of compromised email addresses.

Figure 19:
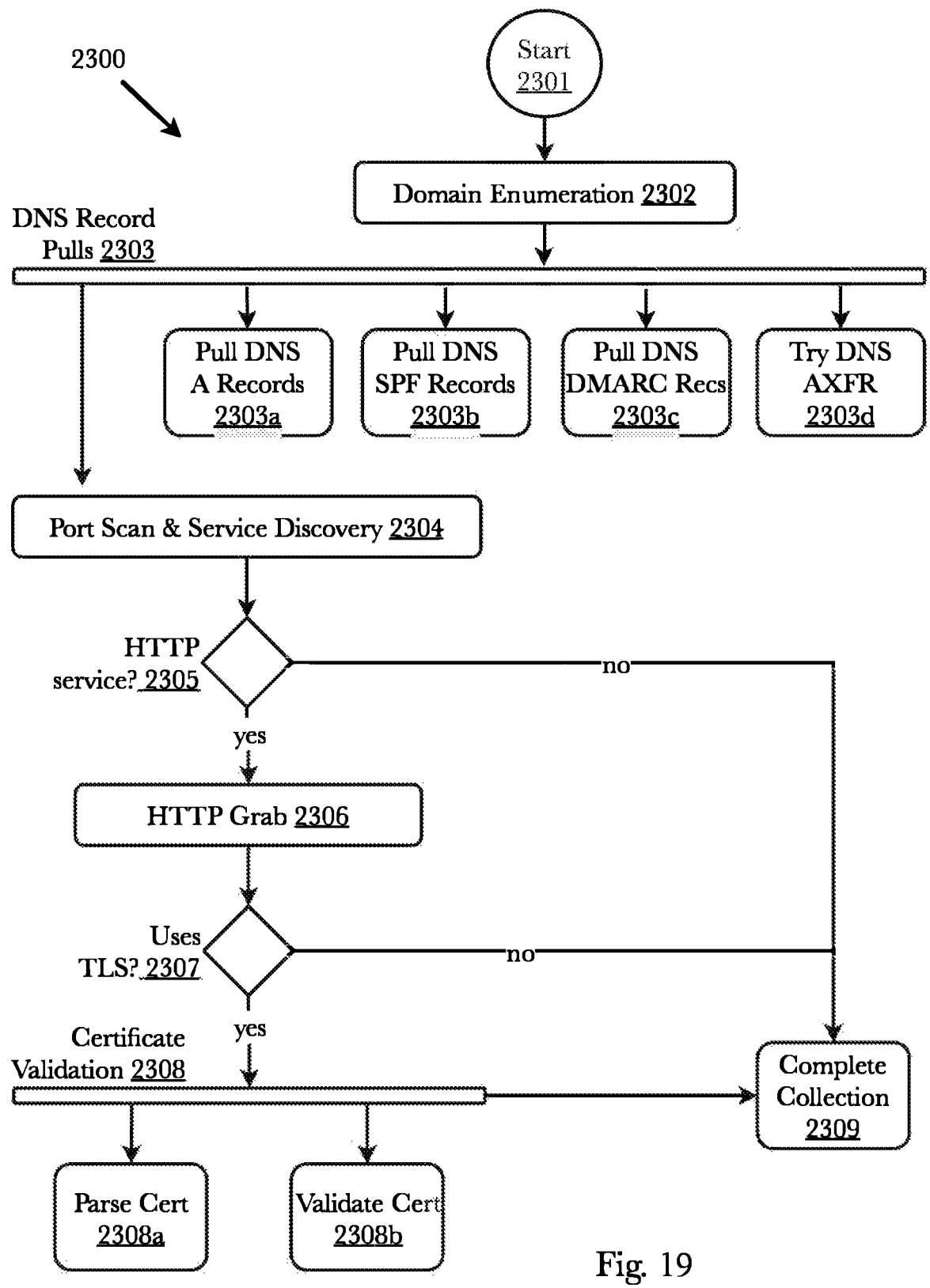
FIG. 19 is a flow diagram showing an exemplary process for gathering domain name system information for a network for purposes of cybersecurity reconnaissance, analysis, and score generation.

FIG. 19 is a flow diagram showing an exemplary process 2300 for gathering domain name system information for a network for purposes of cybersecurity reconnaissance, analysis, and score generation. At the start of the process 2301, one or more domain names is specified for searching 2302, DNS records are pulled 2303 for the domain name, which may include any type of DNS information such as, but not limited to, DNS A records 2303a, DNS SPF records 2303b, DNS DMARC records 2303c, and DNS AXFR records 2303d. After pulling of the DNS records, the DNS A records 2303a containing numerical IP addresses may be used to perform port scanning and service discovery 2304. All open ports are identified and sent to collection storage 2309. If a service is identified, additional checks are performed. If the service is an HTTP service, 2305 the HTTP code may be grabbed from the service for analysis 2306. If that HTTP service uses TLS 2307, the TLS certificate may be validated 2308 either by parsing the certificate 2308a to extract the text of the certificate, or by validation of the certificate using a validation service 2308b, or both. All information gathered throughout the process is sent to collection storage 2309.

Figure 20:
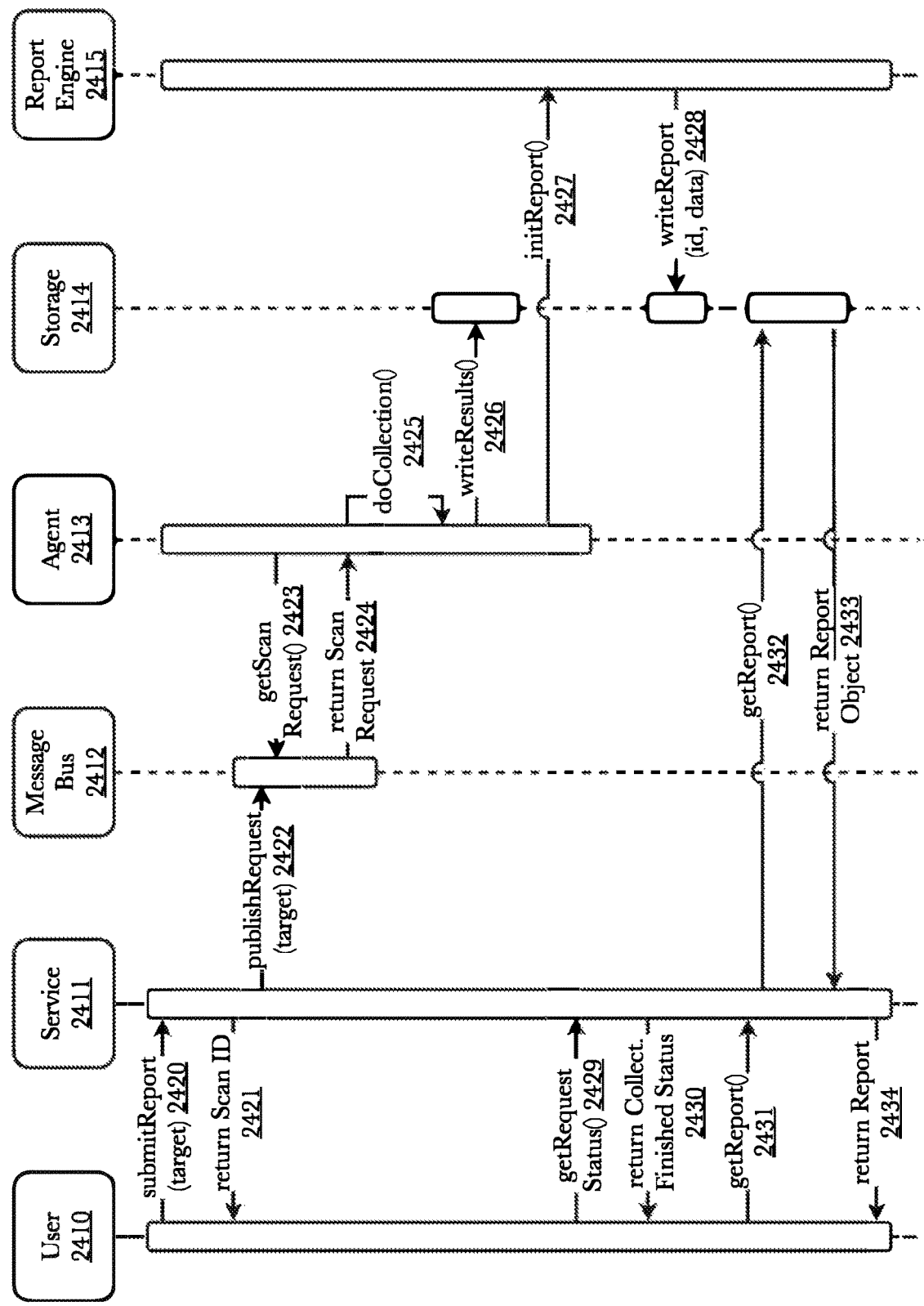
FIG. 20 is a message flow diagram showing an exemplary messaging between components of a system for cybersecurity reconnaissance, analysis, and score generation using distributed systems.

FIG. 20 is a message flow diagram showing an exemplary messaging between components of a system for cybersecurity reconnaissance, analysis, and score generation using distributed systems. A user 2410 initiates the process by initiating an inquiry 2420 which includes a target domain name, which inquiry is received by a collection service tool 2411. The collection service tool 2411 returns a scan identifier to the user 2421. The collection service tool may be one of any number of third party search tools such as those described in FIG. 15. The inquiry 2420 may pass through other components on its way from the user 2410 to the service 2411 (for example, through a queue established by the in-memory associative array service 2115). The service 2411 publishes the inquiry 2422 to a message bus 2412. One or more software agents configured to conduct network scanning queries the message bus 2423 and receives back a scan request 2424. The software agent 2411 performs the indicated network scan (e.g., an open port scan) 2425, and sends the results 2426 of the scan to storage 2414. Simultaneously, the software agent 2413 may request preparation of a report of the scan results 2427. A report engine 2415 generates the report of the scan results and writes the report 2428 to storage 2414. The user may request a status update 2492 from the service 2411, which will return a notice 2430 that the data has been gathered 2430. The user 2410 may request a copy of the report 2431, and a message is sent to storage 2414 asking for retrieval of the report 2432. The report is retrieved and returned to the service 2411 as a report object 2433. The service 2411 returns a copy of the report 2434 to the user 2410.

Figure 21:
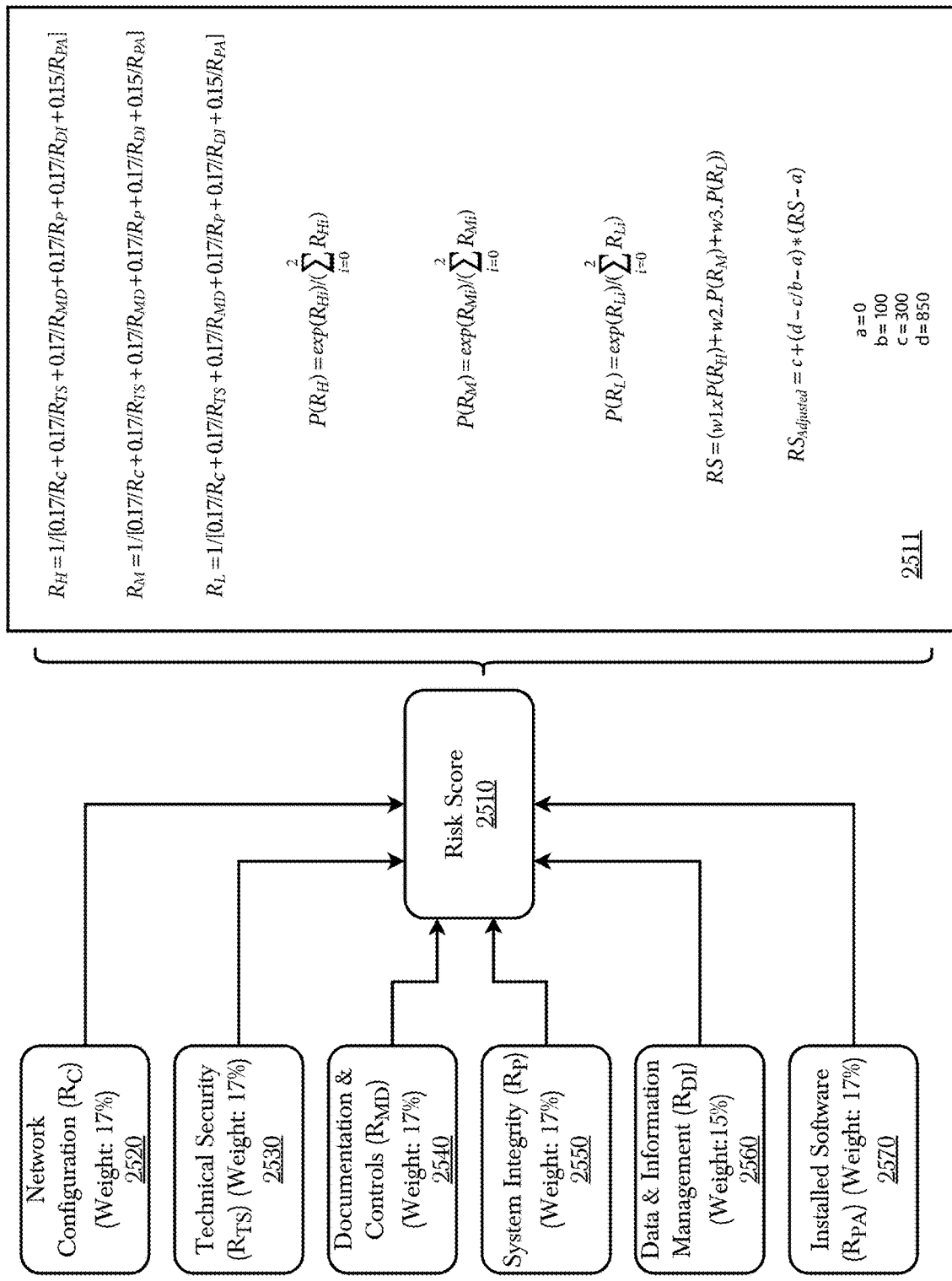
FIG. 21 is a diagram showing an exemplary cybersecurity scoring model for a system for cybersecurity reconnaissance, analysis, and score generation using distributed systems.

FIG. 21 is a diagram showing an exemplary cybersecurity scoring model for a system for cybersecurity reconnaissance, analysis, and score generation using distributed systems. While many scoring models may be used, the model in this example uses six categories of information 2520-2570, each approximately equally weighted: network configuration ($R_C$) 2520, technical security ($R_{TS}$) 2530, documentation and controls ($R_{MD}$) 2540, system integrity ($R_p$) 2550, data and information management ($R_{DI}$) 2560, and installed software ($R_{PA}$) 2570. Each includes a number of factors that will be described below, and a score is generated for each category. The cybersecurity risk score 2510 is an adjusted, weighted composite of high, medium, and low estimates for the combinations of scores from each category 2520-2570, as shown in the exemplary weighting formulas shown in 2511 for the cybersecurity risk score 2510.

Figure 21A:
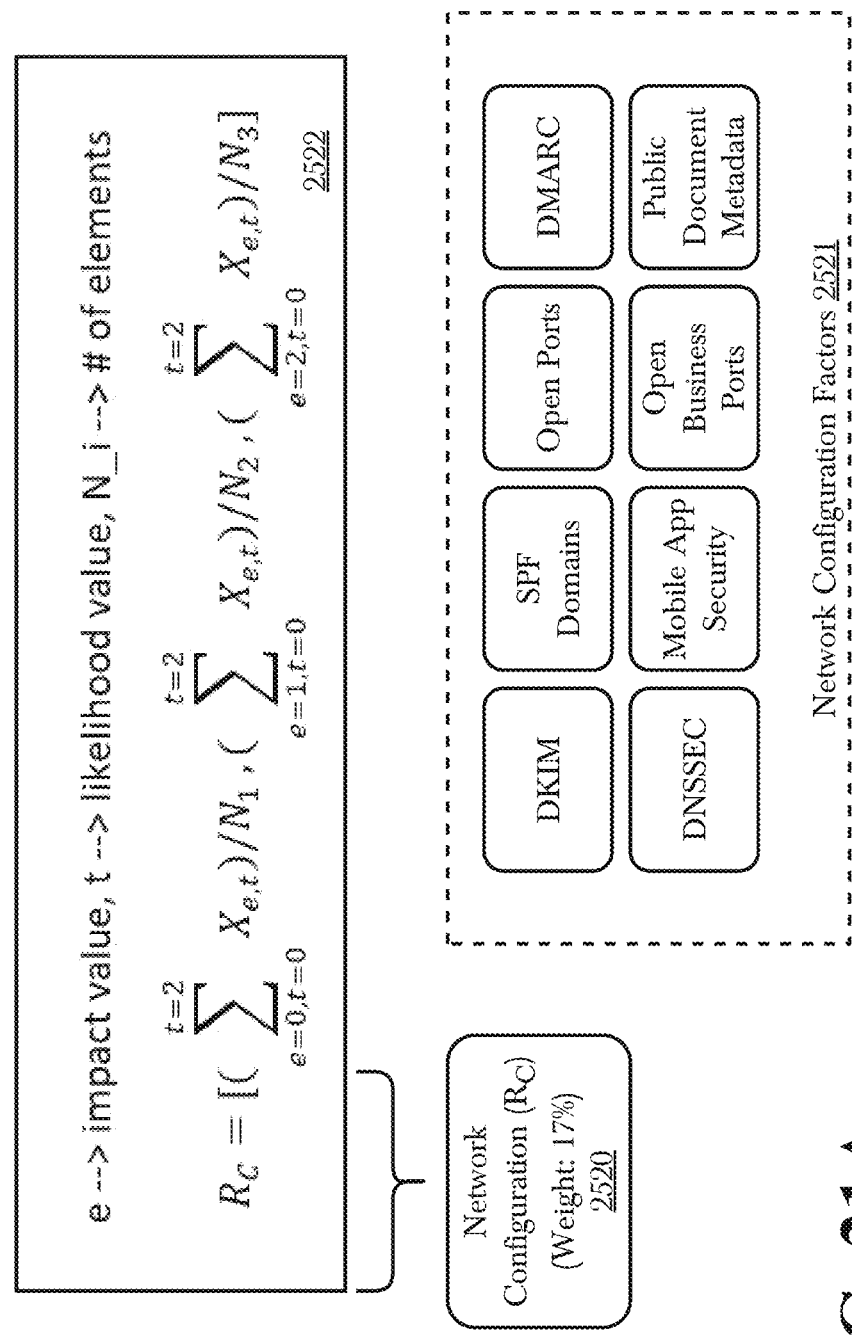
FIG. 21A is a diagram showing additional detail for the network configuration component of an exemplary cybersecurity scoring model for a system for cybersecurity reconnaissance, analysis, and score generation using distributed systems.

FIG. 21A is a diagram showing additional detail for the network configuration component 2520 of an exemplary cybersecurity scoring model for a system for cybersecurity reconnaissance, analysis, and score generation using distributed systems. The score, $R_C$, for the network configuration 2520 category is an average of the impact value (e), the likelihood value (t), and the number of elements (N) for each of a number of factors 2521 impacting cybersecurity as shown in 2522. A non-limiting list of which includes domain keys identified mail (DKIM), sender policy framework (SPF) records, open ports, domain-based message authentication, reporting, and conformance (DMARC) records, DNS security extensions (DNSSEC) implementation, mobile application security implementation, open business port information, and public document metadata information, as shown in 2522.

Figure 21B:
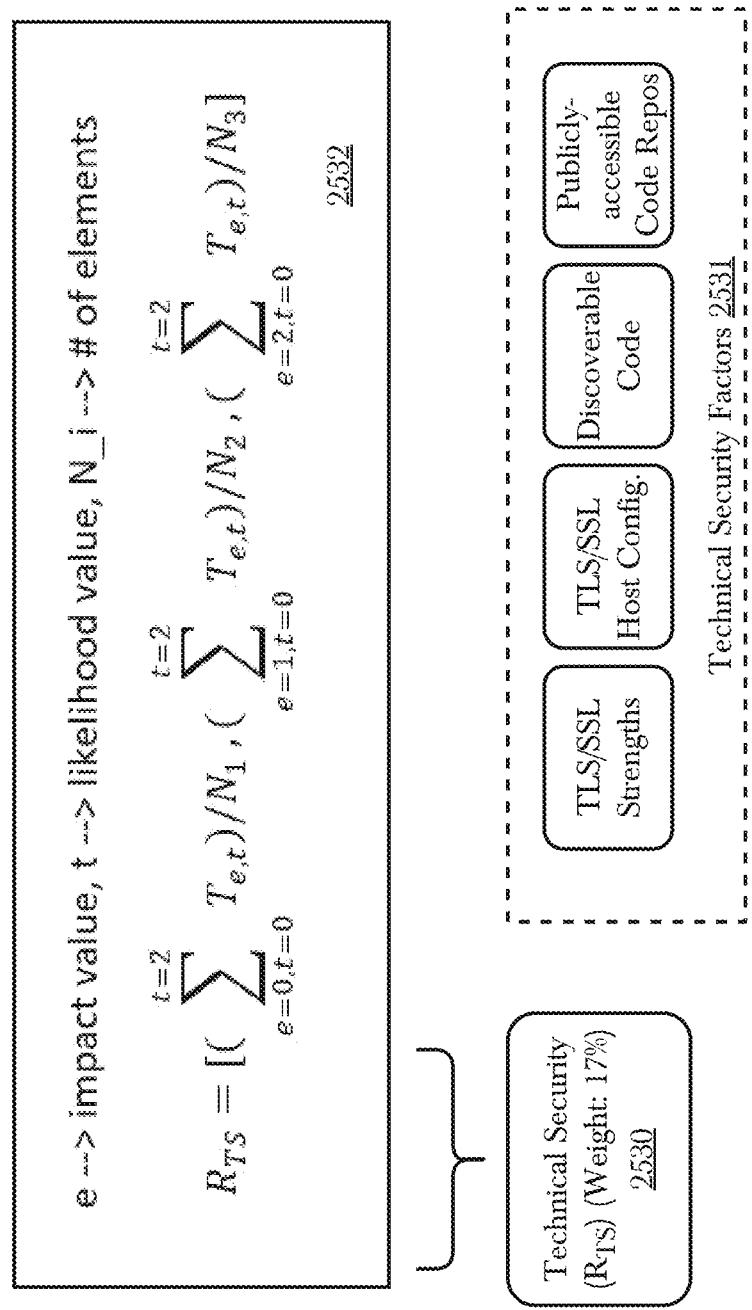
FIG. 21B is a diagram showing additional detail for the technical security component of an exemplary cybersecurity scoring model for a system for cybersecurity reconnaissance, analysis, and score generation using distributed systems.

FIG. 21B is a diagram showing additional detail for the technical security component of an exemplary cybersecurity scoring model for a system for cybersecurity reconnaissance, analysis, and score generation using distributed systems. The score, $R_{TS}$, for the technical security 2530 category is an average of the impact value (e), the likelihood value (t), and the number of elements (N) for each of a number of factors 2531 impacting cybersecurity as shown in 2532. A non-limiting list of which includes transport layer security (TLS) and secure socket layer (SSL) strengths, TLS/SSL host configurations, code discoverable from outside the network, and publicly accessible code repositories.

Figure 21C:
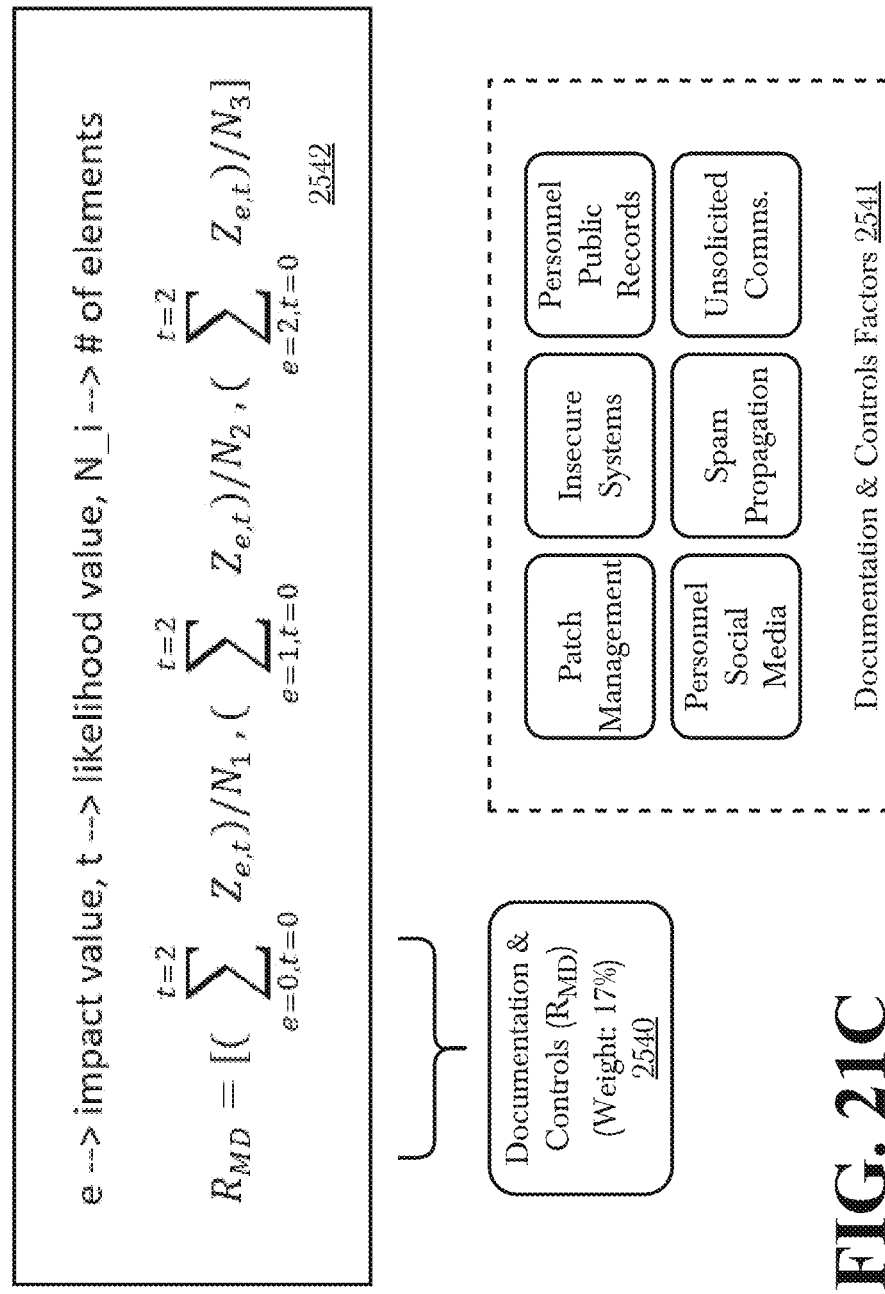
FIG. 21C is a diagram showing additional detail for the documentation and controls component of an exemplary cybersecurity scoring model for a system for cybersecurity reconnaissance, analysis, and score generation using distributed systems.

FIG. 21C is a diagram showing additional detail for the documentation and controls component of an exemplary cybersecurity scoring model for a system for cybersecurity reconnaissance, analysis, and score generation using distributed systems. The score, $R_{MD}$, for the documentation and controls 2540 category is an average of the impact value (e), the likelihood value (t), and the number of elements (N) for each of a number of factors 2541 impacting cybersecurity as shown in 2542. A non-limiting list of which includes patch management, lists of insecure systems, publicly-available personnel records, personnel social media records, spam propagation, and unsolicited communications.

Figure 21D:
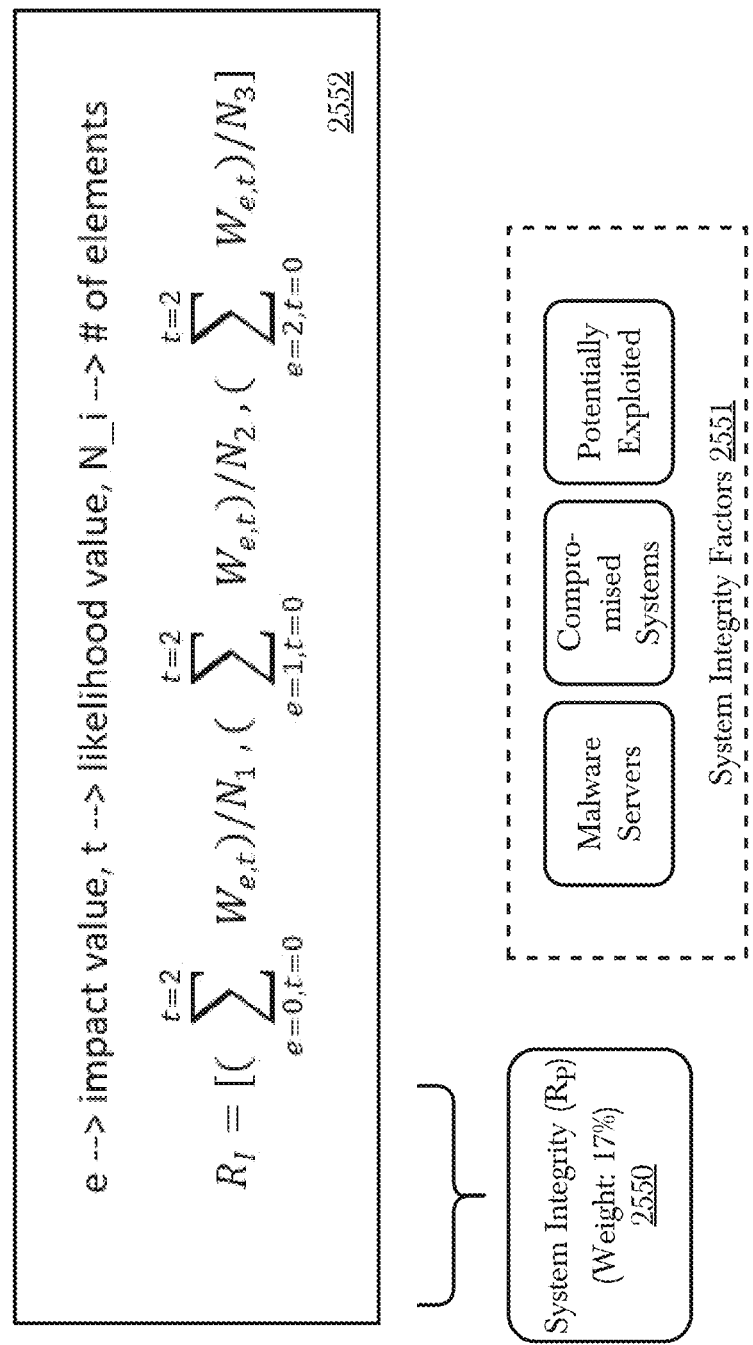
FIG. 21D is a diagram showing additional detail for the system integrity component of an exemplary cybersecurity scoring model for a system for cybersecurity reconnaissance, analysis, and score generation using distributed systems.

FIG. 21D is a diagram showing additional detail for the system integrity component of an exemplary cybersecurity scoring model for a system for cybersecurity reconnaissance, analysis, and score generation using distributed systems. The score, $R_p$, for the technical security 2550 category is an average of the impact value (e), the likelihood value (t), and the number of elements (N) for each of a number of factors 2551 impacting cybersecurity as shown in 2552. A non-limiting list of which includes lists of servers exhibiting malware infection, compromised systems, and potentially exploited systems.

Figure 21E:
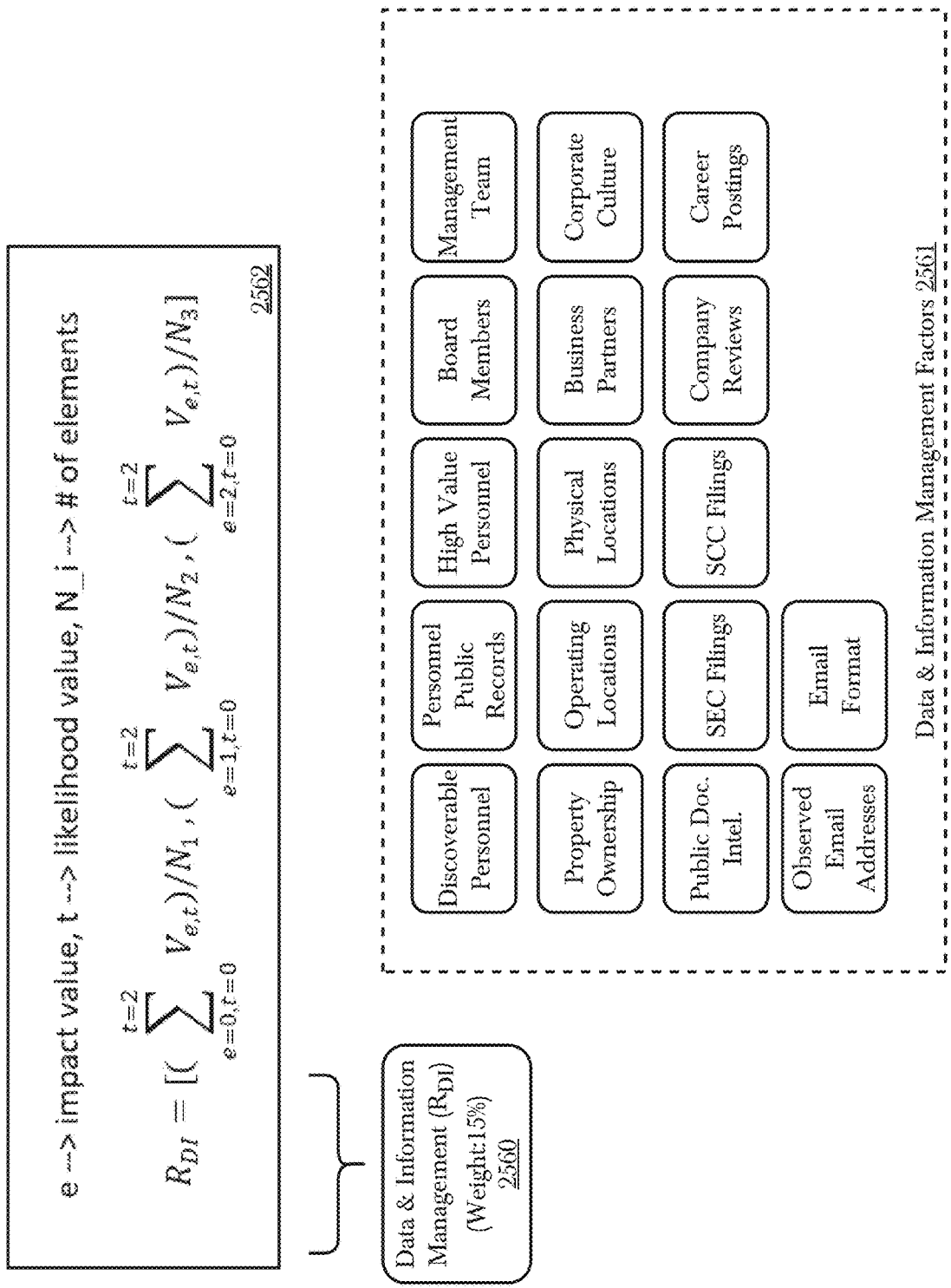
FIG. 21E is a diagram showing additional detail for the data and information management component of an exemplary cybersecurity scoring model for a system for cybersecurity reconnaissance, analysis, and score generation using distributed systems.

FIG. 21E is a diagram showing additional detail for the data and information management component of an exemplary cybersecurity scoring model for a system for cybersecurity reconnaissance, analysis, and score generation using distributed systems. The score, $R_{DI}$, for the data and information management 2560 category is an average of the impact value (e), the likelihood value (t), and the number of elements (N) for each of a number of factors 2561 impacting cybersecurity as shown in 2562. A non-limiting list of which includes discoverable personnel, publicly-available personnel records, lists of high-value personnel, board members, management team members, property owned by the organization, operating locations of the organization, physical locations (e.g., offices, warehouses, etc.) of the organization, business partners, corporate culture, publicly-available document intelligence, Securities Exchange Commission (SEC) filings, state-level corporate (SCC) filings, company reviews (internal and publicly-posted), discoverable career postings and resumes, observed email addresses, and email format and security configurations.

Figure 21F:
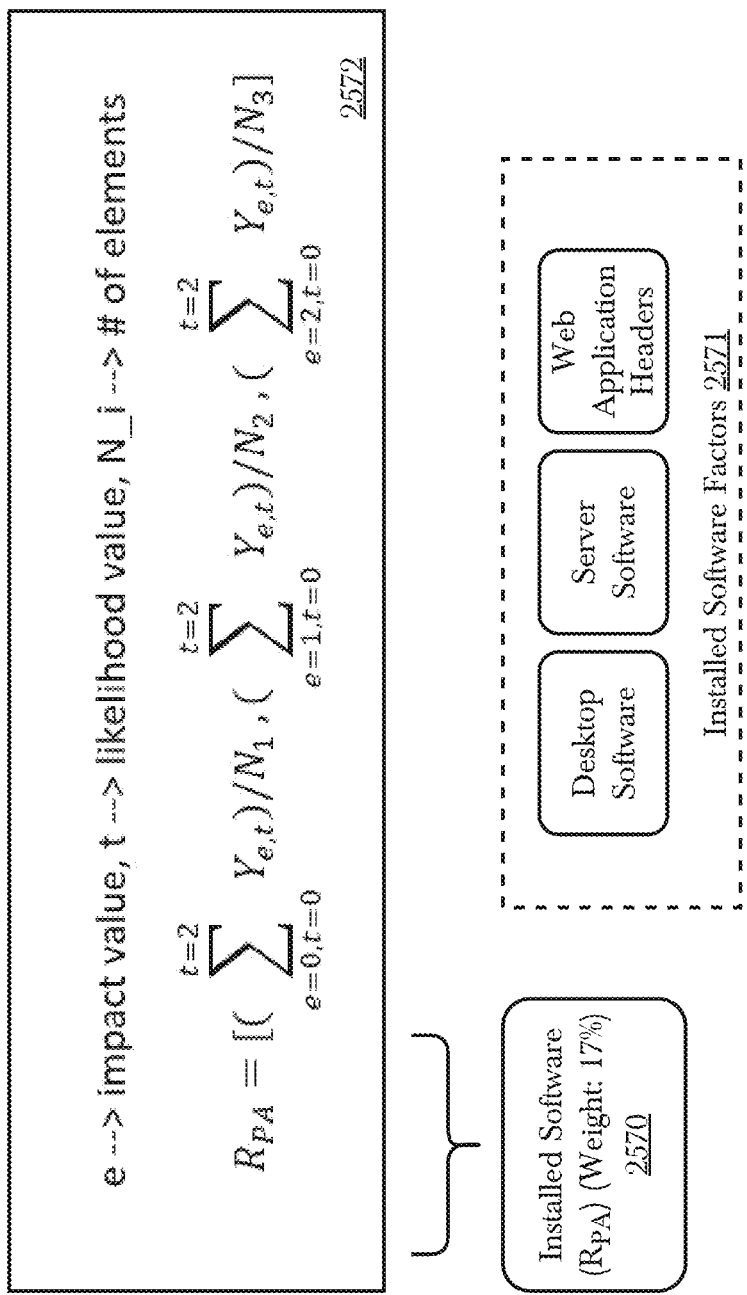
FIG. 21F is a diagram showing additional detail for the installed software component of an exemplary cybersecurity scoring model for a system for cybersecurity reconnaissance, analysis, and score generation using distributed systems.

FIG. 21F is a diagram showing additional detail for the installed software component of an exemplary cybersecurity scoring model for a system for cybersecurity reconnaissance, analysis, and score generation using distributed systems. The score, $R_{PA}$, for the installed software 2570 category is an average of the impact value (e), the likelihood value (t), and the number of elements (N) for each of a number of factors 2571 impacting cybersecurity as shown in 2572. A non-limiting list of which includes desktop software installations, server software installations, and web applications and headers.

Figure 22:
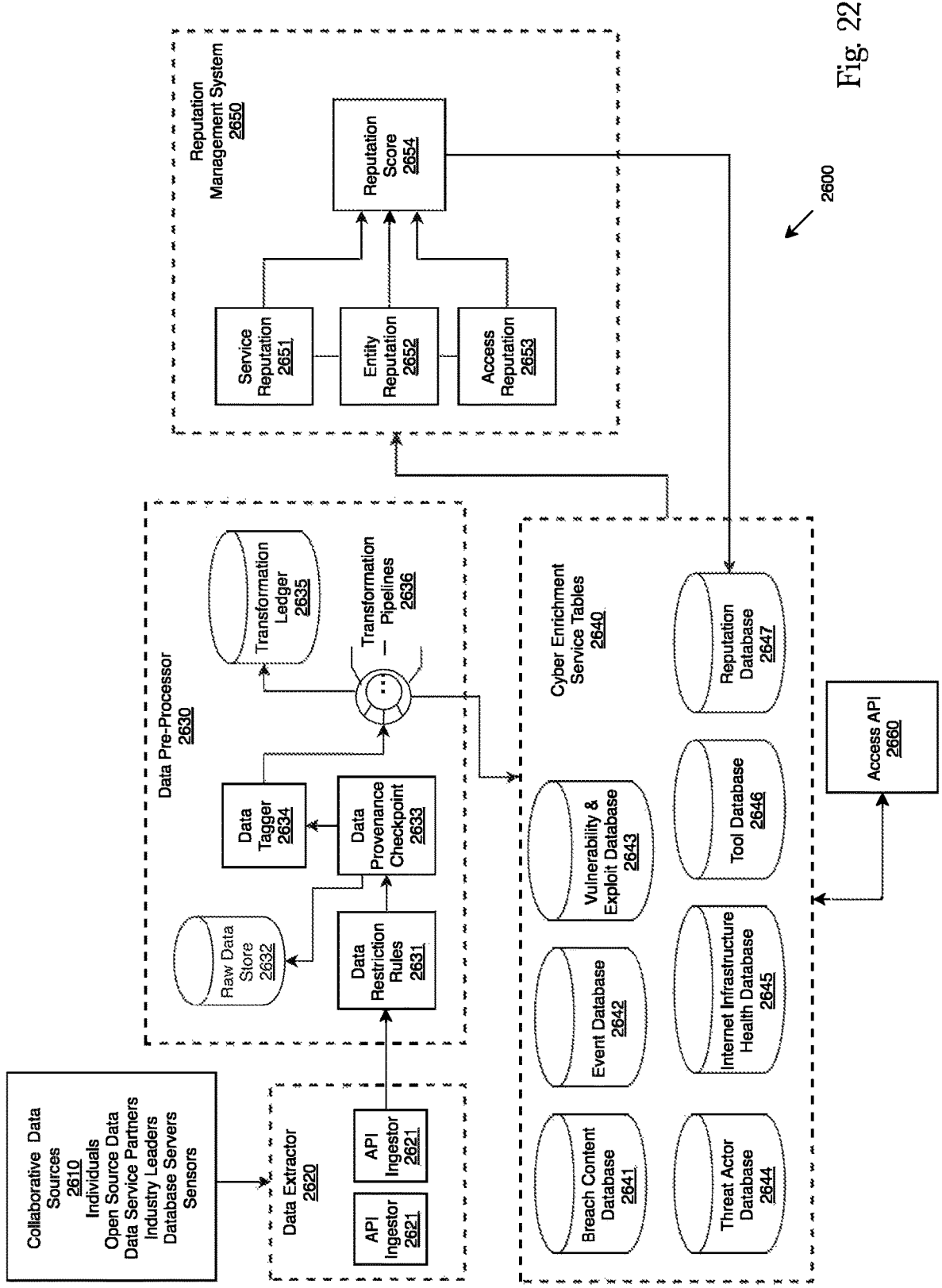
FIG. 22 is a diagram of an exemplary architecture of a system for collaborative, real-time relevant, and scalable data architecture that can operate in an adversarial information environment.

FIG. 22 is a diagram of an exemplary system for a collaborative and real-time relevant data architecture 2600 operating in an adversarial information environment. In this embodiment, the system is comprised of collaborative data sources 2610, a data extractor 2620 to facilitate data exchange, a data pre-processor 2630, cyber enrichment service tables 2640, a reputation management system 2650, and an access API 2660.

The collaborative nature of the system architecture 2600 necessitates the use of multiple and sometimes conflicting data sources 2610. The collaborative data sources 2610 may include, but are not limited to public, wholly-owned, potential baskets of private or communal data, individuals, industry leaders, individuals, database servers, and more. These data providers collaborate to create a database that contains more information than they would be able to create individually. The system 2600 can take these multi-party data sources and aggregate and validate them into a single feed. This benefits all participating entities as they will be able to access the collaborative databases via the access API 2660 for whatever purpose they prioritize. The data from these sources is automatically gathered via the data extractor 2620 which is composed of one or more of a plurality of bespoke application programming interface (API) ingestors 2621. The API ingestor 2621, which supports standard periodic scheduling of data pulls (e.g., hourly, daily, weekly), automatically ingests structured data feeds from enumerated remote sources. The APIs are constructed using the representational state transfer (REST) architecture. A RESTful API uses hypertext transfer protocol (HTTP) requests to interact with the data and allows a REST client to be able to use server-provided links to dynamically discover all the available resources it needs. Not only do the sources of data vary, but the types of data are diverse as well. For example, if three separate data sources are ingested for further analysis, the format of these sources could be, but is not limited to, CSV, JSON, and XML. The system architecture 2600 can process these disparate data formats uniformly via the use of the data pre-processor (DPP) 2630.

The data pre-processor 2630 maintains a persistence infrastructure in the form of a raw data store 2632 and a transformation ledger 2635 and performs a variety of functions such as cross referencing incoming data with known data restrictions 2631, data tagging 2634, transformation pipelines 2636, and data provenance checking 2633. The data restriction rules 2631 are used to ensure that incoming data is compliant with any associated data restrictions. The first layer of persistence infrastructure is the raw data store 2632 which stores all ingested data in its raw form in various databases such as relational, wide column, and graph time series, to name a few. This raw data is saved prior to any transformations to ensure that the data can be replicated in the case that there is partial or complete data loss as the data advances through the system. After data restrictions 2631 have been cross referenced the data flows into the data provenance checkpoint 2633. The checkpoint checks incoming published data for meta-data about the data product; many meta-data fields routinely collected fall into the category of provenance information, e.g., date created, creator, instrument or software used, data processing methods, etc. The provision of provenance meta-data as part of the data is important for determining the quality, the amount of trust one can place on the results, the reproducibility of results and reusability of the data. In a collaborative data architecture 2600 the ability to track and verify the provenance of ingested data is paramount for successfully merging and compiling data from various data sources.

Once the raw data has been stored, and data restrictions and provenance checked and verified, the data tagger 2634 allows the DPP 2630 to organize data more efficiently by associating information (e.g., domain names, URLs, license data, etc.) with keywords. This kind of metadata helps describe a data entry and allows it to be found via a search of the tag. This ensures that various forms of data are catalogued and managed as they are further transformed via the transformation pipelines 2636.

The transformation pipelines 2636 receive tagged data and perform various filter, parse, enrichment, normalization and schematization tasks to prepare the data for final storage and further analysis. Pipelines can contain logic which define discrete transformations which are completed by human, machine, or human-machine systems. Examples of transformation tasks include anonymizing data, removing duplicate data, feature encoding, to name few. While most data transformations alter the data in some way, there are transformations that do not change the data, such as placing a time stamp on the data. The transformations that cause the data to change are stored in the transformation ledger 2635 which stores and links tagged data with its intermediary transformations in order to add another layer of persistence infrastructure. The ability to merge conflicting data sets necessitates knowledge of the data provenance including declarations of intermediate transformation steps and sources which are stored within the transformation ledger 2635.

Once the data has passed through the DPP 2630 it is then sent to the cyber enrichment service tables 2640 comprised of a variety of specialized databases. These data bases support event-driven processing where data feeds facilitate publication and subscription (PUB-SUB). In a preferred embodiment, a PUB-SUB system allows clients to subscribe to events of interest, and can refine their subscriptions through content-based filter expressions. The event is published whenever a database change, detected via a dynamic triggering layer, matches some active subscription. In a preferred embodiment the specialized databases are all related to cybersecurity events.

A breach content database 2641 is be used to provide a core data set for supporting historical breach record search and exploration. The main purpose of this database is to allow matching of emails, domains, and passwords to breach records via search. Another purpose of this database is to catalogue and characterize the kinds of data involved in individual breaches. For example, the number of records affected, whether such records include personally identifiable information (PII) or other controlled data.

An event database 2642 is intended to capture a list of cyber-related events which may or may not have actual breach artifact data present in the public domain or in the breach database 2641. Additionally, the event database 2642 includes metadata about publicly discussed cyber events including, but not limited to SEC filings, HHS disclosures, press releases, internet relay chat (IRC) channels, and other events. This database will be queried directly for many details about event attributes. In addition, the event database 2642 can support downstream feeds into graph data to support linking threat actors, TTPs, tools, events, breach data, domain reputation, etc.

The vulnerability and exploit database 2643 is where the ingested data feeds from the national vulnerability database and other such commercial feeds are stored. This database will capture and maintain up-to-date information from exploit databases. This database is intended to provide critical data to build a substantial catalogue of vulnerabilities and exploits. An application of the vulnerability and exploit database 2643 is to cross reference service versions with known vulnerabilities and exploits to inform reputation scoring. In addition, subsets of data from this database can be leveraged as part of the larger privilege, exploit, and vulnerability pathfinding. What this means is that this database can be used to identify potential paths of attack by threat actors. The vulnerability and exploit database 2643 can also be utilized to track, forecast, and alert on changes to vulnerability and exploit trends to inform threat modeling actions.

The threat actor database 2644 primary purpose is to link known threat actors with their tactics and associated known breach details. This is intended to be a higher throughput (i.e., non graph) representation of threat actors and associated TTPs. A particular use case for this database would be evaluating the velocity of offensive and defensive tool development for risk modeling. This can be accomplished by tracking threat actor relationships with tools and TTPs and analyzing changes in those relationships as new methods and tactics are discovered and linked to the threat actor. By analyzing the changes in methods and tactics the speed of the tool development can be tracked and that information can be used for risk forecasting.

The internet infrastructure and health database 2645 is useful for understanding the state of the environment under which breaches, or historical events have occurred and what risks are most likely at any given moment.

The tool database 2646 captures metadata associated with both offensive and defensive security and software tools and capabilities. The tool database 2646 is to build a comprehensive list of offensive and defensive tools and link their application to specific cyber events, cyber controls, cyber kill chain stages, and threat actors. For example, a tool database 2646 query may include what companies in a portfolio, using defensive tools such as ArcSight, Splunk and Sailpoint, are covered against a specific threat actor. The example query would return a list of companies who utilize the above mentioned defensive tools and the threat actors those tools have been dispatched against. A use case, according to one embodiment of the invention, would be leveraging the tool database 2646 for tracking threat actor relationships with tools and tactics, techniques and procedures (TTPs). If the threat actor was known, then this process would quickly identify the tools and TTPs typically employed by the threat actor, which can help identify proactive measures to be taken to protect data, and lead to faster response times during breach events.

The reputation database 2647 is where ingested and harmonized various open source and paid reputation feeds are stored. The reputation database 2647 facilitates searching reputation by domain and IP address. The reputation database 2647 is a primary data source for the reputation management system (RMS) 2650.

The RMS 2650 will build and keep up to date a reputation system that takes into account the reputations of nodes and the connections between the nodes. A node is a graphical representation of a component; a component is the name given to an entity, the service an entity provides, and the network that accesses the entity or service. The RMS 2650 retrieves data from the reputation database 2647 for a given service (e.g., database) reputation 2651, the service provider's associated entity reputation 2652, and a network access reputation 2653. The reputation of each component is combined and a new reputation score 2654 is computed. This combination may take any number of forms, for example, summation, averaging, weighted averaging, or any other appropriate algorithm or methodology for creating a single score from multiple scores. The new reputation score 2654 is sent back to the reputation database 2647 for storage and further use by the RMS 2650. For example, the service and its entity have sterling reputations, but are accessed via a network that has been vulnerable to attack recently (and thus has a lower reputation), the overall reputation of that data source in use would be reduced.

The access API 2660 provides a secure and RESTful service including handling entity accounts and all requests.

Figure 23:
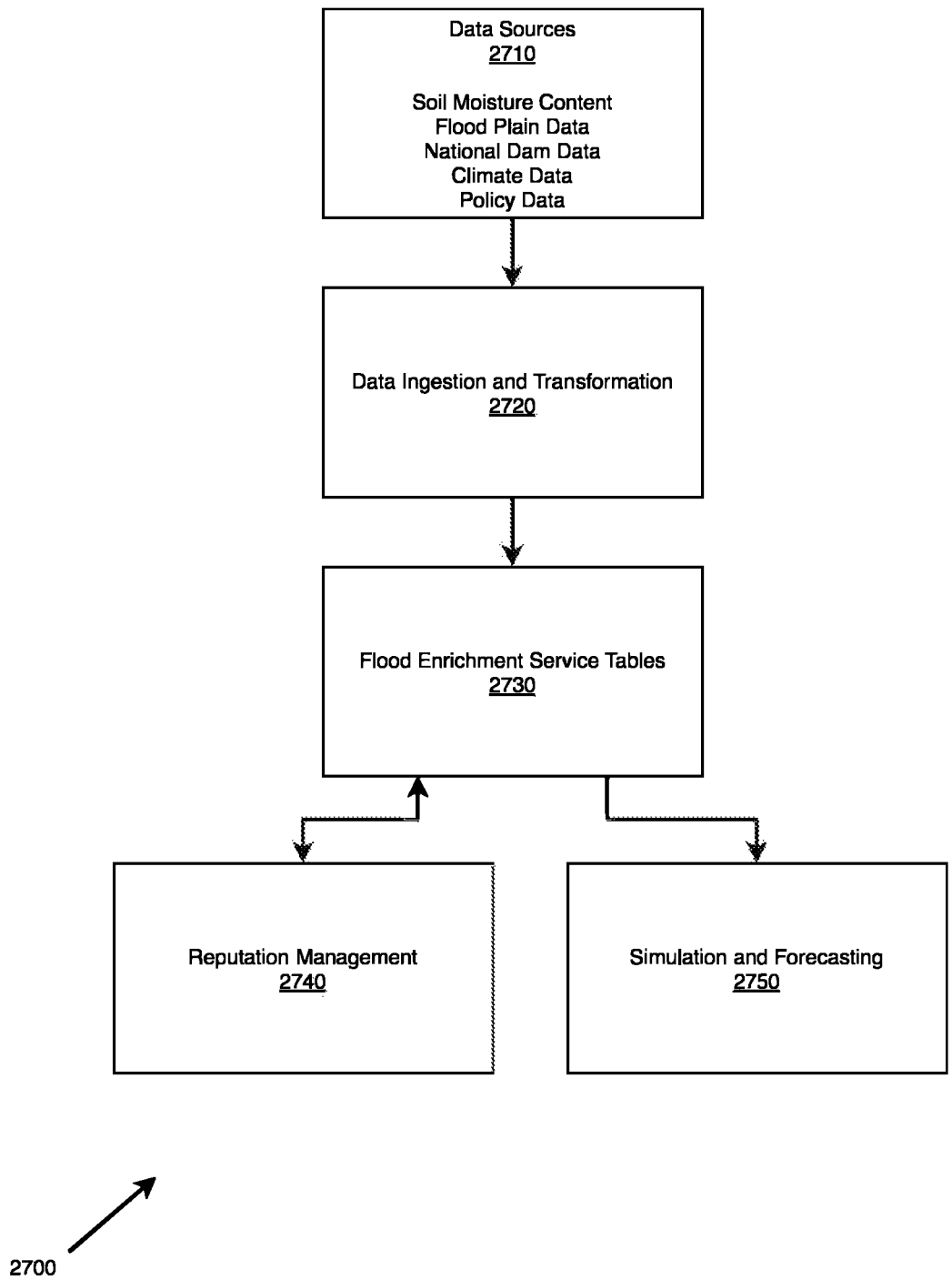
FIG. 23 is a flowchart illustrating an exemplary data flow process using the system for collaborative, real-time relevant, and scalable data architecture.

FIG. 23 is a flowchart illustrating an exemplary data flow 2700 process using the system for collaborative, real-time relevant, and scalable data architecture. As an example, in this embodiment the system 2600 is leveraged to analyze flood risk for a coastal state. Possible data sources 2710 to support flood risk assessment may include soil moisture content data, flood plain data, national dam data, climate data, and legislative policy data. The coastal state can decide what data sources and the events that generate that data are extracted and ingested. These various data sources 2710 are then automatically ingested and transformed 2720 so that they are ready for further processing. The ingested and transformed 2720 data is stored in the flood enrichment service tables 2730 that store the transformed data and create links between associated meta-data. The various data tables and the data and meta-data contained therein, can be linked together using a time series graph, or any graph or process that can track data relationships known in the art, to create an ontological framework to identify the interdependencies and relationships between data sources. These linked identified relationships provide greater context for reputation management 2740 and simulation and forecasting 2750.

The reputation management 2740 and simulation and forecasting 2750 work together to provide end users confidence in their application of the data and modelling. The coastal state wants to leverage the data flow 2700 to inform its zoning laws and to provide regulators with a means of implementing stress tests. For example, the state has determined that flooding is a potential risk for most of its population and that soil moisture content and flood hazard mapping are vital data for its needs. Soil moisture refers to the amount of water in the earth in a given location, but also identifies impervious areas which are artificial structures that are covered by water resistant materials (e.g., asphalt). Soil moisture levels characterize the health of local soil and can also help identify areas where flood effects are more likely to occur. Recently, there have been, and will continue to be, increased levels of accuracy and detail for soil moisture estimation. The state has subscribed to soil moisture events, so whenever there is a new method for soil moisture estimation with improved data sets, that data will be automatically ingested, validated, and applied to the simulation and forecasting 2750. Additionally, the reputation score of the data source will change, and with it the state's confidence in the data source can be validated.

The system 2700 is configured to accept user and entity submitted data as well as scan for data sources that can provide more contextual data in regard to flood risks. These distributed data sources merge together to form a collaborative database that yield more pertinent information to all contributing parties. Scanned data sources may include the Federal Emergency Management Agency (FEMA) flood hazard maps and dam reservoir operating rules. The FEMA flood hazard maps indicate a large flood extent downstream of each dam. However, when dam reservoir condition data is considered, the FEMA maps present an obvious overestimation of the flood extent when reservoir operations are ignored. These conflicting data sets represent adversarial information, despite no malicious activity because their individual contributions lead to different data sets. The ability to track the provenance of the data being used helps to merge these conflicting data sets to form a concrete view on flood risk. This provides the state with confidence that the data used for forecasting is reputable, real-time relevant, and useful for shaping policy and regulations.

Figure 24:
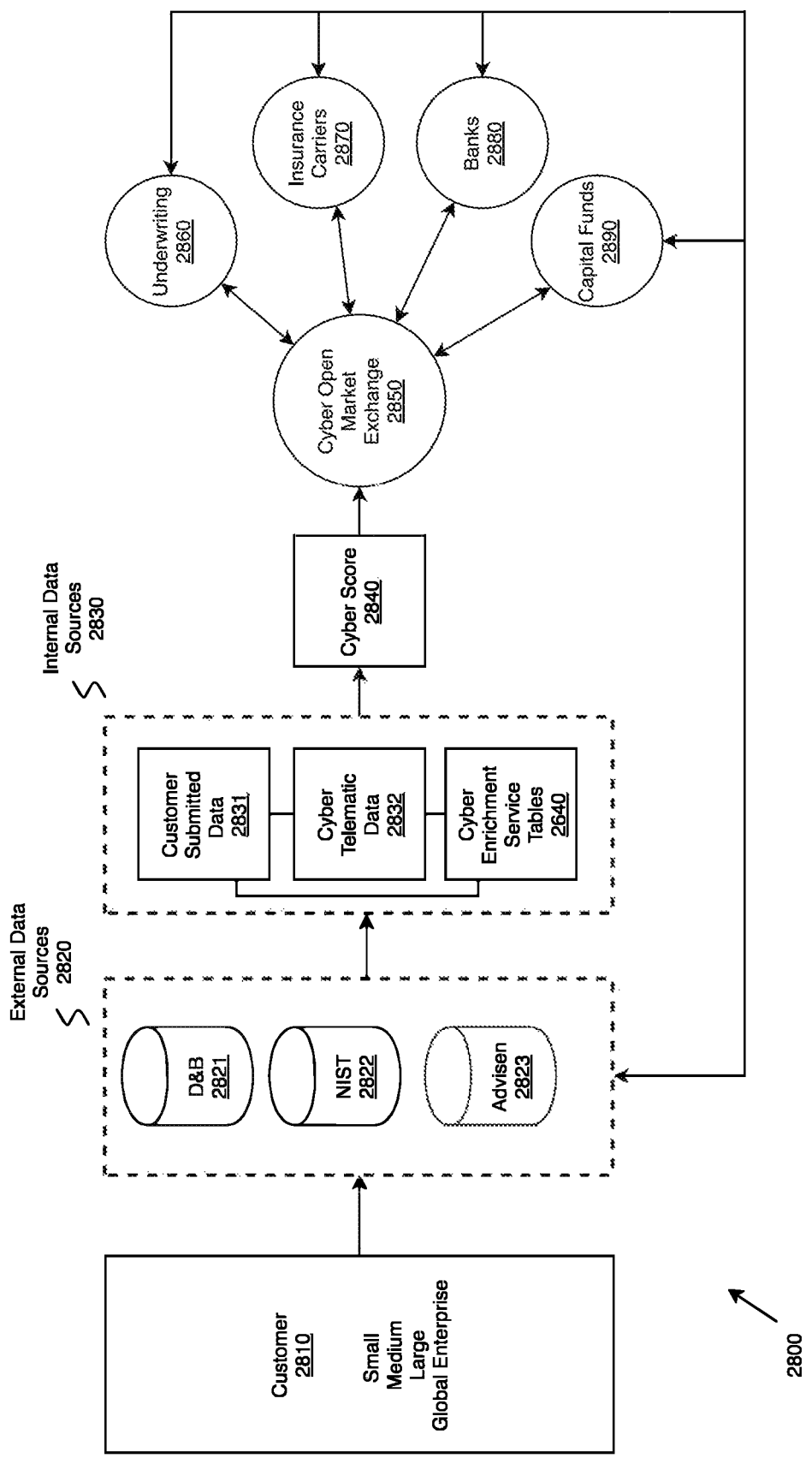
FIG. 24 is a diagram of an exemplary architecture of a system for a data market exchange using distributed systems.

FIG. 24 is a diagram of an exemplary architecture of a system for the dynamic market-driven reallocation of roles to facilitate a marketplace using distributed systems. The marketplace system 2800 ingests data provided across each category of information from market leading participants to characterize entities based on their unique data sources and also aids in collecting, extracting, and enriching records with public data. The system is comprised of various customers 2810, a plurality of external data sources 2820, a plurality of internal data sources 2830, a cyber score 2840, a cyber open market exchange 2850, and various industry partners including, but not limited to underwriting 2860, insurance carriers 2870, banks 2880, and capital funds 2890.

The external data sources 2820 used in the marketplace system include databases that provide context for industry related scoring. For example, the Dun & Bradstreet (D&B) corporate information database 2821 provides data for entity scores and ratings regarding credit information. The National Institute of Standards & Technology (NIST) database 2822 contains entity scores related to cybersecurity configuration and vulnerability management. As another example, the Advisen database 2823 could be incorporated to provide cyber loss data to provide a historical view of cyber events.

Figure 26:
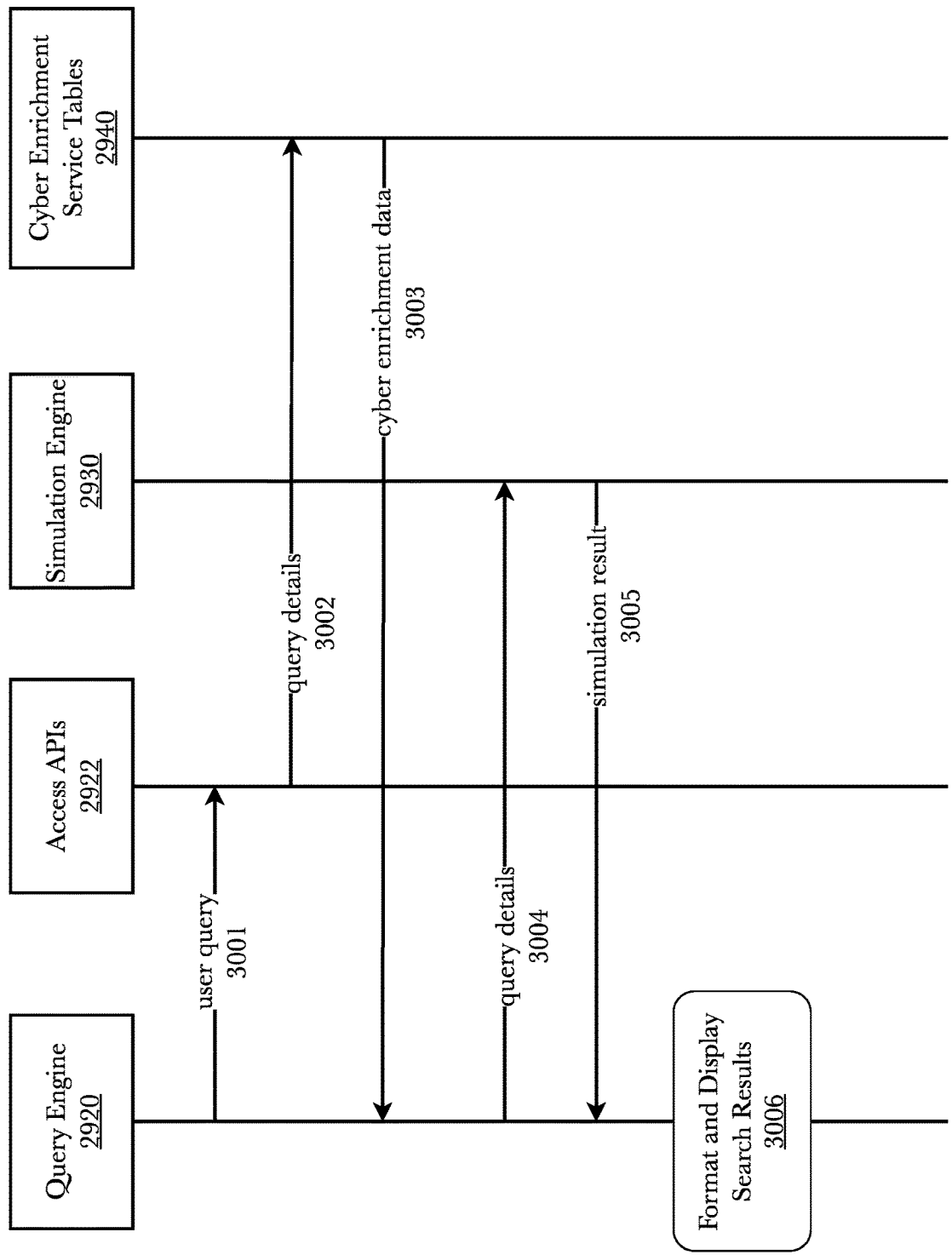
FIG. 26 is a message diagram illustrating an exemplary exchange of data between various components of a system for large-scale Internet health forecasting and internet noise analysis, according to an embodiment.

The internal data sources 2830 include, but are not limited to customer submitted data 2831, cyber telematics data 2832, and the cyber enrichment service tables 2640, FIG. 26. The external data sources 2820 and the internal data sources 2830 are used in conjunction to inform and generate a cyber score 2840.

The cyber score 2840 may be comprehensive in that it uses all available data (e.g., reputation, value, urgency, etc.) to generate a holistic cyber score for a company. The cyber score 2840 can also be specific to an aspect of the overall data, for example a cyber score can be generated relating to cybersecurity of credit institutions, information services, etc. The cyber score 2840 is made available via the cyber open market exchange 2850 which facilitates the dynamic market-driven reallocation of roles between entities and market participants. The market participants include, but is not limited to underwriters 2860, insurance carriers 2870, banks 2880, and capital funds 2890. The market participants can access the cyber open market exchange 2850 to view real-time relevant entity cyber scores that can be used to inform underwriting tasks, set insurance policy rate and coverage limits, give banks better insight into the risks involved with lending, and provide accurate up to date information to capital markets for investing purposes. The decisions made by the market participants based off of their interaction with the cyber open market exchange 2850 are added to the industry leading external data sources 2820 which can be included again in the generation of an updated cyber score 2840.

Figure 25:
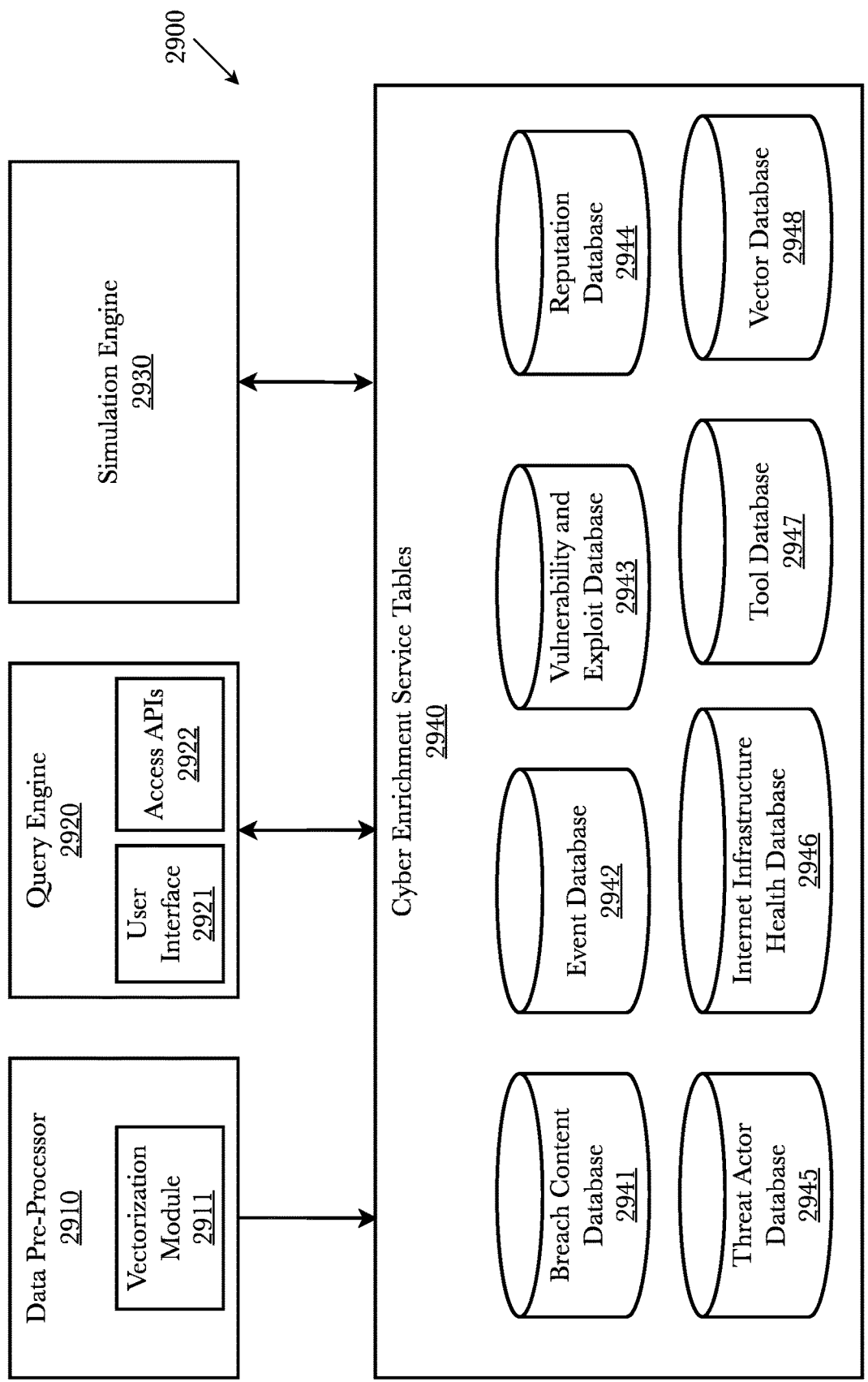
FIG. 25 is a block diagram illustrating an exemplary system architecture for large scale border gateway protocol forecasting and internet noise analysis, according to an embodiment.

FIG. 25 is a block diagram illustrating an exemplary system architecture 2900 for large scale border gateway protocol forecasting and internet noise analysis, according to an embodiment. According to the embodiment, system 2900 comprises a plurality of cyber enrichment service tables 2940, a data pre-processor 2910, a query engine 2920, and a simulation engine 2930. In some implementations, the system may be implemented on a cloud computing device and/or platform, wherein the cloud computing platform comprises one or more processors, one or more data storage devices, one or more memory systems, and at least a plurality of instructions stored on the one or more data storage devices. In some implementations, the system may be implemented on a non-cloud computing device and/or platform such as, for example, a desktop computer, laptop, etc. In some implementations, the system may be implemented in hierarchical infrastructure. For example, a public facing version of the system may be available on the Internet for external scanning purposes and another version internally integrated with telematics being combined for system-on-a-chip operator prioritization.

According to the embodiment, system 2900 leverages the information stored in cyber enrichment service tables 2940 to provide data for the enrichment of and to provide context for the development of simulation models which can be used for a broad range of applications such as to forecast and mitigate cyber-attacks or events, improve an organization's security posture, and provide risk management analytics uses as well. According to various embodiments, data pre-processor 2910 is present and similar in function to data preprocessor 2630. Data preprocessor 2910 may receive data from data extractor 2620 which can be configured to automatically ingest structured data feeds from enumerated remote sources and store them in the appropriate cyber enrichment database, fully normalized and schematized via data preprocessor 2910. Data preprocessor 2910 may also be configured to calculate, compute, derive, infer, or otherwise determine one more data quality metrics such as, for example, accuracy, completeness, timeliness, etc. for all ingested data. According to the embodiment, data preprocessor 2910 may comprise a vectorization module 2911 configured to vectorize ingested data to prepare the vectorized data for storage in one or more vector databases. Cyber enrichment service tables 2940 support standard periodic scheduling of data pulls (e.g., hourly, daily, weekly, monthly, etc.). Cyber enrichment service tables 2940 provide RESTful API access for analytic queries (e.g., queries received from query engine 2920). In various embodiments, cyber enrichment service tables 2940 support data tagging (e.g., for license associated, data attributes such as personal identifying information, etc.). Cyber enrichment service tables 2940 may be implemented as NoSQL databases. In some implementations, cyber enrichment service tables 2940 may comprise wide column databases.

According to the embodiment, a breach content database 2941 is present and configured to provide a core dataset for supporting historical breach record search and exploration. One purpose such a database provides is to allow matching of emails and domains to breach records (e.g., by searching an email address and/or password, etc.). Another purpose of this database is to characterize the kinds of data involved in individual breaches. For example, the number of records, whether such records include PII or HIPPA or other controlled data. This type of information stored in breach content database can be used to support cyber operations uses cases as part of standard threat intelligence opportunities, influence security ratings, provide metadata to characterize $3^{rd}$ and $4^{th}$ party risk attributes, and set the stage for derived security factors which can be published as time-series indices (e.g., by NAICS code) for trends within sectors of the economy with respect to information security practices, breach magnitudes, losses etc.

According to the embodiment, an event database 2942 is present and configured to capture a list of cyber-related events which may or may not have actual breach artifact data present in the public domain. This database can include metadata about specifically discussed cyber events from SEC filings, HHs, IRC channels, etc. This database may be queried directly for many details about event properties/attributes. Additionally, the event database can support downstream feeds into property graph data to support linking threat actors, tactics, tools and procedures (TTPs), tools, events, breach data, IP/domain and associated reputation. This database may support queries related to, but not limited to, event types, event time, and the name of entity effected. By offering these query capabilities, event database 2942 is a powerful tool for organizations to better understand the cyber-related events landscape, enabling them to take informed decisions to improve their cyber and operational risk management strategies.

Examples of event data can include, but is not limited to: incident date; incident discovered date; incident reported date; incident type; Incident Type: Ransomware, Business Email Compromise, Data Breach, Unauthorized Access, Denial of Service, Misuse of Authorized Access, Other; Incident Source: Internal (Employee), External (Non-employee), Unknown; Target Type: Individual, Business, Government, Other; Target Industry: Insurance, Financial Services, Healthcare, Retail/Wholesale, Education, Government, Other; Cybersecurity Controls in Place: Network Security, Endpoint Security, Data Loss Prevention, Access Controls, Encryption, Vulnerability Management, Incident Response, Other; Detection Method: Internal Monitoring, External Monitoring, Law Enforcement, Public Reporting, Third-party Reporting, Other; Response Actions: Investigation, Remediation, Notification, Legal, Insurance, Other; Costs: Direct Costs, Indirect Costs; Cyber Insurance: Policy Type, Policy Limit, Retention Amount, Insurer Name, Paid Amount; Recovery Amount; Impact on Operations: Duration, Severity; Impact on Revenues: Duration, Severity; Impact on Assets: Duration, Severity; Impact on Liabilities: Duration, Severity; Impact on Equity: Duration, Severity; Free Text Comments.

According to the embodiment, a reputation database 2944 is present and configured to store various open source and paid reputations feeds for the purpose of cross referencing raw data collected by the system to determine if an IP and/or domain is involved in malicious activities or otherwise may be compromised. Additionally, this database may be used by deep learning applications which look at malicious aspects of domains and Ips and score/characterize them for threshold, rule-based, and model-based alerts on network traffic, endpoints, etc. This database can support queries such as, for example, query by IP, by domain, and/or by geolocation.

According to the embodiment, a vulnerability and exploit database 2943 is present and configured to provide critical data required to build a substantial catalogue of vulnerabilities and exploits. This information can be used in part to inform network scoring, threat intelligence, and risk modeling efforts across various uses cases such as cyber and insurance use cases. Vulnerability and exploit data may be sourced from various sources including commercial feeds such as, for example, the National Vulnerability database curated by the National Institute of Standards and Technology (NIST). A main function of this database is to cross reference service versions with known vulnerabilities and exploits to inform various network and security scoring applications. Another use for this database is that it can provide subsets of data which can be leveraged as part of the larger privilege, exploit, and vulnerability pathfinding (i.e., attack path planning) via shortest/viable paths on the composite graph representation of such data. Another use case for this data is to track, forecast, and monitor/alert on changes to vulnerability and exploit trends for the purpose of informing threat modeling across various use cases. In various implementations, this database can support queries including, but not limited to, query by name, by common vulnerabilities and exposures (CVE), by product name, by severity, by vulnerability by exploit availability, by common platform enumeration (CPE), by product version, and/or the like.

Combining CVE and CVE-like data for System as a Service (SaaS) applications not included in the NCD with privilege graphs, exploit, and vulnerability pathfinding techniques allows for comprehensive vulnerability and attack surface prioritization that reflects total security risk. For example, CVE provide a standard reference point for publicly known cybersecurity vulnerabilities. However, SaaS applications might not always be included in the NCD. CVE-like data from sources such as vendor security bulletins, proprietary vulnerability databases, and third-party vulnerability assessments help address this gap. Privilege graphs may be created to visualize active directory, AAD, Okta, Ping, AWS, and GCP identity relationships to identify potential attack paths, such as privilege escalation and lateral movement. Techniques such as attack path planning involve finding the shortest or most viable paths through a composite graph representation of vulnerabilities, privileges, and potential attacks paths. When these components are combined, the provide a comprehensive and prioritized view of an organization's attack surface, which includes, attack surface exposure, vulnerabilities, active ongoing exploitation, TTPs most commonly used, and privilege escalation and lateral movement paths. By combining and analyzing these components, organizations can prioritize their security efforts on the most critical vulnerabilities and attack paths leading to a more effective remediation and improvement process.

According to the embodiment, a threat actor database 2945 is present and configured store information intended to map known threat actors with their tactics and known breach details. In some implementations, data for threat actor database 2945 may be collected from various data sources including, but not limited to, the VERIS community database, MISP database, MITRE ATT&CK and PRE-ATT&CK Database, threat graphs (e.g., Microsoft threat graph), MITRE CTI repository, etc. This database can support queries by threat actor wherein a search for threat actors and their associated TTPs and breach details, and queries by threat actor TTP wherein a search for threat actors based on specific tactics, techniques, and procedures they employ.

In some implementations, cyber enrichment service tables 2940 may further comprise a vector database 2948. A vector database may comprise information related to actual observed events, insights, and alerts from a cyber analytics platform can be compared to various attack chain or campaign elements and composite indicators of compromise (IOCs) from the threat actor database 2945 to enhance threat-informed defensive operations and adversary fingerprinting. This process can aid in identifying potential goals of attackers, which can be leveraged to prioritize defensive efforts effectively. The system collects and enriches a plurality of data form multiple sources, including observed events, insights, and alerts generated from integrated systems. This data may be combined with the threat actor database 2945 which includes information on known threat actors and their TTPs, as well as breach details. The enriched data from the system is then compared and correlated with the threat actor database's 2945 attack chain or campaign elements and composite IOCs. This process helps identify similarities or patterns in the observed events that may be indicative of a specific threat actor's TTPs or goals. By comparing the observed events with the TAD's data, security analysts can build an "adversary fingerprint," which is a unique profile of a threat actor based on their TTPs, goals, and observed behaviors. This fingerprinting can help in attributing observed events to specific threat actors and understanding their objectives. Once potential goals of attackers are identified, these "draft fingerprints" can be used to inform red team planning. Red team exercises can simulate potential targets and goals of attackers to identify weaknesses in the organization's defenses, allowing the blue team (defenders) to prioritize and improve their defensive efforts. By understanding the goals of attackers and simulating potential targets, defenders can better prioritize their resources and efforts. This approach enables them to focus on high-priority assets and potential attack vectors, ultimately stopping or interdicting attacks more effectively.

Vectorization is a process of converting raw data into a structured, numerical format that can be easily analyzed by machine learning algorithms. In the context of cybersecurity, vectorization can be used to represent various elements of attacks, such as network traffic patterns, malware signatures, or other indicators of compromise (IOCs). By transforming these elements into numerical vectors, it becomes much more efficient to classify or detect similar elements of attacks compared to working with raw data. There are several reasons why vectorization enables more efficient classification or detection of similar attack elements: scalability: Vectorization allows machine learning algorithms to process large datasets more efficiently. Raw data, especially in cybersecurity, can be vast and unstructured, making it challenging to analyze. Vector representation reduces the data's dimensionality, making it easier to process and scale; comparability: In a vectorized format, it becomes easier to compare different elements of attacks by calculating the distance between their corresponding vectors. This enables efficient similarity measurements, which are crucial in identifying patterns or relationships between different attack elements; feature extraction: Vectorization helps extract meaningful features from the raw data. These features can represent different aspects of an attack, such as the type of malware, its behavior, or the method of delivery. By using these features, machine learning algorithms can better understand and classify the attack elements; noise reduction: Raw data often contains noise or irrelevant information that may not be helpful in detecting or classifying attacks. Vectorization can help filter out this noise by focusing on the most relevant features, improving the accuracy and efficiency of the classification or detection process; and machine learning compatibility: Many machine learning algorithms, such as clustering, classification, or anomaly detection algorithms, work more effectively with numerical data. Vectorizing the attack elements ensures compatibility with these algorithms and allows for more accurate and efficient detection or classification. Vectorization can play a critical role in enabling more efficient classification or detection of similar attack elements in cybersecurity. By transforming raw data into a structured, numerical format, it becomes easier to compare, process, and analyze different elements of attacks, ultimately improving the accuracy and efficiency of cybersecurity defenses.

According to the embodiment, a tool database 2947 is present and configured to store metadata associated with both offensive and defensive tools and link their usage to specific cyber events, cyber controls (e.g., the UCF framework), cyber kill chain stages, and threat actors. This database can support various use cases including: tracking threat actor relationships with tools and TTPs; evaluating the velocity of offensive and defensive tool development for risk modeling and forecasting; linking compliance and control paradigms in UCF to potential tools; leveraging this catalogue of tools (and potential efficacy estimates or data) to look at control effectiveness planning, estimation and modeling; evaluating detection coverage and effectiveness for tools against MITRE ATT&CK and PRE-ATT&CK along w/linkages to data sources and coverage/confidence in attack types; Scoring/recommendation of individual tools (i.e. gap assessment) or baskets of tools (i.e. portfolio of controls efficacy) w/optional optimization against cost parameters/ functions; and offensive security tool to threat actor mapping and analysis of offensive security tool impact. Tool database 2947 can support queries such as (not limited by) query by tool name, by tool type (e.g., script, exploit, etc.) by TTPs (e.g., what MITRE ATT&CK TTPs does the tool enable or protect against, etc.). Tool database 2947 may include, but is not limited to: detailed metadata for each tool including tool name, type, version, associated TTPs, and known vulnerabilities. Software bill of materials information for tools may also be included; relationships and linkages between tools, cyber events, cyber controls, cyber kill chain stages, and threat actors; methodologies to evaluate and score tools based on their effectiveness, coverage, and cost; compliance and control information; and data source mapping such that tools are mapped to data sources they collect or require and linking them to MITRE ATT&CK TTPs. Tool database 2947 can support query by tool name, by tool type, and by TTPs.

According to the embodiment, an internet infrastructure health database 2946 is present and configured to provide information related to the "state" of the environment under which breaches or historical events may have occurred and what risks may be most likely or possible at a given point in time. For example, CyberGreen is an organization that attempts to capture public Internet infrastructure state information to estimate several risk areas which include, open recursive DNS, open NTP, open SNMP, open Chargen, open SSDP, and DDoS. Additionally, the state information will be an important part of normalizing and contextualizing historical breach events, breach data sets, and insurance/economic loss estimates to better reflect reality. This database can be used to support queries by (but not limited to) entity and IP, by geolocation, by country, by state, and by device type (e.g., route, IoT device, etc.), and/or the like.

According to the embodiment, query engine 2920 may be configured to receive a query (e.g., a query submitted by a system user) and retrieve stored data associated with the received query from one or more of the cyber enrichment service tables 2940. Search engine 2920 may have a user interface 2921 component which can provide various interactive components (e.g., search bar, etc.) that allow a system user to submit a search query as well as view the search results associated with the query. Query engine 2920 may be configured to support federated search capabilities across all of the cyber enrichment service tables 2940 regardless of the persistence method to utilize in threat hunting and analytic workflows. In various implementations, query engine 2920 may leverage one or more access APIs 2922 to interface with and obtain data from the cyber enrichment service tables 2940. In some implementations, access APIs 2922 are configured as a REST API that allows query engine 2920 to obtain the content associated with the query and display the search results in a suitable format via user interface 2921. According to some embodiments, each database of the cyber enrichment service tables 2940 may have an associated bespoke access API 2922 which functions as a database engine for its associated service table, handling user queries, managing read/write operations, and/or the like.

According to the embodiment, simulation engine 2930 may leverage the cyber enrichment service databases and simulation databases to simulate various protocol infrastructures. For example, border gateway protocol may be simulated using the disclosed system. In other embodiments, protocols such as DNS may be modeled at large scale using simulation engine 2930. For example, imagine another EternalBlue scenario where SMB or another foundation protocol is compromised. EternalBlue, BlueKeep, LOh4j, etc. all need the ability to be simulated or modeled as a hypothetical scenario to assess potential impact for exploitation, especially if it is presented as wormable or remote executable. This may be combined with the systems capability to access a software bill of materials to look for impacts associated with various libraries in the dependency graphs of software or vendors to a given entity (e.g., common libraries like Log 4j or common vendors such as Microsoft can be considered for mass exposure).

Simulation engine 2930 may also create and manage various models (e.g., machine and/or deep learning models, statistical models, etc.) which can leverage the data in cyber enrichment service databases or synthetic data sets for data analysis and prediction. In some implementations, the models may be generative based models. In some implementations, the simulation may be an emulation.

According to the embodiment, simulation engine 2930 may leverage a bespoke massively multiplayer online game simulation (MMOGS) for large scale border gateway protocol (BGP) simulation of the entire Internet, essentially functioning as an Internet weather service. Border gateway protocol is the routing protocol for the Internet and functions to pick the most efficient routes when delivering Internet traffic. As an example, BGP can be thought of as the postal service of the Internet. When someone submits data via the Internet, BGP is responsible for looking at all the available paths that data could travel and picking the best route, which usually means hopping between autonomous systems. BGP is the protocol that makes the Internet work by enabling data routing.

The Internet is a network of networks. It can be broken up into hundreds of thousands of smaller networks known as autonomous systems. Each autonomous system is identified by a unique Autonomous System Number (ASN) and present a common and clearly defined routing policy to the Internet. Each of these networks is essentially a large pool of routers run by a single organization. Typically, autonomous systems belong to Internet service providers (ISPs) or other large organizations, such as tech companies, universities, government agencies, and scientific institutions.

The MMOGS system is developed at least in part using the various information stored in the cyber enrichment service tables 2940 as well as Internet related data from one or more external data sources. For example, Internet related data may comprise routing information on a global scale such as from the mutually agreed norms for routing security (MANRS) database. Additionally, Internet infrastructure scan data may be used as an input when developing the MMOGS system. Internet scan data may be used to detect vulnerabilities that exist with the Internet cyber ecosystem (composed of network connected devices) as they relate to open services such as domain name system (DNS), simple service discovery protocol (SSDP), simple network management protocol (SNMP), Chargen, and network time protocol (NTP). In some implementations, Internet scan data may be obtained from a CyberGreen database which is a database of scanned Internet infrastructure information. By combining the MMOGS system with the cyber enrichment service table data, the routing information, and Internet scan data, a comprehensive understanding of the Internet's dynamics and potential vulnerabilities can be achieved. Simulation results can be used to inform an organizations cyber defense strategy, identify weak points in an attack surface, and predict where new vulnerabilities may come to exist based on the overall simulated Internet health and/or state.

In some embodiments, a user submitted query may be received from query engine 2920 and sent to simulation engine 2930 where it may be applied to the simulation in order to produce a simulation result which can be analyzed in conjunction with other data (e.g., cyber enrichment data, Internet infrastructure data, routing data, etc.) in order to make predictions, recommendations, or generate alerts with respect to the topic of the query. For example, a user submitted query may ask for information about a specific threat actor using a specific TTP to access a network at a given geolocation. When the query is received, system 2900 retrieves any relevant information from one or more of the cyber enrichment service tables. Additionally, the query may be applied to the simulation. In some implementations, the query may be vectorized prior to being applied to the simulation. Because the simulation is capable of modeling the entire Internet, the query may be used to focus on parts of the simulation related to the specific geolocation as indicated by the query and may focus more directly on networks or subnetworks susceptible to the specific TTP as indicated by the query. The simulation results and the retrieved cyber enrichment service table data may be returned via the UI 2921 to the user as the search result.

Using the MMOGS system for large-scale internet health simulation can offer several advantages. When a simulation is run, and the results are analyzed it can provide several use cases for an organization. First, it can provide real-time monitoring and forecasting: by simulating the entire Internet's BGP activity, the MMOGS system can monitor real-time changes and trends, allowing for accurate forecasting of potential issues and anomalies in the routing infrastructure. In addition, it can provide scenario analysis: the MMOGs system can help simulate various scenarios, such as BGP hijacking, route leaks, or misconfigurations, enabling researchers and network administrators to understand the potential impact of such events and develop strategies for mitigating risks. Furthermore, it can provide improved routing security: by combining MMOGS-generated data with MANRs, organizations can identify areas where routing security can be strengthened, such as implementing Route Origin Validation (ROV) and promoting the adoption of secure routing practices. Another advantage is that it provides an enhanced understanding of Internet health: integrating MMOGS data with CyberGreen data can provide insights into the overall health of the Internet infrastructure, including identifying potential vulnerabilities and trends that may impact the stability and security of the global network. One last advantage is directed to early warning and mitigation: the MMOGS system can serve as an early warning system for potential threats to the Internet infrastructure, enabling organization to proactively address risks and deploy necessary countermeasures before significant damage occurs.

Simulation engine 2930 may utilize other simulation techniques in addition to the use of MMOGS systems. In some implementations, simulation engine 2930 may utilize discrete event simulation (DES) or large langue models (LLM) and generative adversarial network (GAN) approaches to simulate various cyber events and to respond to user submitted queries. In some embodiments, multiple of the MMOGS, DES, LLM/GAN techniques may be used in "baskets" which blend their relative weighting or importance (e.g., temporally or geographically or topologically).

FIG. 26 is a message diagram illustrating an exemplary exchange of data between various components of a system for large-scale Internet health forecasting and internet noise analysis, according to an embodiment. According to the embodiment, a query engine 2920 may receive a user submitted query which may be directed to anyone of various cyber domains supported by the information stored in the cyber enrichment service tables 2920. The user query may be sent 3001 to access APIs 2922 which parse the query into query details (e.g., parsing into keywords, etc.) which can be used by bespoke APIs to retrieve information related to the query details from one or more of the cyber enrichment service tables 2940. The parsed query details can be sent 3002 to cyber enrichment service tables 2940 via access APIs wherein the relevant data related to the received query details is retrieved from the cyber enrichment service tables. The retrieved cyber enrichment data may then be sent 3003 back to query engine 2920. When query engine receives a user submitted query, it also sends the parsed query details 3004 to simulation engine 2930. Simulation engine 2930 can use the query details as an input into the simulation and run the simulation. The simulation may run, and the results can be analyzed with respect to the query details. The simulation result can be sent 3005 to query engine 2920 where the query engine can format and display 3006 the retrieved cyber enrichment data and the simulation result as the search results for the user submitted query.

Figure 27:
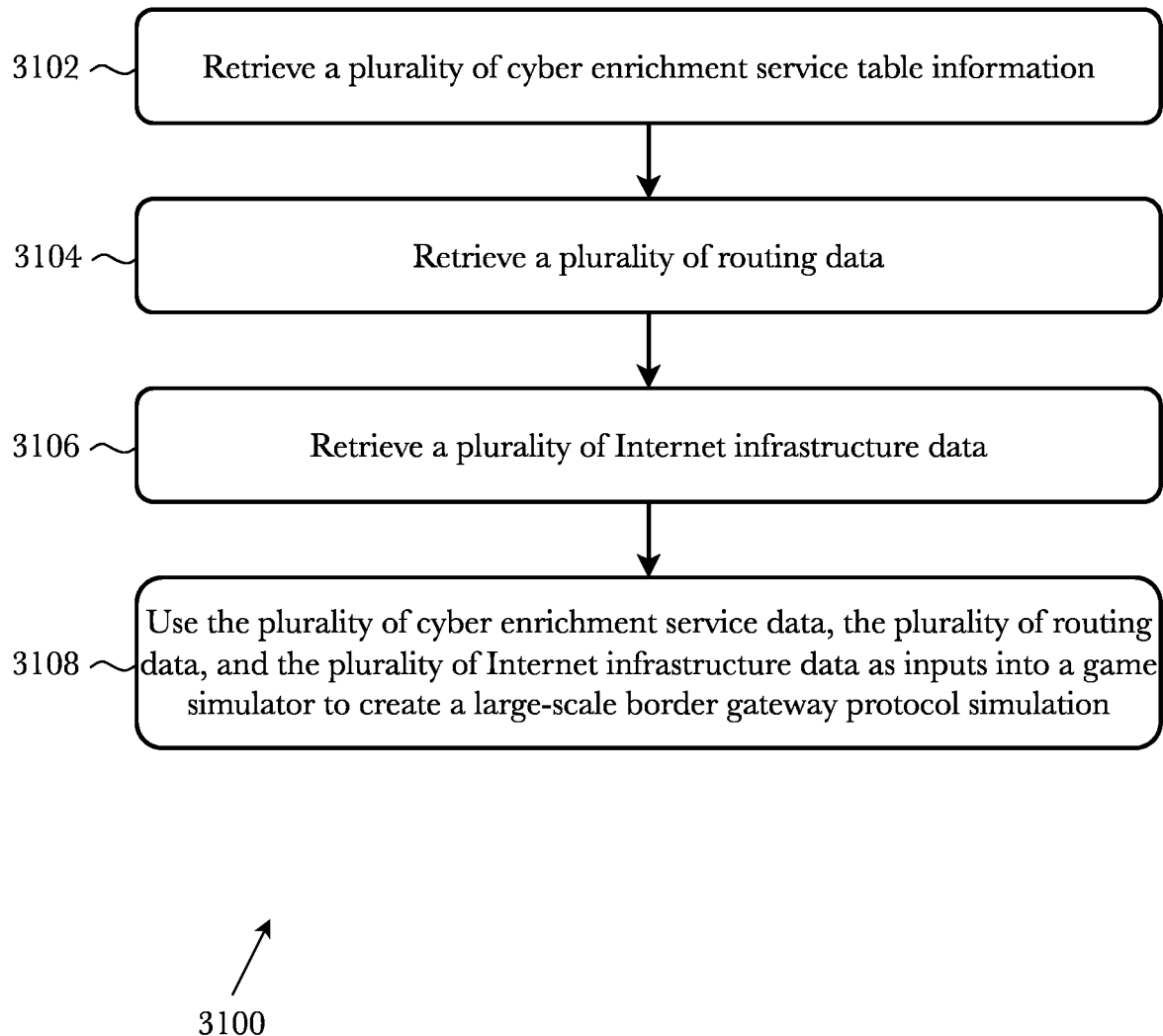
FIG. 27 is a flow diagram illustrating an exemplary process for creating a large-scale Internet simulation, according to an embodiment.

FIG. 27 is a flow diagram illustrating an exemplary method 3100 for creating a large-scale Internet simulation, according to an embodiment. According to the embodiment, the process begins at step 3102 when simulation engine 2930 receives, retrieves, or otherwise obtains a plurality of cyber enrichment service table data from the cyber enrichment service tables 2940. At the next step 3104, simulation engine retrieves, receives, or otherwise obtains a plurality of routing data and then at step 3106 a plurality of Internet infrastructure data. At step 3108, simulation engine 2930 uses each of the pluralities of data as inputs into a game simulator to create a large-scale border gateway protocol simulation. In some implementations, the game simulator is a massively multiplayer online game simulator. The created simulation may be used to simulate Internet border gateway protocol interactions and provide insight with respect to user submitted queries, according to an aspect.

Figure 28:
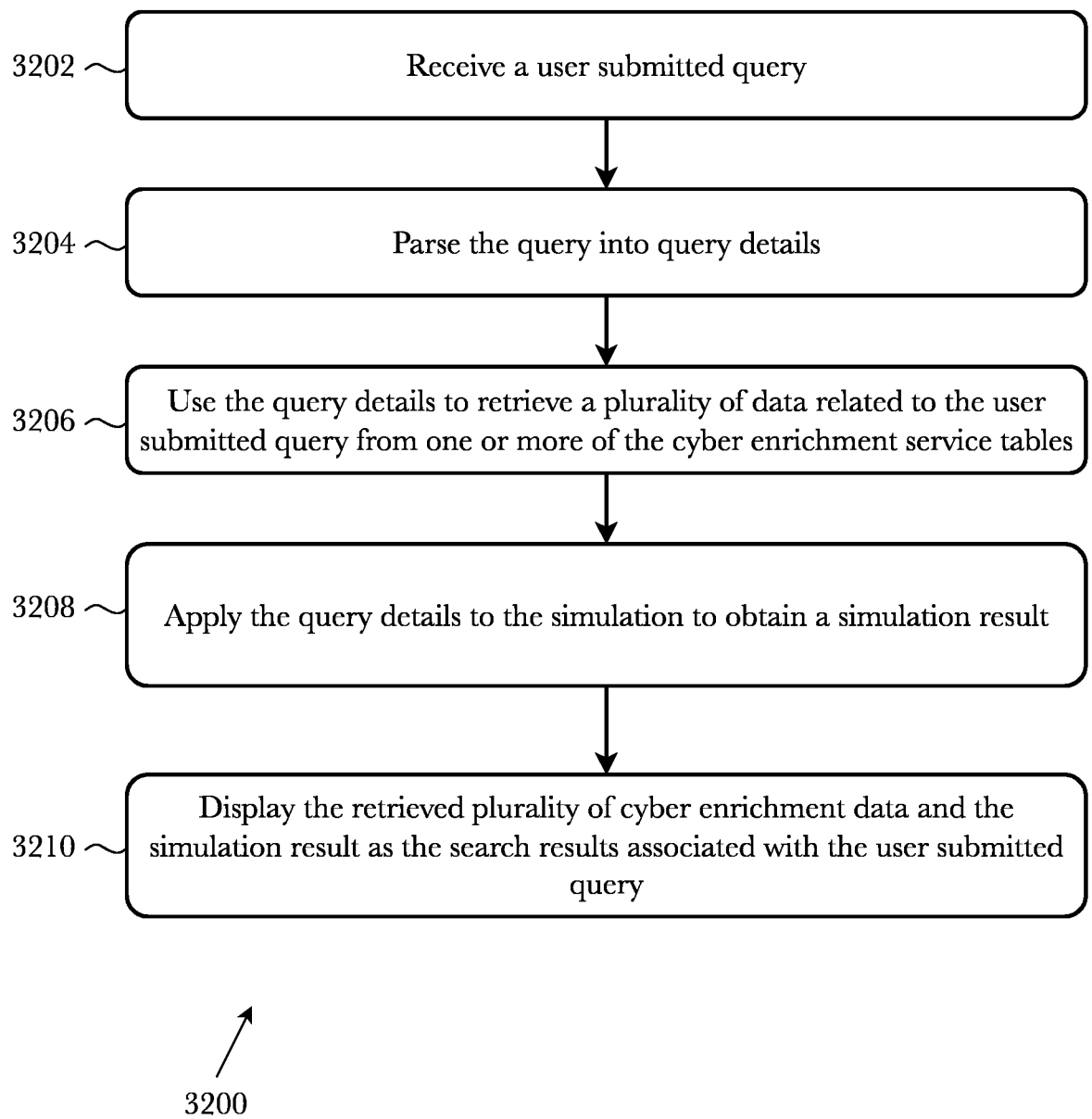
FIG. 28 is a flow diagram illustrating an exemplary method for using a large-scale Internet simulation to respond to user submitted queries, according to an aspect.

FIG. 28 is a flow diagram illustrating an exemplary method 3200 for using a large-scale Internet simulation to respond to user submitted queries, according to an aspect. According to the aspect, the process begins at step 3202 when query engine 2920 receives a user submitted query. The submitted query may be directed to a potential attack, vulnerability, or other scenario that is of particular interest to the user. At step 3204 query engine may parse the user submitted query in order to identify keywords and to make data retrieval easier. The parsed query details may be used by one or more access APIs 2922 to retrieve a plurality of data related to the user submitted query from one or more of the cyber enrichment service tables at step 3206. At step 3208, simulation engine can receive the query and/or parsed query details and apply the query details to the large-scale Internet simulation to obtain a simulation result and/or scenario. At step 3210, the simulation result and/or scenario and the retrieved plurality of cyber enrichment data may be sent to query engine 2920 where it may be displayed as the search results responsive to the user submitted query. In some implementations, the simulation result/scenario may comprise changing DNS, updating routing tables, updating IDS/IPS signatures, adjusting multi-factor authentication procedures or challenges, and/or adjusting endpoint policy. In some implementations, the simulation result and the retrieved plurality of information may be displayed or otherwise provided to a system user via an API (including from other applications). In some implementations, the user submitted query may be applied to the cyber enrichment databases and simulation databases to determine a scenario of interest. The scenario may be determined based on actual observed data or generated data such as a simulation result or a machine learning produced data set.

Exemplary Computing Environment

Figure 29:
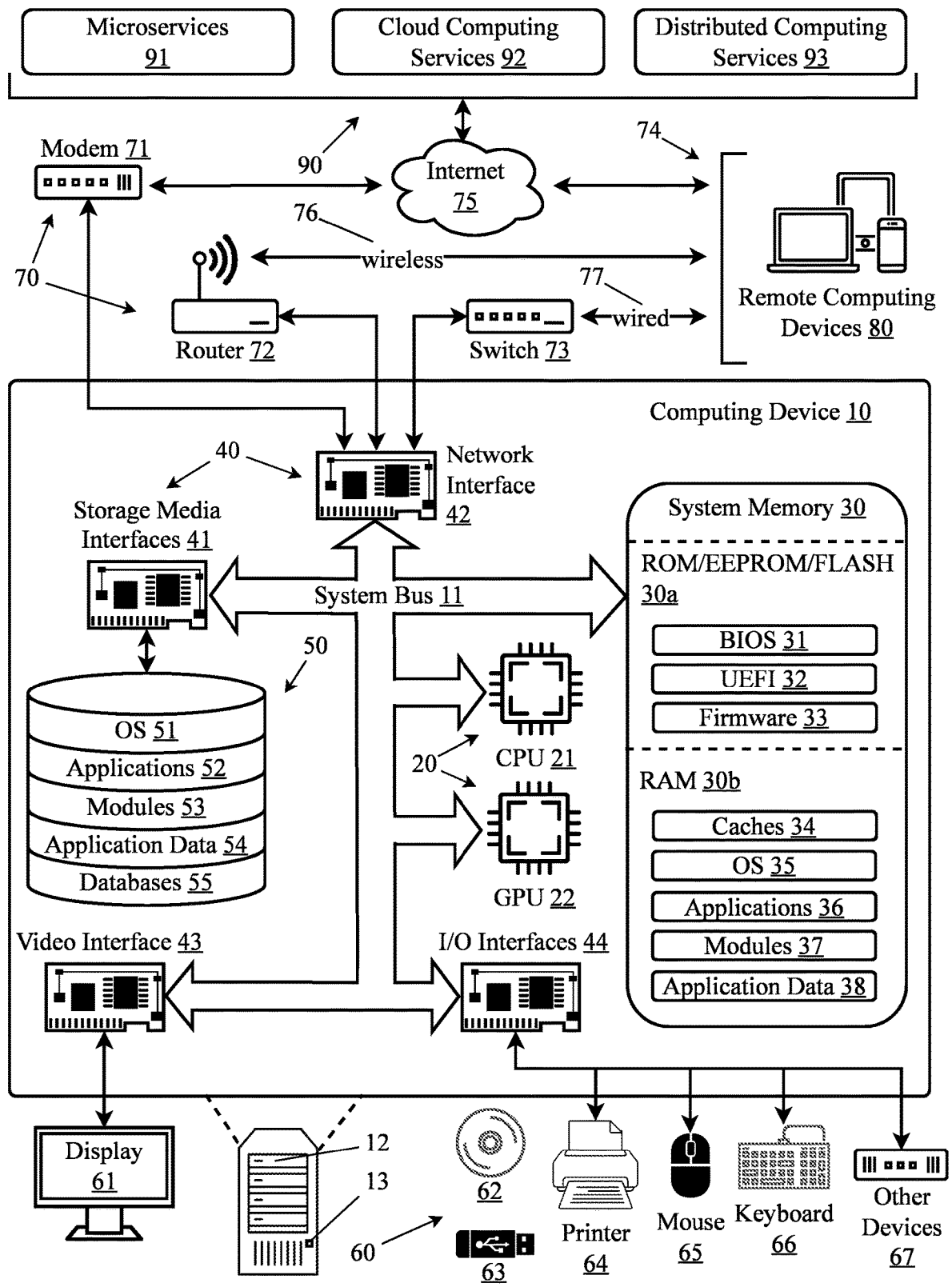
FIG. 29 illustrates an exemplary computing environment on which an embodiment described herein may be implemented, in full or in part.

FIG. 29 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as CD-ROM drives, digital versatile discs (DVD), or other optical disc storage for reading and/or writing optical discs 62; magnetic cassettes, magnetic tape, magnetic disk storage, or other magnetic storage devices; or any other medium which can be used to store the desired content, and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, Bluetooth® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed, or the processing mechanisms employed therein, but are typically comprised of semiconductor materials into which many transistors are formed together into logic gates on a chip (i.e., an integrated circuit or IC). However, the term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable or independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory 30a such as read only memory (ROM), electronically-erasable programmable memory (EEPROM), or rewritable solid state memory (commonly known as "flash memory"). Non-volatile memory 30a is not erased when power to the memory is removed. Non-volatile memory 30a is typically used for long-term storage a basic input/output system (BIOS) 31, containing the basic instructions, typically loaded during computer startup, for transfer of information between components within computing device, unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b such as random access memory (RAM) is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage provide long-term storage of data. Data on non-volatile data storage devices 50 is not erased when power to the non-volatile data storage devices 50 is removed. Non-volatile data storage devices 50 may be implemented using technology for non-volatile storage of content such as CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing 10 as in the case of internal hard drives, removable from computing device 10 as in the case of external USB hard drives, or a combination thereof, but computing device will comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages like C+, Java, and Python, which are then compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. Router is shown While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 30 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services.

Microservices 91 are collections of small, loosely coupled, and independently deployable computing services. Each microservice represents a specific business functionality and runs as a separate process or container. Microservices promote the decomposition of complex applications into smaller, manageable services that can be developed, deployed, and scaled independently. These services communicate with each other through well-defined APIs (Application Programming Interfaces), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. For example, cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

What is claimed is:

1. A system for large-scale internet health forecasting and internet noise analysis, comprising:
    a computer system comprising a memory and a processor;
    a simulation engine comprising a first plurality of programming instructions stored in the memory and operating on the processor, wherein the first plurality of programming instructions, when operating on the processor, causes the computer system to:
    retrieve a first plurality of cyber enrichment service data from cyber enrichment tables comprising at least a breach content database, an event database, a vulnerability and exploit database, a threat actor database, a reputation database, an internet infrastructure health database, and a tool database;
    retrieve a plurality of routing information from external routing data sources;
    retrieve a plurality of internet infrastructure data from internet infrastructure scanning sources;
    use the plurality of cyber enrichment service data, the plurality of routing information, and the plurality of internet infrastructure data as inputs into a multiplayer online game simulator to create a large-scale internet health simulation;
    receive a user submitted query from a query engine;
    dynamically retrieve a second plurality of cyber enrichment service data from the cyber enrichment service tables based on parsed query details of the user submitted query, wherein the second plurality of cyber enrichment service data comprises query-specific threat intelligence data that differs from the first plurality of cyber enrichment service data;
    apply the user submitted query to the large-scale internet health simulation to determine a predictive scenario comprising at least one of a predicted cyber threat, a routing security vulnerability, an internet infrastructure health forecast, or a threat actor behavior pattern;
    normalize and schematize the predictive scenario and the second plurality of cyber enrichment service data to enable interoperability between different threat intelligence taxonomies; and
    return the normalized and schematized scenario and the second plurality of cyber enrichment service data as a response to the user submitted query.

2. The system of claim 1, wherein the multiplayer online game simulator simulates border gateway protocol interactions across autonomous systems to model internet-scale routing behavior.

3. The system of claim 1, wherein the cyber enrichment service data comprises event data, reputation data, vulnerability and exploit data, threat actor data, breach detail data, tool data with offensive and defensive security tool metadata, and internet infrastructure health data, and wherein the cyber enrichment service tables support normalizing and schematizing interoperability between threat intelligence feeds from different vendors.

4. The system of claim 1, wherein the predictive scenario comprises real-time monitoring and forecasting predictions for internet infrastructure health changes.

5. The system of claim 1, wherein the predictive scenario comprises routing security vulnerability assessments and border gateway protocol anomaly predictions.

6. The system of claim 1, wherein the predictive scenario comprises a predicted threat to internet infrastructure with associated threat actor attribution and recommended countermeasures.

7. The system of claim 1, further comprising the query engine comprising second plurality of programming instructions stored in the memory and operating on the processor, wherein the second plurality of programming instructions, when operating on the processor, causes the computer system to:
- receive the user submitted query;
- parse the user submitted query to identify relevant threat intelligence domains;
- send the parsed user submitted query to the simulation engine;
- receive the returned normalize and schematized scenario and the second plurality of cyber enrichment service data from the simulation engine; and
- display the normalized and schematized scenario and the second plurality of cyber enrichment service data as a response to the user submitted query via a user interface with threat actor taxonomy mapping.

8. The system of claim 1, wherein the computer system is a cloud computing platform.

9. A computer-implemented method for large-scale internet health forecasting and internet noise analysis, comprising the steps of:
- retrieving a first plurality of cyber enrichment service data from cyber enrichment service tables comprising at least a breach content database, an event database, a vulnerability and exploit database, a threat actor database, a reputation database, an internet infrastructure health database, and a tool database;
- retrieving a plurality of routing information from external routing data sources;
- retrieving a plurality of internet infrastructure data from internet infrastructure scanning sources;
- using the plurality of cyber enrichment service data, the plurality of routing information, and the plurality of internet infrastructure data as inputs into a multiplayer online game simulator to create a large-scale internet health simulation;
- receiving a user submitted query from a query engine;
- dynamically retrieving a second plurality of cyber enrichment service data from the cyber enrichment service tables based on parsed query details of the user submitted query, wherein the second plurality of cyber enrichment service data comprises query-specific threat intelligence data that differs from the first plurality of cyber enrichment service data;
- applying the user submitted query to the large-scale internet health simulation to determine a predictive scenario comprising at least one of a predicted cyber threat, a routing security vulnerability, an internet infrastructure health forecast, or a threat actor behavior pattern; and
- normalizing and schematizing the predictive scenario and the second plurality of cyber enrichment service data to enable interoperability between different threat intelligence taxonomies; and
- returning the normalize and schematized scenario and the second plurality of cyber enrichment service data as a response the user submitted query.

10. The computer-implemented method of claim 9, wherein the multiplayer online game simulator simulates border gateway protocol interactions across autonomous systems to model internet-scale routing behavior.

11. The computer-implemented method of claim 9, wherein the cyber enrichment service data comprises event data, reputation data, vulnerability and exploit data, threat actor data, breach detail data, tool data with offensive and defensive security tool metadata, and internet infrastructure health data, and wherein the cyber enrichment service tables support normalized and schematized interoperability between threat intelligence feeds from different vendors.

12. The computer-implemented method of claim 9, wherein the predictive scenario comprises real-time monitoring and forecasting predictions for internet infrastructure health changes.

13. The computer-implemented method of claim 9, wherein the predictive scenario comprises routing security vulnerability assessments and border gateway protocol anomaly predictions.

14. The computer-implemented method of claim 9, wherein the predictive scenario comprises a predicted threat to internet infrastructure with associated threat actor attribution and recommended countermeasures.

15. The computer-implemented method of claim 9, further comprising the steps of:
- receiving the user submitted query;
- parsing the user submitted query to identify relevant threat intelligence domains;
- sending the parsed user submitted query to the simulation engine;
- receiving the returned normalize and schematized scenario and the second plurality of cyber enrichment service data from the simulation engine; and
- displaying the normalize and schematized scenario and the second plurality of cyber enrichment service data as a response to the user submitted query via a user interface with threat actor taxonomy mapping.

16. The computer-implemented method of claim 9, wherein the computer system is a cloud computing platform.

* * * * *